US008855195B1

(12) United States Patent
Kelly

(10) Patent No.: US 8,855,195 B1
(45) Date of Patent: Oct. 7, 2014

(54) IMAGE PROCESSING SYSTEM AND METHOD

(75) Inventor: Shawn L. Kelly, Colorado Springs, CO (US)

(73) Assignee: Panamorph, Inc., Colorado Springs, CO (US)

( * ) Notice: Subject to any disclaimer, the term of this patent is extended or adjusted under 35 U.S.C. 154(b) by 0 days.

(21) Appl. No.: 14/343,844

(22) PCT Filed: Sep. 10, 2012

(86) PCT No.: PCT/US2012/054532
§ 371 (c)(1),
(2), (4) Date: Mar. 7, 2014

(87) PCT Pub. No.: WO2013/036972
PCT Pub. Date: Mar. 14, 2013

Related U.S. Application Data

(60) Provisional application No. 61/532,589, filed on Sep. 9, 2011, provisional application No. 61/577,638, filed on Dec. 19, 2011, provisional application No. 61/590,053, filed on Jan. 24, 2012, provisional application No. 61/601,080, filed on Feb. 21, 2012, provisional application No. 61/658,903, filed on Jun. 12, 2012.

(51) Int. Cl.
*H04N 7/12* (2006.01)
*G06T 9/00* (2006.01)
(52) U.S. Cl.
CPC ........................................ *G06T 9/00* (2013.01)
USPC .................................................... 375/240.01
(58) Field of Classification Search
CPC ........................................................ G06T 9/00
USPC ................ 375/240, 240.01; 382/233
See application file for complete search history.

(56) References Cited

U.S. PATENT DOCUMENTS 5,444,491 A    8/1995  Lim
5,477,397 A   12/1995  Naimpally et al.
(Continued)

FOREIGN PATENT DOCUMENTS

EP    1643771 A2    4/2006
EP    2101313 A1    9/2009
(Continued)

OTHER PUBLICATIONS

Schwarz, Heiko, Marpe, Detlev and Wiegand, Thomas, "Overview of the Scalable Video Coding Extension of the H.264/AVC Standard", IEE Transactions on Circuits and Systems for Video Technology, vol. 17, No. 9, Sep. 9, 2007, pp. 1103-1120.

(Continued)

*Primary Examiner* — Allen Wong
(74) *Attorney, Agent, or Firm* — Raggio & Dinnin, P.C.

(57) ABSTRACT

A relatively higher resolution digitized image organized as a plurality of first kernel arrays, each with a plurality of pixels, is transformed into a corresponding relatively-smaller second kernel array of a relatively-lower-resolution image and an associated set of remaining pixels. Down-sampled pixels of the second kernel array are generated from linear interpolation of original pixels of the first kernel array. Associated interpolation coefficients incorporate perturbations to locations of the down-sampled pixels that are symmetric with respect to centers of the first and second kernel arrays. Down-sampled pixels of the second kernel array can be recombined with the associated set of remaining pixels to reconstruct the relatively higher resolution digitized image substantially without loss of associated information, or used directly to reconstruct an approximation thereof, with associated encoding and decoding processes adapted to reduce the susceptibility of image reconstruction errors caused by subsequent image compression.

33 Claims, 28 Drawing Sheets

(56) References Cited

U.S. PATENT DOCUMENTS

| | | | |
|---|---|---|---|
| 5,589,993 | A | 12/1996 | Naimpally |
| 5,621,660 | A | 4/1997 | Chaddha et al. |
| 5,768,535 | A | 6/1998 | Chaddha et al. |
| 6,025,882 | A | 2/2000 | Geshwind |
| 6,184,935 | B1 | 2/2001 | Iaquinto et al. |
| 6,249,549 | B1 | 6/2001 | Kim |
| 6,510,177 | B1 | 1/2003 | De Bonet et al. |
| 6,539,120 | B1 | 3/2003 | Sita et al. |
| 6,683,980 | B1 | 1/2004 | Meier et al. |
| 6,788,347 | B1 | 9/2004 | Kim et al. |
| 6,791,578 | B1 | 9/2004 | Ubillos |
| 6,925,249 | B1 | 8/2005 | Meier et al. |
| 6,990,150 | B2 | 1/2006 | Fang |
| 6,999,129 | B2 | 2/2006 | Shirahama et al. |
| 7,075,559 | B2 | 7/2006 | Ubillos |
| 7,272,567 | B2 | 9/2007 | Fejzo |
| 7,295,608 | B2 | 11/2007 | Reynolds et al. |
| 7,305,174 | B2 | 12/2007 | Meier et al. |
| 7,386,049 | B2 | 6/2008 | Garrido et al. |
| 7,392,195 | B2 | 6/2008 | Fejzo |
| 7,599,434 | B2 | 10/2009 | Reynolds et al. |
| 7,656,950 | B2 | 2/2010 | Garrido et al. |
| 7,667,707 | B1 | 2/2010 | Margulis |
| 7,813,428 | B2 | 10/2010 | Yoon et al. |
| 7,930,184 | B2 | 4/2011 | Fejzo |
| 7,956,930 | B2 | 6/2011 | Sullivan |
| 7,961,963 | B2 | 6/2011 | Sun |
| 2004/0017852 | A1 | 1/2004 | Garrido et al. |
| 2005/0031321 | A1 | 2/2005 | Ubillos |
| 2006/0039472 | A1 | 2/2006 | Barbarien et al. |
| 2006/0210185 | A1 | 9/2006 | Sun |
| 2008/0008252 | A1 | 1/2008 | Xu et al. |
| 2008/0211901 | A1 | 9/2008 | Civanlar et al. |
| 2008/0232452 | A1 | 9/2008 | Sullivan et al. |
| 2010/0046612 | A1 | 2/2010 | Sun et al. |
| 2011/0194024 | A1 | 8/2011 | Stefanoski et al. |
| 2012/0075526 | A1 | 3/2012 | DeHaan et al. |

FOREIGN PATENT DOCUMENTS

| | | |
|---|---|---|
| EP | 1643771 B1 | 12/2009 |
| EP | 2262230 A1 | 12/2010 |
| WO | 2009052772 A2 | 7/2008 |

OTHER PUBLICATIONS

Unknown author(s), "Scalable Video Coding", Wikipedia, May 4, 2011, downloaded from www.wikipedia.org on Sep. 29, 2011, 5 pages.

Unknown author(s), "H.264/MPEG-4 AVC", Wikipedia, Sep. 22, 2011, downloaded from www.wikipedia.org on Sep. 29, 2011, 5 pages.

Unknown author(s), "PALplus", Wikipedia, Jun. 10, 2012, downloaded from www.wikipedia.org on Aug. 21, 2012, 5 pages.

PCT-ISA/US, International Search Report and Written Opinion of International Searching Authority & Search History in International Application No. PCT/US12/54532, Nov. 30, 2012, 19 pages.

PCT-IPEA/US, International Preliminary Examination Report on Patentability in International Application No. PCT/US12/54532, Sep. 27, 2013, 37 pages.

Muresan, D. Darian and Parks, Thomas W., "Adaptively Quadratic (Aqua) Image Interpolation)", IEEE Transactions on Image Processing, vol. 13, No. 5, May 2004, pp. 690-698.

DTS, Inc., "DTS-HD High Definition Audio", 2006, downloaded from www.dts.com on Sep. 11, 2011, 23 pages.

PCT-ISA/US, International Search Report and Written Opinion of International Searching Authority, Search History, Nov. 30, 2012, 19 pages.

PCT-IPEA/US, International Preliminary Examination Report on Patentability, Sep. 27, 2013, 37 pages.

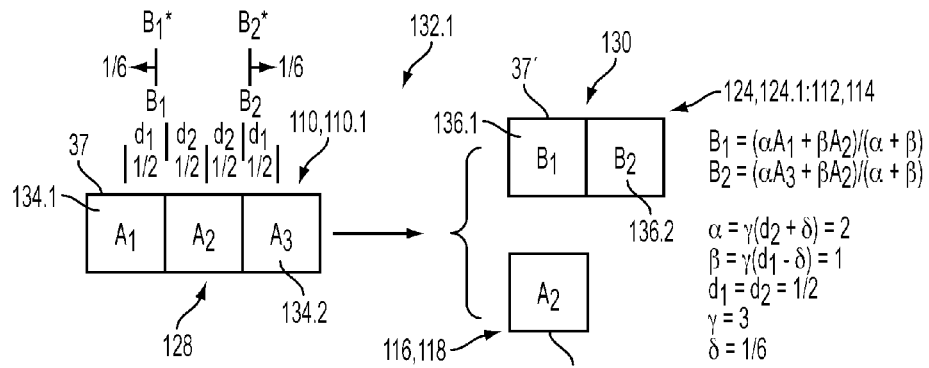
FIG. 15a
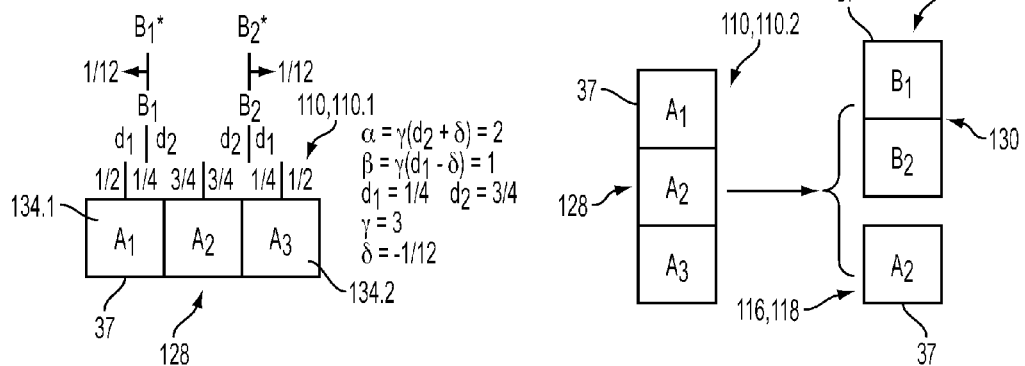
FIG. 15b       FIG. 16
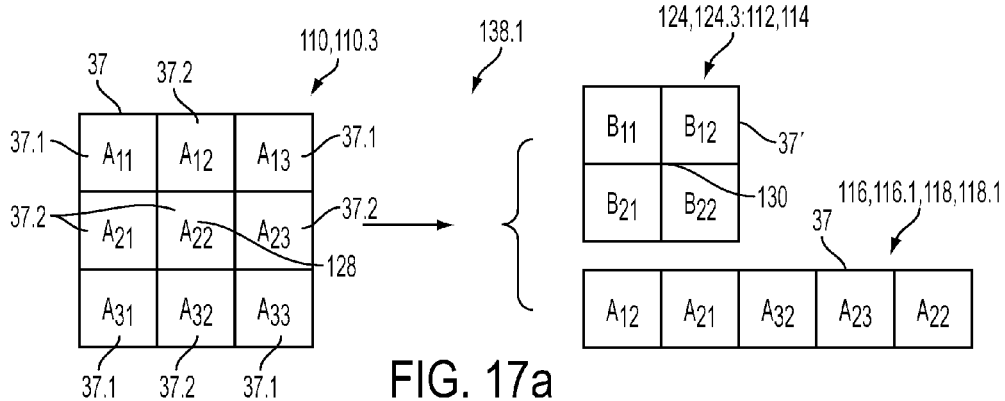
FIG. 17a
$$B_{11} = \frac{\alpha^2 A_{11} + [\alpha\beta(A_{12} + A_{21}) + \beta^2 A_{22}]}{(\alpha+\beta)^2} \qquad B_{12} = \frac{\alpha^2 A_{13} + [\alpha\beta(A_{12} + A_{23}) + \beta^2 A_{22}]}{(\alpha+\beta)^2}$$
$$B_{21} = \frac{\alpha^2 A_{31} + [\alpha\beta(A_{32} + A_{21}) + \beta^2 A_{22}]}{(\alpha+\beta)^2} \qquad B_{22} = \frac{\alpha^2 A_{33} + [\alpha\beta(A_{32} + A_{23}) + \beta^2 A_{22}]}{(\alpha+\beta)^2}$$
FIG. 17b

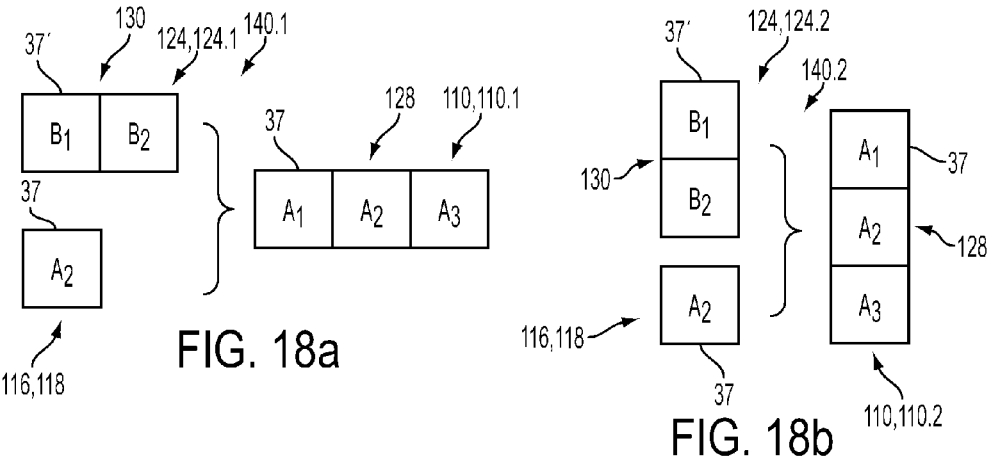
FIG. 18a
FIG. 18b
$$A_1 = ((\alpha + \beta)B_1 - \beta A_2)/\alpha$$
$$A_3 = ((\alpha + \beta)B_2 - \beta A_2)/\alpha$$
FIG. 18c
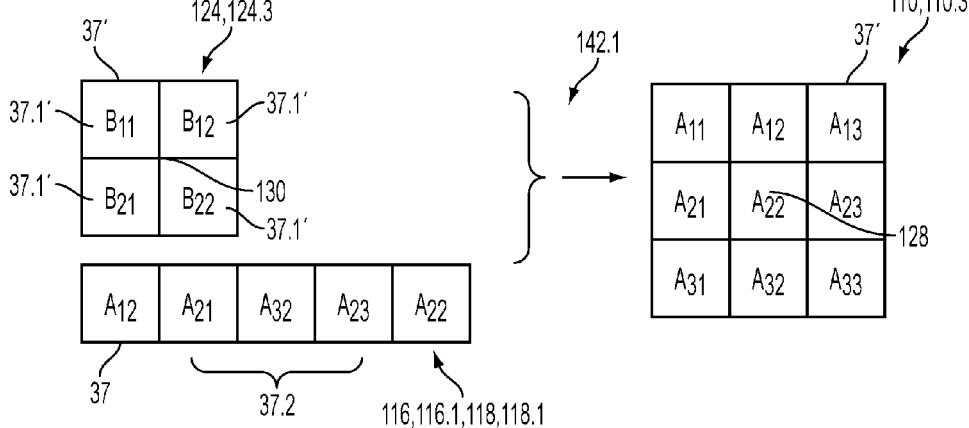
FIG. 19a
$$A_{11} = \frac{(\alpha+\beta)^2 B_{11} - [\alpha\beta(A_{12}+A_{21}) + \beta^2 A_{22}]}{\alpha^2} \qquad A_{13} = \frac{(\alpha+\beta)^2 B_{12} - [\alpha\beta(A_{12}+A_{23}) + \beta^2 A_{22}]}{\alpha^2}$$
$$A_{31} = \frac{(\alpha+\beta)^2 B_{21} - [\alpha\beta(A_{32}+A_{21}) + \beta^2 A_{22}]}{\alpha^2} \qquad A_{33} = \frac{(\alpha+\beta)^2 B_{22} - [\alpha\beta(A_{32}+A_{23}) + \beta^2 A_{22}]}{\alpha^2}$$
FIG. 19b

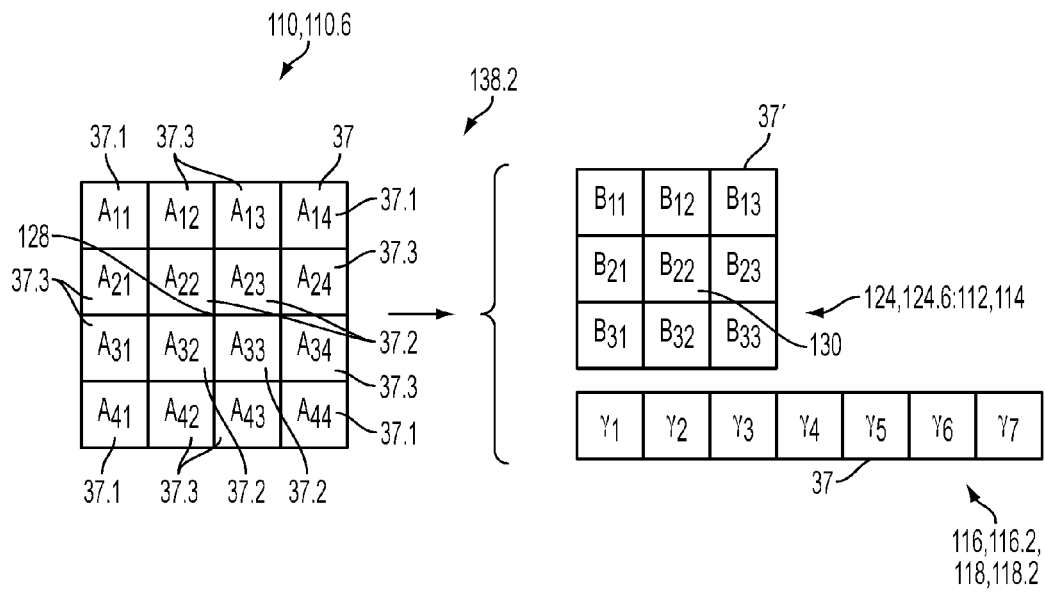

FIG. 24a $Y_1 = \{A_{12} \text{ OR } A_{13}\}$
$Y_2 = \{A_{21} \text{ OR } A_{31}\}$
$Y_3 = \{A_{42} \text{ OR } A_{43}\}$
$Y_4 = \{A_{24} \text{ OR } A_{34}\}$
$\{Y_5, Y_6, Y_7\} = \text{ANY 3 OF } \{A_{22}, A_{23}, A_{32}, A_{33}\}$

FIG. 24b $$B_{11} = \frac{\alpha^2 A_{11} + \alpha\beta(A_{12} + A_{21}) + \beta^2 A_{22}}{(\alpha+\beta)^2} \quad B_{12} = \frac{\alpha(A_{12} + A_{13}) + \beta(A_{22} + A_{23})}{4} \quad B_{13} = \frac{\alpha^2 A_{14} + \alpha\beta(A_{13} + A_{24}) + \beta^2 A_{23}}{(\alpha+\beta)^2}$$

$$B_{21} = \frac{\alpha(A_{21} + A_{31}) + \beta(A_{22} + A_{32})}{2(\alpha+\beta)} \quad B_{22} = \frac{A_{22} + A_{23} + A_{32} + A_{33}}{4} \quad B_{23} = \frac{\alpha(A_{24} + A_{34}) + \beta(A_{23} + A_{33})}{2(\alpha+\beta)}$$

$$B_{31} = \frac{\alpha^2 A_{41} + \alpha\beta(A_{42} + A_{31}) + \beta^2 A_{32}}{(\alpha+\beta)^2} \quad B_{32} = \frac{\alpha(A_{42} + A_{43}) + \beta(A_{32} + A_{33})}{4} \quad B_{33} = \frac{\alpha^2 A_{44} + \alpha\beta(A_{43} + A_{34}) + \beta^2 A_{33}}{(\alpha+\beta)^2}$$

FIG. 24c

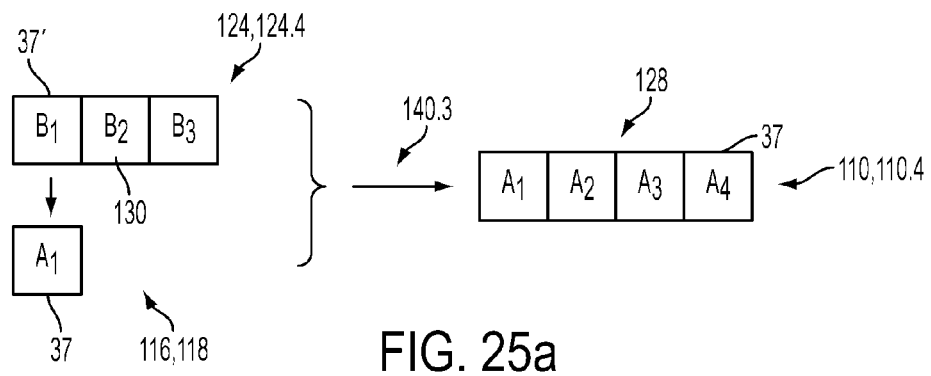
FIG. 25a
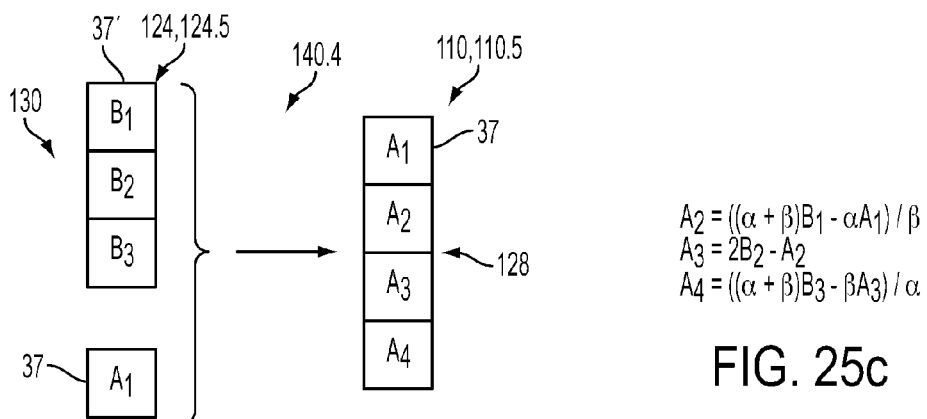
FIG. 25b
$A_2 = ((\alpha + \beta)B_1 - \alpha A_1) / \beta$
$A_3 = 2B_2 - A_2$
$A_4 = ((\alpha + \beta)B_3 - \beta A_3) / \alpha$
FIG. 25c
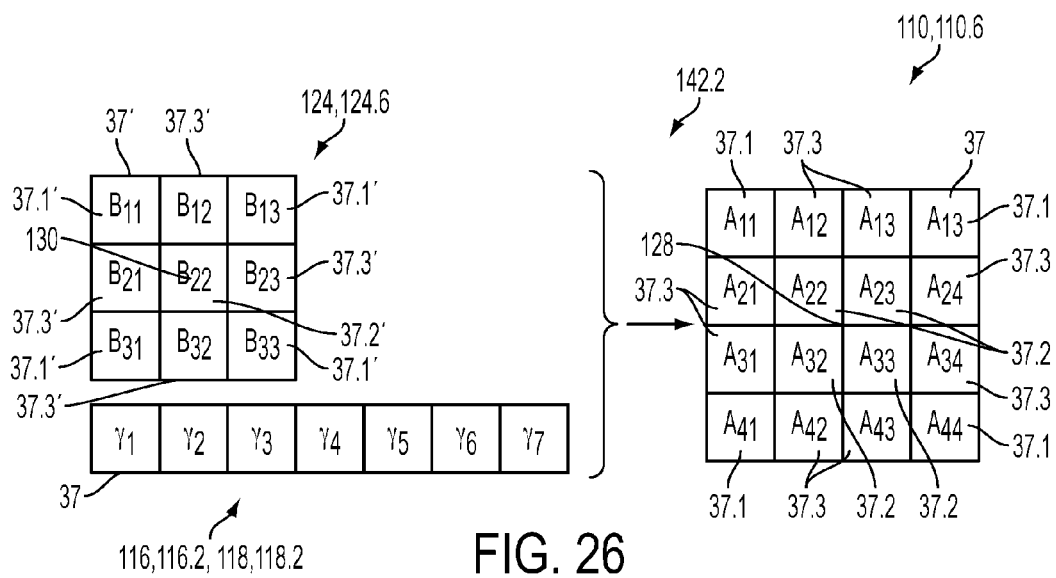
FIG. 26

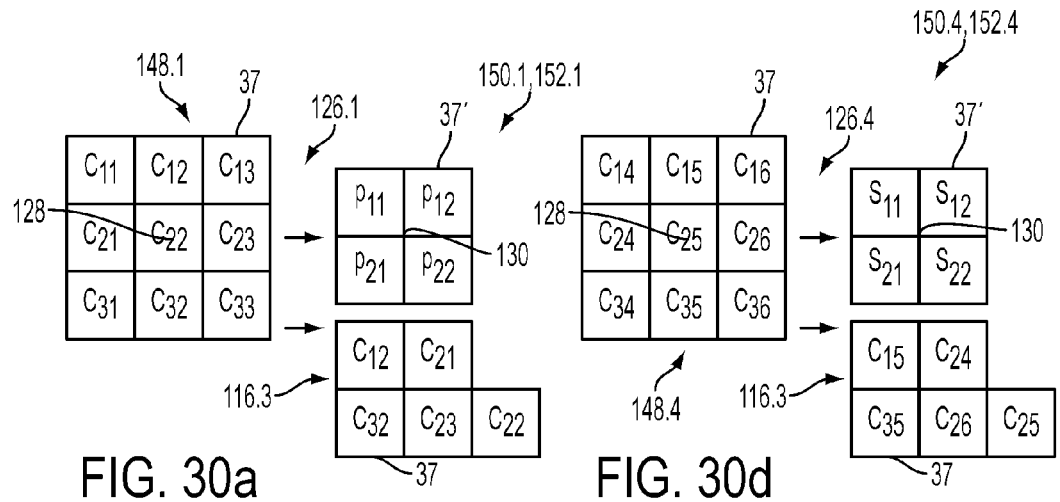
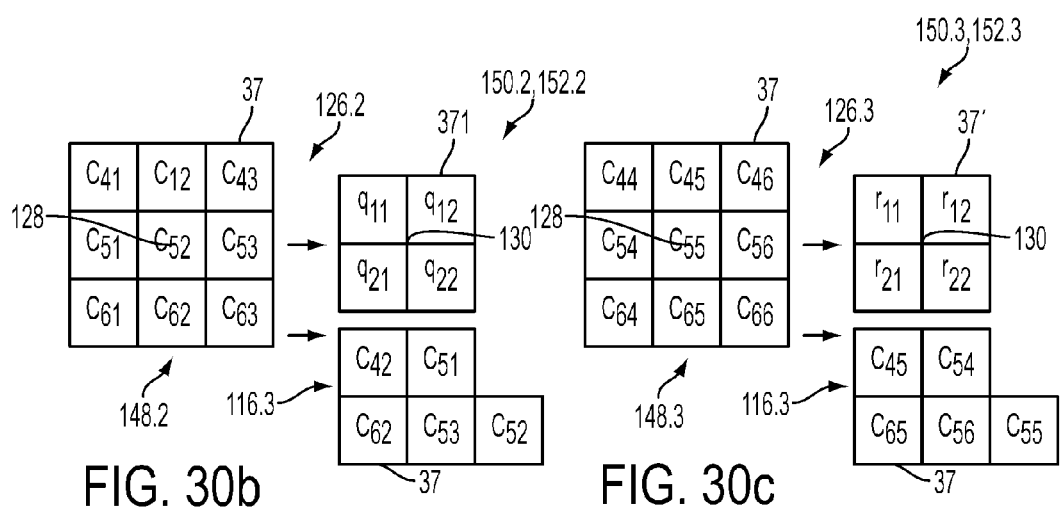
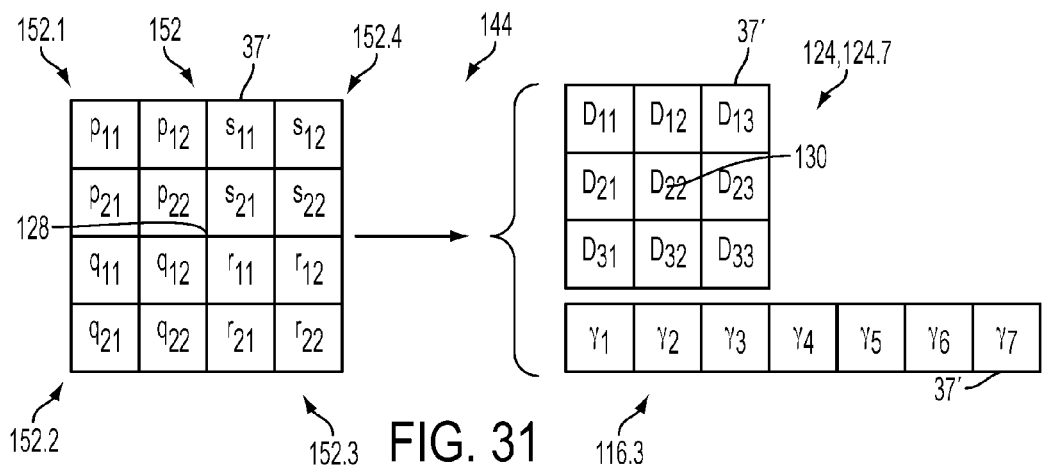

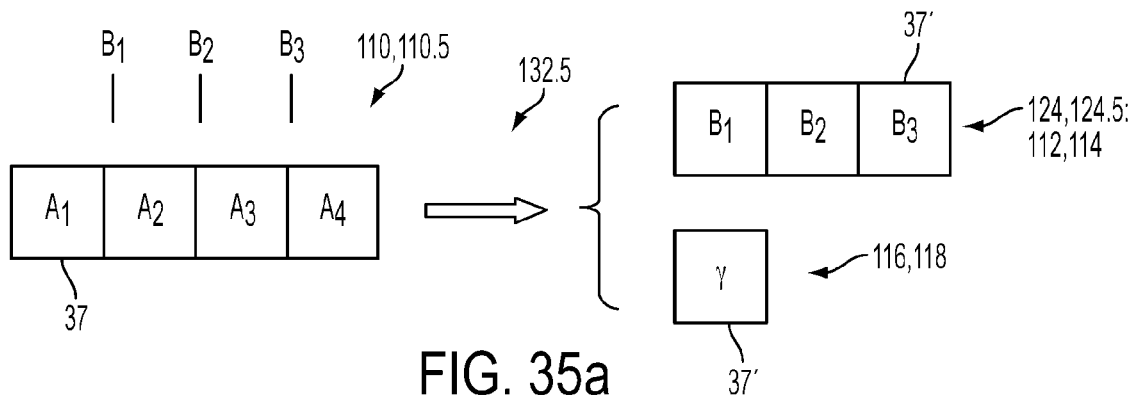
FIG. 35a
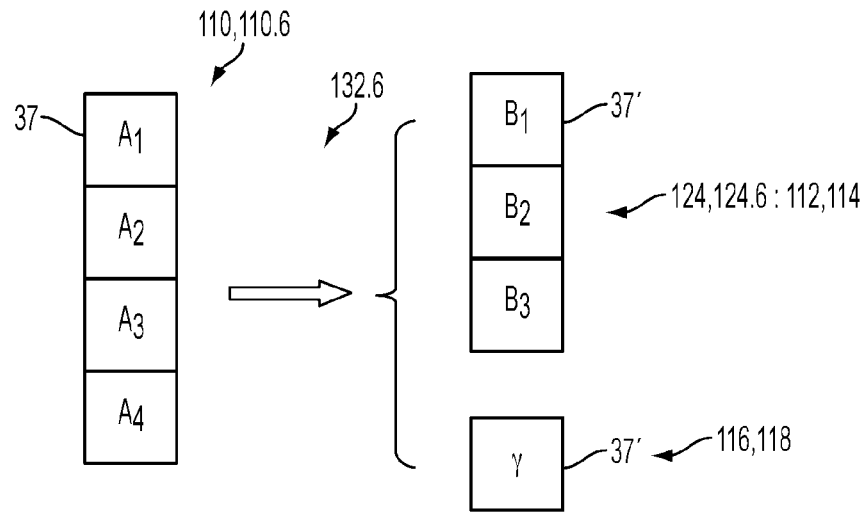
FIG. 35b
$B_1 = (\alpha A_1 + \beta A_2)/(\alpha + \beta)$
$B_2 = (A_2 + A_3)/2$
$B_3 = (\alpha A_4 + \beta A_3)/(\alpha + \beta)$
$\alpha = 4$
$\beta = 1$
$\gamma = (A_3 - A_2 + \mu)/2$
FIG. 35c

IMAGE PROCESSING SYSTEM AND METHOD

CROSS-REFERENCE TO RELATED APPLICATIONS

The instant application claims the benefit of the following prior U.S. provisional applications: U.S. Provisional Application Ser. No. 61/532,589 filed on 9 Sep. 2011, U.S. Provisional Application Ser. No. 61/577,638 filed on 19 Dec. 2011, U.S. Provisional Application Ser. No. 61/590,053 filed on 24 Jan. 2012, U.S. Provisional Application Ser. No. 61/601,080 filed on 21 Feb. 2012, and U.S. Provisional Application Ser. No. 61/658,903 filed on 12 Jun. 2012, each of which is incorporated by reference herein in its entirety.

BRIEF DESCRIPTION OF THE DRAWINGS

FIG. 5 illustrates an unmodified image in a relatively-higher-resolution display format;

FIG. 6 illustrates a modified image in accordance with the first embodiment of the process illustrated in FIGS. 3b and 4b, based upon the image illustrated in FIG. 5;

FIG. 15a illustrates a first embodiment of a one-dimensional encoding process in accordance with the third aspect of the image encoding process;

FIG. 15b illustrates a second aspect of the first embodiment of the one-dimensional encoding process in accordance with the third aspect of the image encoding process;

FIG. 16 illustrates a second embodiment of a one-dimensional encoding process in accordance with the third aspect of the image encoding process;

FIG. 17a illustrates a first embodiment of a two-dimensional encoding process in accordance with the third aspect of the image encoding process FIG. 17b illustrates a set of interpolation equations associated with the first embodiment of the two-dimensional encoding process illustrated in FIG. 17a;

FIG. 18a illustrates a first embodiment of a one-dimensional decoding process in accordance with the third aspect of the image encoding process, for decoding an image encoded in accordance with the first embodiment of the one-dimensional encoding process illustrated in FIG. 15a;

FIG. 18b illustrates a second embodiment of a one-dimensional decoding process in accordance with the third aspect of the image encoding process, for decoding an image encoded in accordance with the second embodiment of the one-dimensional encoding process illustrated in FIG. 16;

FIG. 18c illustrates a set of equations associated with the first and second embodiments of the one-dimensional decoding processes illustrated in FIGS. 18a and 18b;

FIG. 19a illustrates a first embodiment of a two-dimensional decoding process in accordance with the third aspect of the image encoding process, for decoding an image encoded in accordance with the first embodiment of the one-dimensional encoding process illustrated in FIG. 17a;

FIG. 19b illustrates a set of equations associated with the first embodiment of the two-dimensional decoding processes illustrated in FIG. 19a;

FIG. 24a illustrates a second embodiment of a two-dimensional encoding process in accordance with the third aspect of the image encoding process;

FIG. 24b illustrates details of a second embodiment of a two-dimensional encoding process in accordance with the third aspect of the image encoding process illustrated in FIG. 24a;

FIG. 24c illustrates a set of interpolation equations associated with the second embodiment of the two-dimensional encoding process illustrated in FIG. 24a;

FIG. 25a illustrates a third embodiment of a one-dimensional decoding process in accordance with the third aspect of the image encoding process, for decoding an image encoded in accordance with the third embodiment of the one-dimensional encoding process illustrated in FIG. 22a;

FIG. 25b illustrates a fourth embodiment of a one-dimensional decoding process in accordance with the third aspect of the image encoding process, for decoding an image encoded in accordance with the fourth embodiment of the one-dimensional encoding process illustrated in FIG. 23;

FIG. 25c illustrates equations associated with the third and fourth embodiments of the one-dimensional decoding processes illustrated in FIGS. 25a and 25b;

FIG. 26 illustrates a second embodiment of a two-dimensional decoding process in accordance with the third aspect of the image encoding process, for decoding an image encoded in accordance with the first embodiment of the one-dimensional encoding process illustrated in FIG. 24a;

FIGS. 30a-d illustrate first through fourth portions of a first intermediate process for determining the set of interpolation equations associated with the third embodiment of the two-dimensional encoding process illustrated in FIG. 29;

FIG. 31 illustrates a second intermediate process for determining the set of interpolation equations associated with the third embodiment of the two-dimensional encoding process illustrated in FIG. 29;

FIG. 35a illustrates a fifth embodiment of a one-dimensional encoding process in accordance with the third aspect of the image encoding process;

FIG. 35b illustrates a sixth embodiment of a one-dimensional encoding process in accordance with the third aspect of the image encoding process;

FIG. 35c illustrates a set of equations associated with the fifth and sixth embodiments of the one-dimensional encoding process illustrated in FIGS. 35a and 35b;

FIG. 36a illustrates a fifth embodiment of a one-dimensional decoding process in accordance with the third aspect of the image encoding process, for decoding an image encoded in accordance with the fifth embodiment of the one-dimensional encoding process illustrated in FIG. 35a;

DESCRIPTION OF EMBODIMENT(S)

Figure 1:
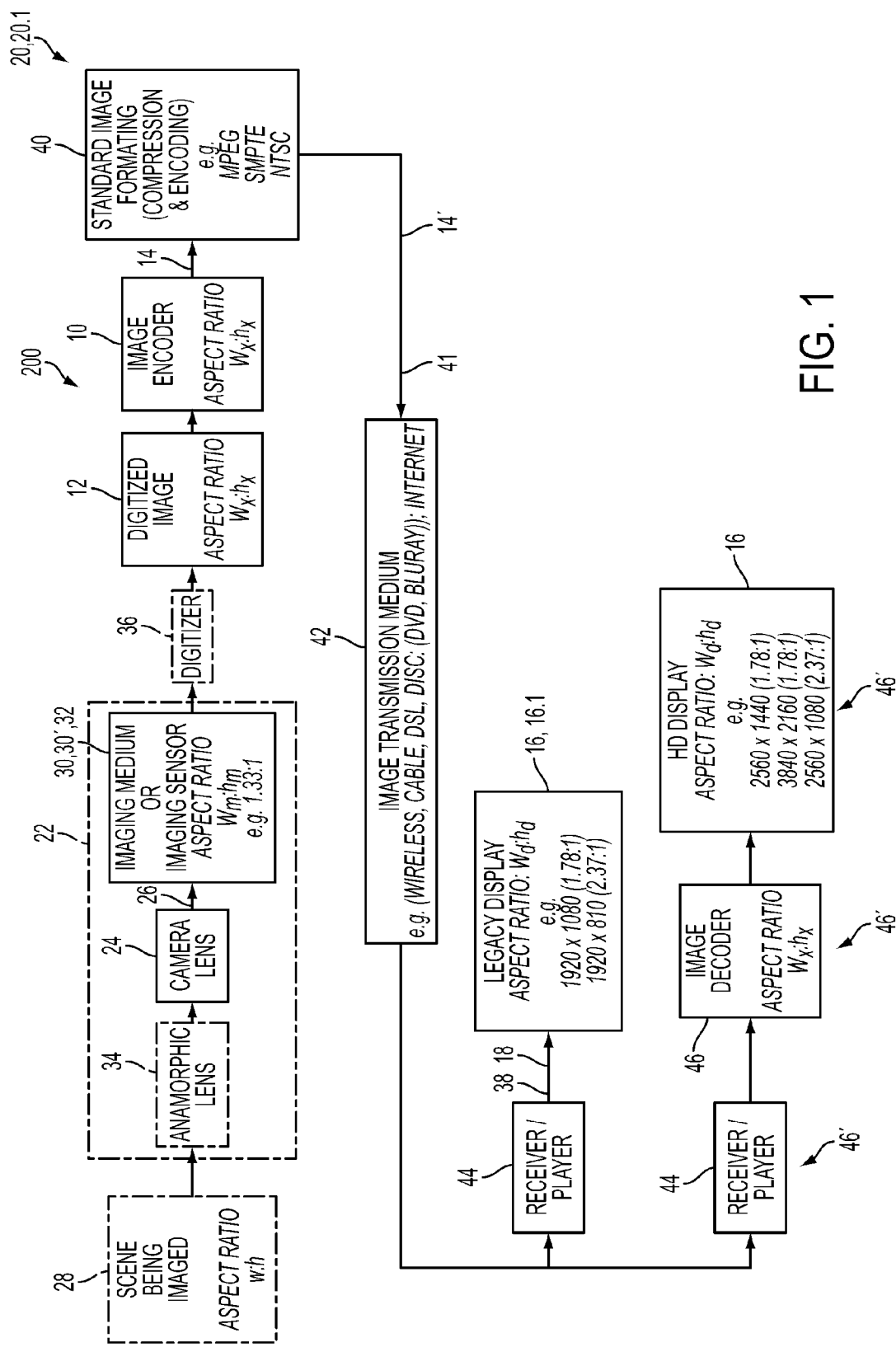
FIG. 1 illustrates a block diagram of a first aspect of a system for generating, transmitting and displaying encoded images.

Referring to FIG. 1, an image encoder 10 provides for reformatting a relatively-higher-resolution digitized image 12 into an encoded image 14 that can be displayed on various displays 16 having a variety of different display formats, including on a legacy display 16.1 having a relatively-lower-resolution display format 18, without requiring the encoded image 14 to be decoded in order to be displayed on the legacy display 16.1.

For example, in accordance with a first aspect of a system for generating, transmitting and displaying encoded images 20.1, the relatively-higher-resolution digitized image 12 is initially captured by a camera 22 that incorporates an associated camera lens 24 that provides for focusing a raw image 26—of an associated scene 28 being imaged—onto either an imaging medium 30—for example, film, for example, 35 millimeter film 30' as used for recording cinematic movies—or an imaging sensor 32—for example, and array of photo-detectors, for example, a CCD imaging sensor.

The aspect ratio of an image is given by the ratio of the width to the height of the image. A wide range of aspect ratios have been used in systems for generating and displaying images, and different aspect ratios can be used for different elements of such systems. For example, the aspect ratio of 35 millimeter film 30' is typically 1.33:1, or a ratio of 4:3, based upon a standard originally established by Thomas Edison. This same 1.33:1 aspect ratio has been used in the National Television System Committee (NTSC) standard for analog televisions. However, a wider aspect ratio is generally considered to be more aesthetically pleasing. For example, many major motion pictures are created in an image aspect ratio of approximately 2.37:1. When recording an image having an aspect ratio different from that of the imaging medium 30 or imaging sensor 32, an anamorphic lens 34 can be used in cooperation with the camera lens 24 so as to shrink or expand the raw image 26 in one direction or the other so as to use substantially all of the active portion of the imaging medium 30 or imaging sensor 32, so as to provide for better image resolution and a better associated overall signal-to-noise ratio. The original aspect ratio of a raw image 26 that was recorded anamorphically can then be recovered by using a complementary anamorphic magnification upon reconstruction thereof. A raw image 26 recorded on an imaging medium 30 can be digitized with a digitizer 36 to produce the relatively-higher-resolution digitized image 12 than would otherwise be produced directly by a corresponding imaging sensor 32.

The displays 16, 16.1 upon which the encoded image 14 is ultimately displayed exhibit a variety of formats that are generally characterized by both the associated aspect ratio and the associated resolution, the latter of which is generally expressed as the pixel dimensions of the associated two-dimensional display area, for example, W×H, where W is the number of pixels 37 in the width of the display 16, 16.1, and H is the number of pixels in the height of the display 16, 16.1. For example, one set of displays 16, 16.1 uses an aspect ratio of approximately 2.37:1—also generally referred to approximately as 21:9—with associated display resolutions, in order of increasing total number of pixels 37, of 1920×810 and 2560×1080. As another example, another set of displays 16, 16.1 uses an aspect ratio of approximately 1.78:1—also generally referred to approximately as 16:9—with associated display resolutions, in order of increasing total number of pixels 37, of 1920×1080, 2560×1440 and 3840×2160. For example, BLU-RAY DISC™ Video supports 16:9 aspect ratios with resolutions of 1920×1080, anamorphic 1920×1080, 1280×720, anamorphic 720×480, and anamorphic 720×576.

In order to display an image having a relatively higher aspect ratio without distortion on a display 16, 16.1 having a relatively lower aspect ratio, black horizontal bars are generally added at the top and bottom of the display 16, 16.1 where there is no image. For example, when a major motion picture having an aspect ratio of 2.37:1 is transferred to a high definition disc (such as a BLU-RAY DISC™ Video), black horizontal bars are added to the top and bottom of the video image so that the total area is in the format of 16:9 (or 1.78:1). This format is ideal for displaying the image in "letterbox" format on displays 16, 16.1 also having the 16:9 aspect ratio. Alternatively, when such movies are shown to the full width of a display having a 2.37:1 aspect ratio, the video image can be electronically stretched to fit the full vertical extent of the display 16, 16.1, thereby removing the black bars to show the movie in its proper format. As a second alternative, some users find the black letterbox bars so objectionable that even on a 16:9 aspect ratio display 16, 16.1 they will electronically stretch the image in both directions to overcome the black bars without otherwise distorting the aspect ratio of the image, even though the left and right sides of the image are now cut off by the width of the display 16, 16.1. However, in both cases an electronic vertical stretch of the image is simply some form of mathematical up-scaling or interpolation of each column of original pixel values into a longer (taller) column of pixel values, which otherwise does not add detail to the displayed image. However, if there is sufficient detail in the original relatively-higher-resolution digitized image 12, and if the associated display 16 is capable of displaying the additional pixels 37 associated therewith, then as described hereinbelow, the encoded image 14 provides for reconstructing the relatively-higher-resolution digitized image 12 in a form that can be rendered on that associated display 16, for example, so as to provide for vertically expanding the encoded image 14 so as to make use of the full resolution of the display 16.

Alternatively, the horizontal and vertical pixel resolution of a legacy display 16.1 may be lower than that of the relatively-higher-resolution digitized image 12, in which case, the encoded image 14 is formatted for input to the legacy display 16.1 without requiring further image processing. For example, an original image resolution of 3840×2160 pixels may be encoded into the encoded image 14, wherein the central 1920×1080 pixels—constituting an associated relatively-lower-resolution image 38—represent a lower resolution representation of the full 3840×2160 relatively-higher-resolution digitized image 12 suitable for immediate input to a legacy display 16.1 without requiring any decoding, whereas the remaining information is retained in the encoded image 14 so that the full 3840×2160 relatively-higher-resolution digitized image 12 can be reconstructed for input to a 3840×2160 display by appropriately decoding the encoded image 14. In this case, a 1920×1080 display 16, 16.1 need only directly display this relatively-lower-resolution image 38 without decoding, whereas a 3840×2160 display 16 can employ the associated decoding process to display the full resolution 3840×2160 relatively-higher-resolution digitized image 12.

The encoded image 14 is transmitted to the associated display(s) 16, 16.1 by conventional means. For example, the encoded image 14 undergoes a standard image formatting 40, for example, compression and encoding, as is conventionally used to format conventional images for transmission to associated display systems. For example, the encoded image 14 may be converted to any of a variety of formats, including but not limited to, either the MPEG-1, MPEG-2, MPEG-3 or MPEG-4 standard of the Moving Pictures Experts Group (MPEG) or the various standards of the Society of Motion Picture and Television Engineers (SMPTE). The formatted encoded image 14' is then transmitted as an image signal 41, also more generally referred to as an image representation 41, over an associated image transmission medium 42—for example, either wirelessly, by a conductive transmission line, for example, cable or DSL, by DVD or BLU-RAY DISC™, or streamed over the internet—to an associated receiver or player 44 that extracts the encoded image 14 from the formatted encoded image 14' in accordance with the associated compression and encoding standard, and then either inputs the encoded image 14 directly to a legacy display 16.1, or decodes the encoded image 14 with an image decoder 46—using an associated image decoding process 46'—for example, that could be embedded in either the receiver or player 44 or in the associated displays 16.

Figure 2:
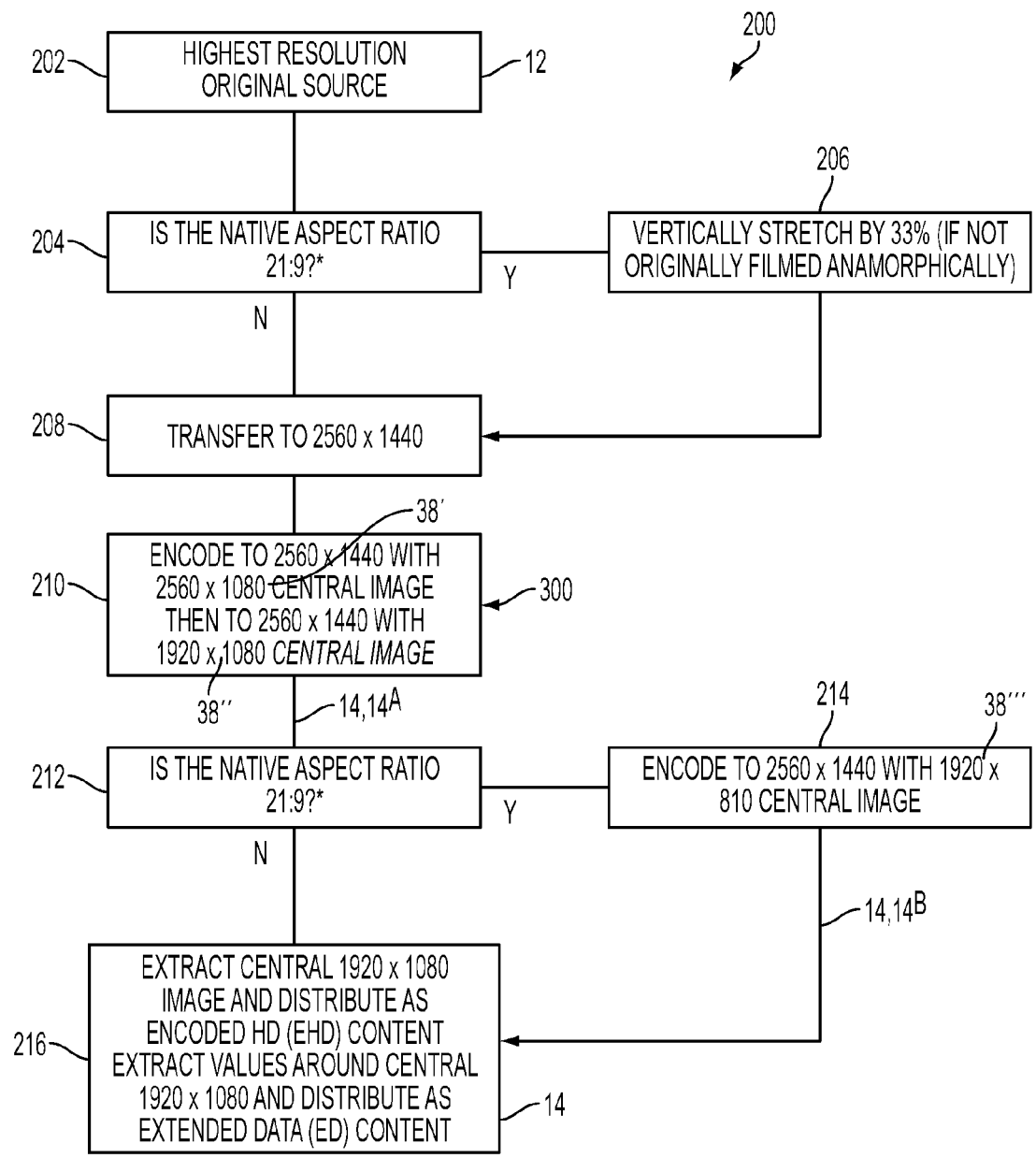
FIG. 2 illustrates a flow chart of a process of encoding images so as to provide for display on legacy displays and for conversion to a different display format for display in a different format on a different display.

Referring to FIG. 2 the encoding process 200 performed by the image encoder 10 commences with step 202 with the input of the relatively-higher-resolution digitized image 12. Then, in step 204, if the native aspect ratio of the relatively-higher-resolution digitized image 12 is about 21:9—which includes any native aspect ratio in excess of 2.30:1—then, in step 206, if the relatively-higher-resolution digitized image 12 was not originally filmed anamorphically, then the relatively-higher-resolution digitized image 12 is vertically stretched by 33% by interpolating each column of pixels 37 so as to add 33% more pixels 37, as described more fully hereinbelow. Then, or otherwise from step 204, in step 208, the image is converted to a 2560×1440 format, for example, by interpolating either the original relatively-higher-resolution digitized image 12 from step 204, or by interpolating the vertically stretched image 48 from step 206. Then, as next described, in step 210, in accordance with a one-dimensional encoding process 300, the resulting 2560×1440 intermediate image 50 is successively encoded, first vertically so as to form a 2560×1080 relatively-lower-resolution image 38', and then horizontally so as to form a 1920×1080 relatively-lower-resolution image 38", resulting in an associated 2560×1440 encoded image 14, $14^4$.

Figure 5:
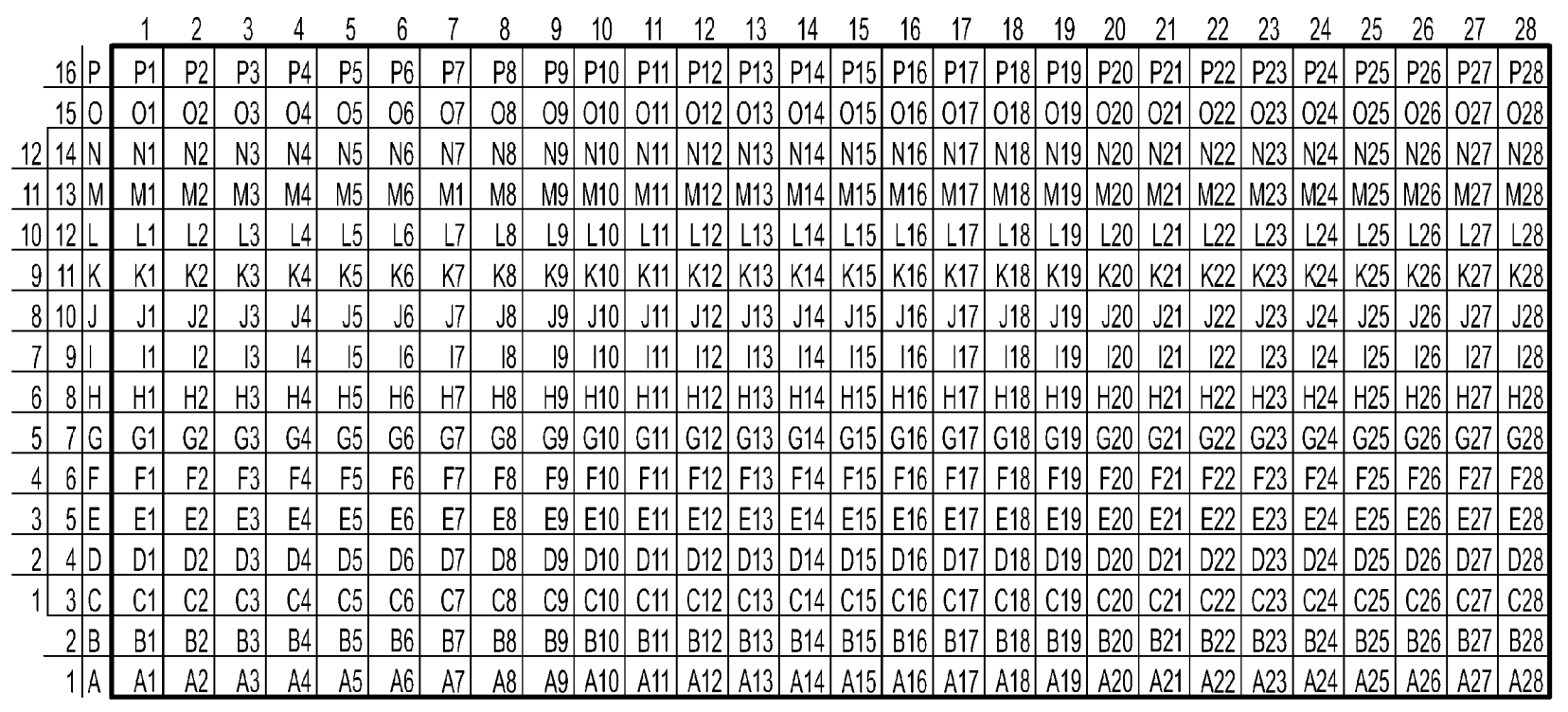
Figure 6:
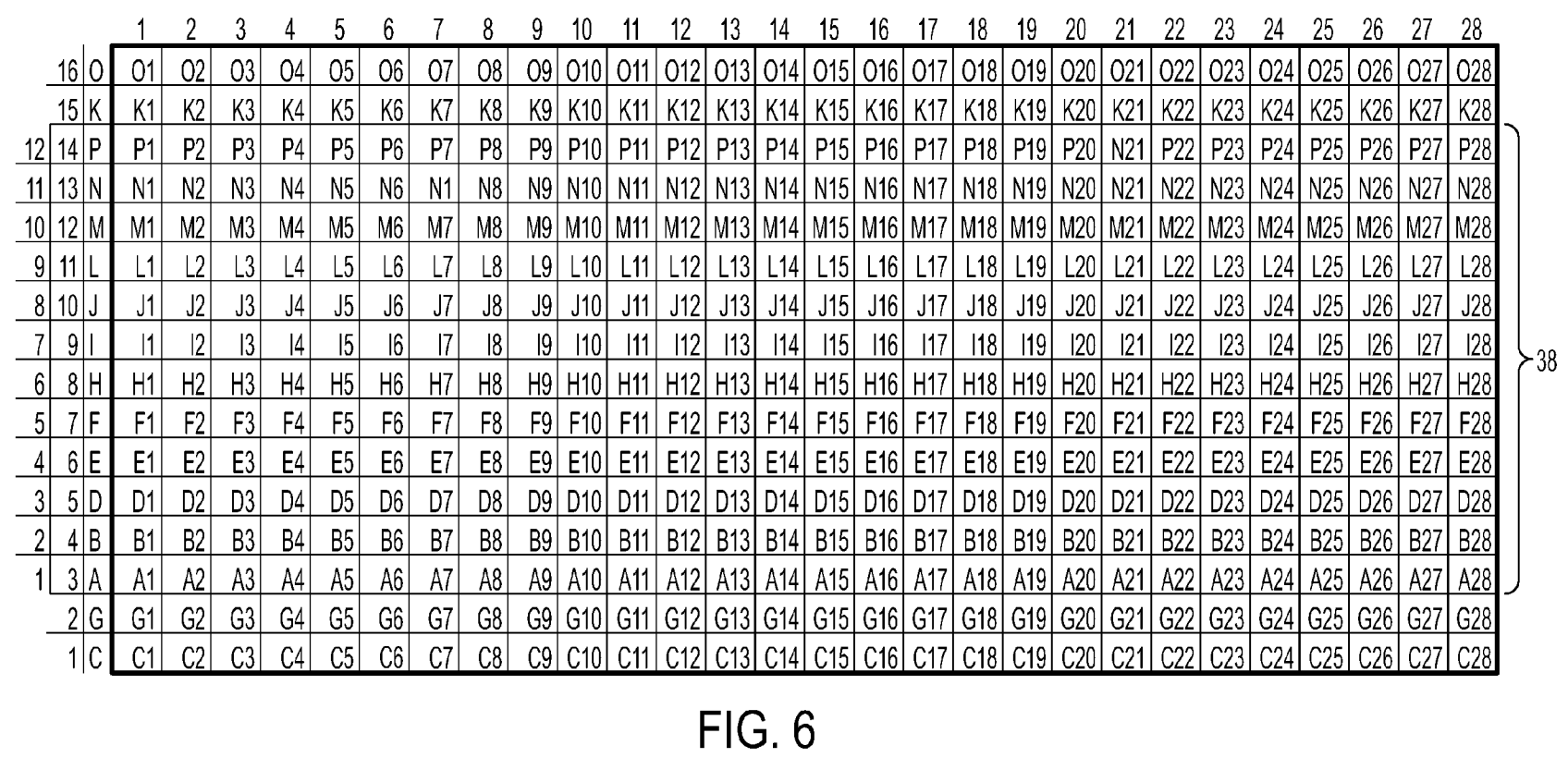

Referring to FIGS. 3a-d, 4a-d, 5 and 6, the one-dimensional encoding process 300 is illustrated using a simplified initial image space having 16 rows by 28 columns (1.75:1) of pixels 37 (448 total pixels 37). Further, consider that a first format of a desired image in this image space uses only the center 12 rows of pixels 37 (each 28 pixels wide) (2.33:1). Now consider that a second format of the desired image is a vertically stretched image using the full 16 rows of pixels 37 (again, each 28 pixels wide) (1.75:1). In accordance with the one-dimensional encoding process 300, the initial image would be constructed from the highest resolution content which, in this case, would be the second format using all 16 rows of pixels 37, for example, as illustrated in FIG. 5.

Figure 3:
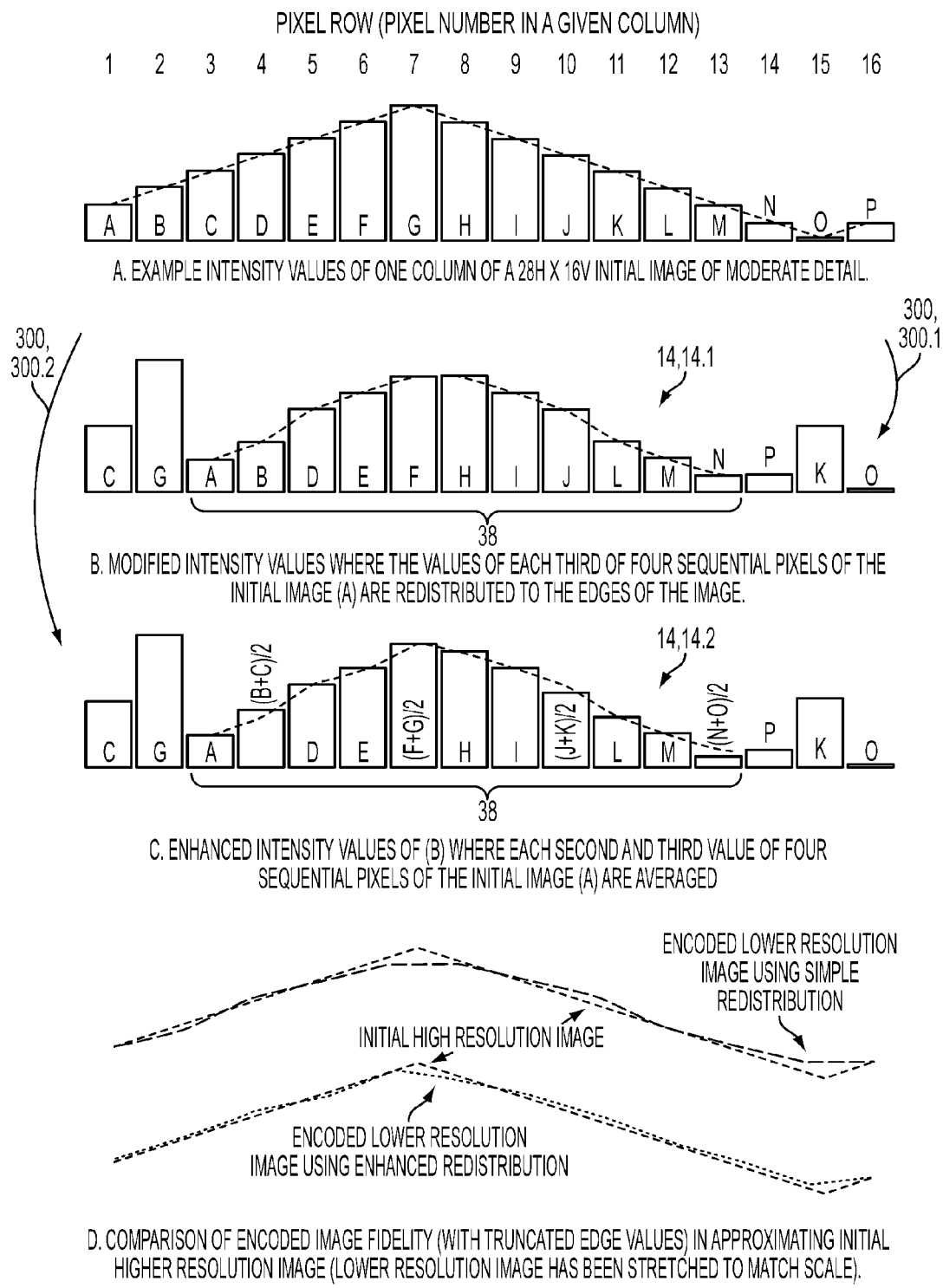
FIGS. 3a-d illustrate first and second embodiments of a one-dimensional image encoding process that provide for converting from a first relatively lower-resolution display format to a second relatively-higher-resolution display format, operating on an image of relatively lower detail.
Figure 4:
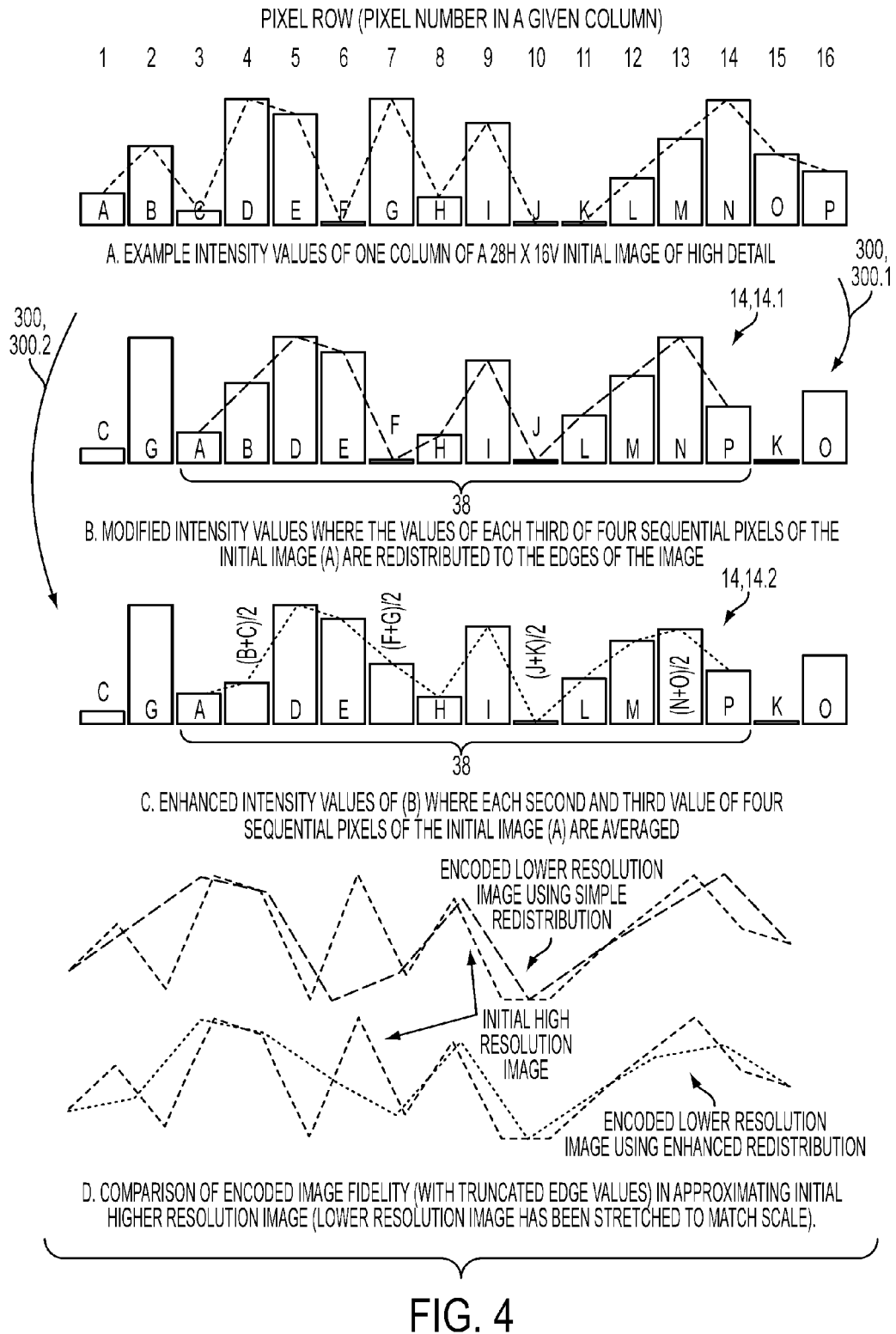
FIG. 4a-d illustrates first and second embodiments of a one-dimensional image encoding process that provide for converting from a first relatively lower-resolution display format to a second relatively-higher-resolution display format, operating on an image of relatively higher detail.

Because this example involves two different images that differ only in the vertical direction, it is sufficient to illustrate the principles of the one-dimensional encoding process 300 in this case by examining an arbitrary column of pixel values since the same process could be applied independently to any other column. Referring now to FIGS. 3a-d, an arbitrary example initial image column of 16 pixel intensity values is shown in FIG. 3a. Since the desired relatively lower-resolution encoded image 14, 14.1 comprises 12 values, in accordance with a first embodiment, the one-dimensional encoding process 300.1 removes one out of every four sequential pixels 37 of the initial image (the third of every four pixels 37 in this example). The remaining pixel values are then shifted inward to pack in the resulting vacant pixel values, leaving new pixel 37 vacancies at the edges of the image but also resulting in a central sequence of pixels 37—i.e. the relatively-lower-resolution image 38—representing a lower resolution approximation of the initial image. The removed pixel values are then reassigned to these edge vacancies. The resulting redistribution of values, shown in FIG. 3b, loses no actual image information since the number of removed initial image pixel values is equal to the edge vacancies created by the shifting of initial values toward the center of the column.

In accordance with the first embodiment of the one-dimensional encoding process 300.1, the encoded image 14, 14.1 of FIG. 3b represents an encoded representation of the initial image wherein a first region, in this case pixel values 3 through 14, represents a lower resolution representation of the initial image while a second region, in this case comprising two separate subregions defined by edge pixel values 1, 2, 15 and 16, represents information that can be used to reconstruct the initial image. Accordingly, either the relatively-lower-resolution image region, i.e. the associated relatively-lower-resolution image 38, may be displayed without any further processing, for example, while also withholding or blanking the display of the other region so those values are not distracting in the periphery, or the initial higher resolution image may be restored by reversing the encoding process so as to decode the encoded image 14.

Referring to FIG. 3c, in accordance with a second embodiment of the one-dimensional encoding process 300.2, rather than simply removing and redistributing the third of every four sequential image pixels 37 to the edge of the image, the second and third values of every four sequential image pixels 37 may be averaged to form a new pixel value to take the place of the second of four sequential pixels 37. The resulting relatively lower-resolution encoded image 14, 14.2 therefore includes three pixel values for each initial sequential four pixel values of the initial image such that the central pixel value of each such three pixels 37 in the encoded image 14, 14.2 is the average of the central two values of the initial four pixel 37 sequence of the initial image. Accordingly, there are some pixel values in the coded image that do not directly represent values of the initial high resolution image. For example, the value of "B" in the initial image is not directly included in the encoded image of FIG. 3c. However, the value of (B+C)/2 and the value of C, both of which are present in the encoded image, can be used to algebraically determine the value of B. Generally, the one-dimensional encoding process 300.2 provides for creating an encoded representation of an image wherein a first region represents a lower resolution representation of the initial image; a second region or collection of subregions represents additional information that can be used in combination with the lower resolution representation and knowledge of the encoding algorithm to algebraically reconstruct the initial image, so as to provide for a mathematical redistribution of the original pixel values of an initial image to create a new encoded image having the same number of pixel values as the initial image; wherein the new encoded image contains a region within and with fewer values than the encoded image; wherein the redistributed values within the region most accurately approximate the perceived or actual content of the initial image; and wherein the redistributed values throughout the encoded image may be applied using an inverse process to restore the original pixel values of the initial image. In a mathematical sense, the redistribution of the initial image values into a new encoded image having a region representing a lower resolution approximation of the initial image ideally provides a complete system of equations and redistributed values sufficient to mathematically determine all the values of the initial image.

The one-dimensional encoding process 300 may be performed independently along different directions—height and width—of the image, and may be performed for a plurality of times in either direction, either consecutively or interleaved with respect to the direction of encoding (i.e. H, V, V or V, H, V, etc.).

Note that the encoding process may be performed in a number of sequential stages with varying algorithms as desired, each producing a smaller, lower resolution approximation of the initial image of the previous stage while at the same time producing an increased number of pixel values surrounding the increasingly lower resolution image region. The initial image would then be reconstructed by applying the appropriate inverse operation of each stage in the reverse sequence.

The one-dimensional encoding process 300—performed in one or both directions—provides a relatively lower resolution relatively-lower-resolution image 38 within the encoded image 14 that may be displayed without additional processing while ideally masking off or otherwise not displaying the peripheral pixel values for maximum aesthetic value. The resultant relatively lower resolution relatively-lower-resolution image 38 is made as representative of the higher resolution image as possible, in accordance with known algorithms in the art of image sampling. However, more complex algorithms may exhibit diminishing improvements relative to the increase in electronic processing involved to reconstruct the image.

Consider the comparison in image fidelity shown in FIG. 3d between the connected line of low resolution image values of the encoded images 14.1, 14.2 and the corresponding connected line of initial high resolution image values. The low resolution image lines have been stretched to overlay them over the high resolution image line. Even the moderate enhancement of pixel 37 averaging in the encoded image 14, 14.2 achieves so close an approximation to the initial image that it's not clear that any additional improvement would be evident in many applications where extreme detail is not present. On the other hand, referring to FIGS. 4a-d, an analysis of the first 300.1 and second 300.2 one-dimensional encoding processes for an image of relatively high detail illustrates, as expected, that a highly detailed image is difficult to represent with fewer pixels 37 than the initial image because there simply aren't enough pixels 37 in the low resolution image to show abrupt changes in values between adjacent high resolution image pixels 37. A decrease in image detail whenever fewer pixels 37 are used is therefore inevitable.

Referring again to FIG. 2, after step 210, in step 212, if the if the native aspect ratio of the relatively-higher-resolution digitized image 12 is about 21:9—which includes any native aspect ratio in excess of 2.30:1—then, in step 214, the 2560×1440 encoded image 14, $14^A$ from step 210 is again encoded in vertical direction so as to form 1920×810 relatively-lower-resolution image 38′′′′, resulting in an associated 2560×1440 encoded image 14, $14^B$. Then, in step 216, if from step 212 the native aspect ratio of the relatively-higher-resolution digitized image 12 is about 21:9, then the relatively-lower-resolution image 38′′′ from step 214 is distributed as encoded HD (EHD) content and the remaining values therearound in the associated encoded image 14, $14^B$ are distributed as extended data (ED) content. Otherwise, the relatively-lower-resolution image 38″ from step 210 is distributed as encoded HD (EHD) content and the remaining values therearound in the associated encoded image 14, $14^A$ are distributed as extended data (ED) content.

Figure 7:
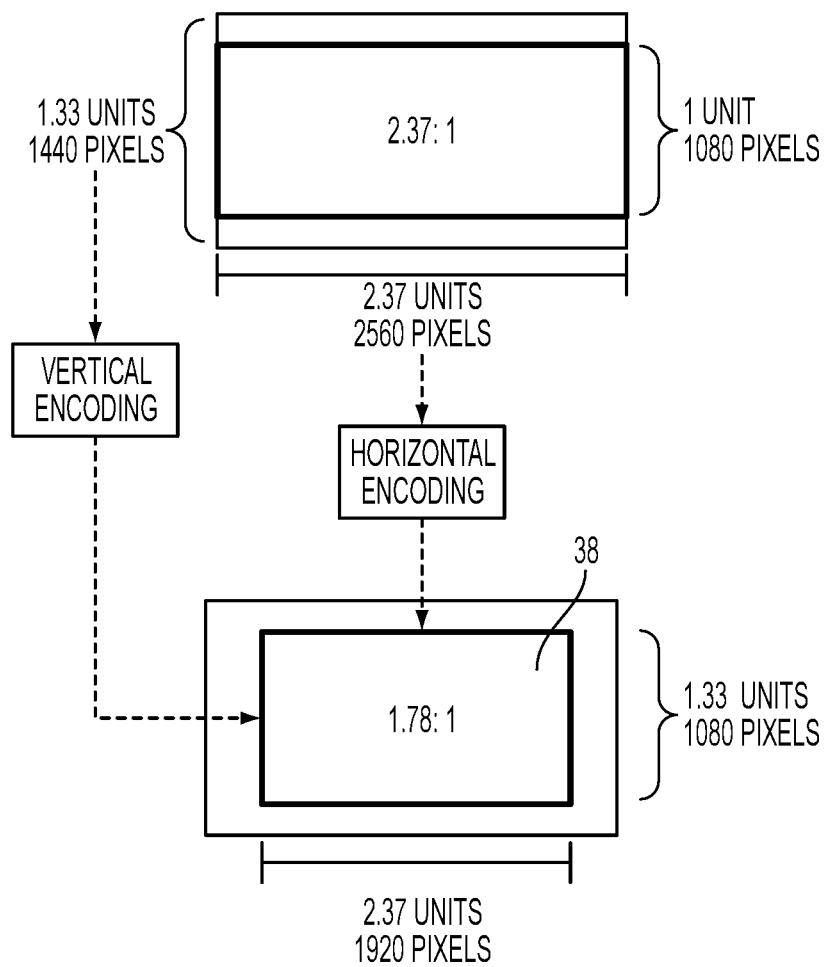
FIG. 7 illustrates a first aspect of an image encoding process.

FIG. 7 illustrates an example of a non-anamorphic relatively-higher-resolution digitized image 12 encoded using the above-described encoding process 200. Applying the encoding process 200 equally to all dimensions of an relatively-higher-resolution digitized image 12 results in a region of the initial image size with lower resolution but identical scale. For example, consider an initial image having a resolution of 2560 horizontal×1440 vertical pixels 37 and wherein the original content has a native aspect ratio of 16:9 (or 1.78:1). Applying the encoding process 200 to produce a resolution equal to 75% of the initial image in both directions results in a lower resolution image within the encoded image of 1920×1080 pixels 37 (1.78:1). Accordingly, such content could be directly shown by a native 1920×1080 display 16, 16.1 by simply displaying only the central 1920×1080 section (1.78:1) of the full 2560×1440 (1.78:1) encoded image. Alternatively, a higher resolution display 16 such as one having at least 2560×1440 pixels 37 (1.78:1) could apply the reverse or decoding algorithm to the encoded image to reconstruct the full resolution initial image.

Figure 8:
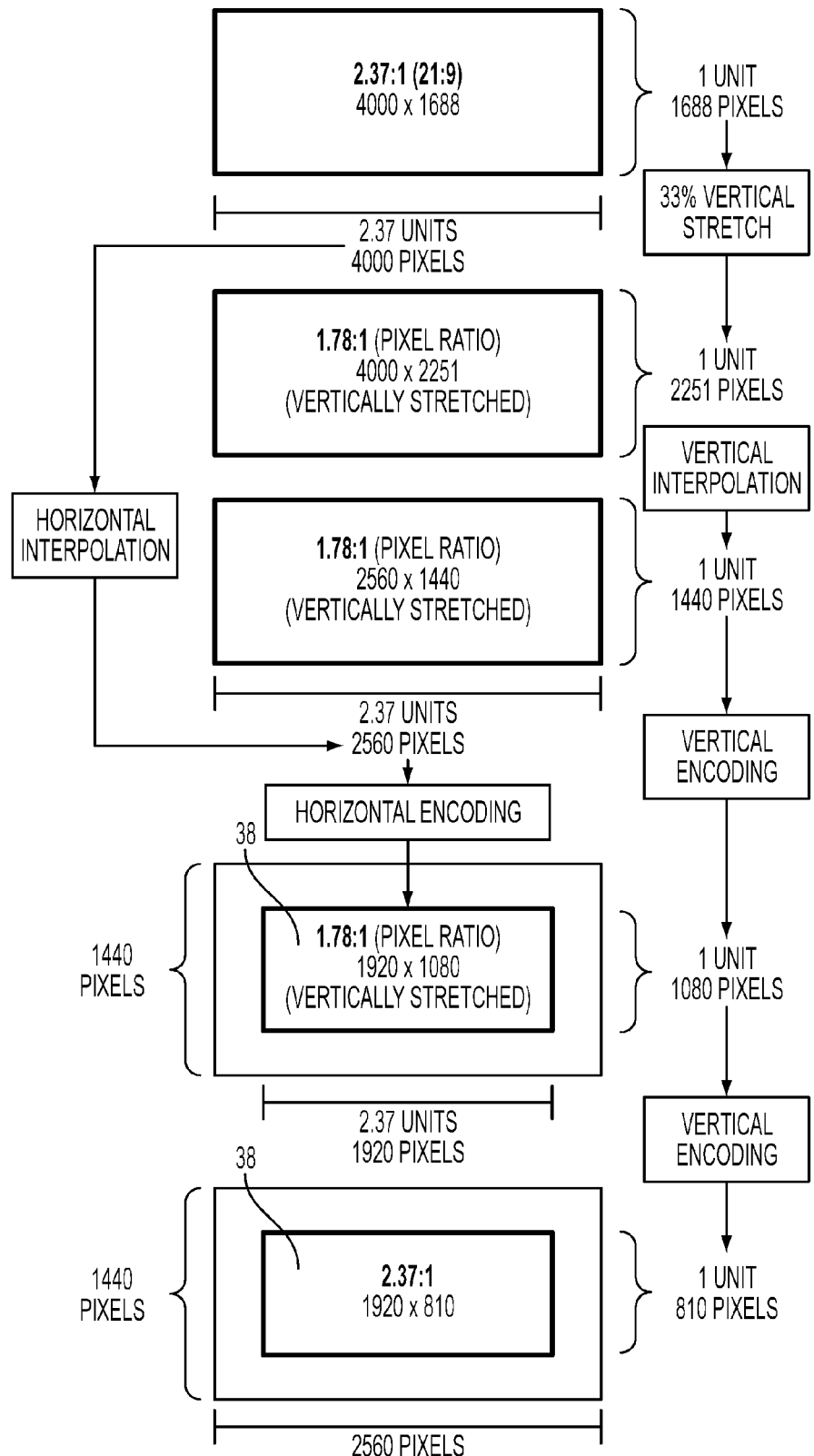
FIG. 8 illustrates a second aspect of an image encoding process.

FIG. 8 illustrates an example of a relatively-higher-resolution digitized image 12 that is encoded using the above-described encoding process 200, but anamorphically—for example, so that the resulting encoded image 14 is scaled for operation with an anamorphic display 16, for example, an anamorphic projection system. In the special case that the encoding process 200 is applied to less than, or unequally to, all dimensions of a multidimensional image, then the lower resolution image will become an anamorphic representation of the initial image. In other words, the scale of the lower resolution image in each direction of an applied encoding algorithm will be generally different than the relative scale of the initial image. For example, this can be useful for the video display of many motion pictures having an aspect ratio of approximately 2.37:1 when the corresponding aspect ratio of the transmission stream or storage medium is less, one example being the storage and playback of 2.37:1 aspect ratio movies using BLU-RAY DISCs™ (BD). The native resolution of a BLU-RAY DISC™ (BD) is 1920 horizontal×1080 vertical pixels 37 (having an aspect ratio of 1.78:1). When using the full 1920 horizontal pixels 37, a 2.37:1 aspect ratio movie will only use the central 810 of the 1080 rows of pixels 37, typically leaving the remaining 135 rows of pixels 37 above and below the image at a dark or zero value. Accordingly, a relatively-higher-resolution digitized image 12 having a native aspect ratio of approximately 2.37:1 is first produced or later modified so that the vertical dimension of the content is anamorphically stretched relative to the horizontal dimension by 33.3%. This anamorphic high resolution source material is then transferred to a total resolution of 1920×1080 pixels 37 (1.78:1) since, due to the 33.33% vertical stretch, it will now require the full 1080 rows of pixels 37 to contain the vertical dimension of the image (1.3333×810=1080). This image then becomes the initial image of the encoding process 200 illustrated in FIG. 2, wherein the full 1080 rows of image information are redistributed into the central 810 rows of the encoded image to create a lower resolution approximation of the initial image while the remaining 135 rows of pixels 37 both above and below this central image are used to store the residual pixel values of the encoding process. Effectively, the ratio of vertical resolution of the lower resolution image to that of the initial image is 75% (810/1080), or the exact inverse of the vertical stretch multiple (133.33%).

The resulting 1920×1080 encoded image can be played on standard 1920×1080 display devices. Since the source content is first formed vertically stretched by 33% before creating the initial image and since the lower resolution region of the encoded image is vertically scaled by the inverse amount, the visual result of the lower resolution image has a final aspect ratio of 2.37:1. The simple instruction to the display 16.1 of blanking or turning off the 135 rows of pixels 37 above and below the relatively-lower-resolution image 38 effectively provides an image of 1920×810 pixels 37 of, in one set of embodiments, substantially similar quality to the 1920×810 image of 2.37:1 movies provided by conventional transmission and storage media, including BLU-RAY DISCs™ However, in this case encoded values within the 1920×810 image combined with the additional values within the remaining 270 rows can be employed using the inverse process of the encoding algorithm to restore the full 1920×1080 anamorphic image with a significant increase in vertical resolution (33.33%) for those display systems which can take advantage of this improvement in image quality. In particular, such display systems may include a 1920×1080 (1.78:1) projector fitted with an anamorphic lens to optically reformat the 1920×1080 (1.78:1) decoded image into the 2.37:1 aspect ratio. Such display systems may further include those with 2560 horizontal×1080 (2.37:1) vertical pixels 37, wherein the 1920 columns of pixels 37 of the initial image are electronically stretched to fill the 2560 horizontal columns of pixels 37 of the display, thereby horizontally stretching the image by 133.33% to render a final image again having the 2.37:1 visual aspect ratio of the original content.

Figure 9:
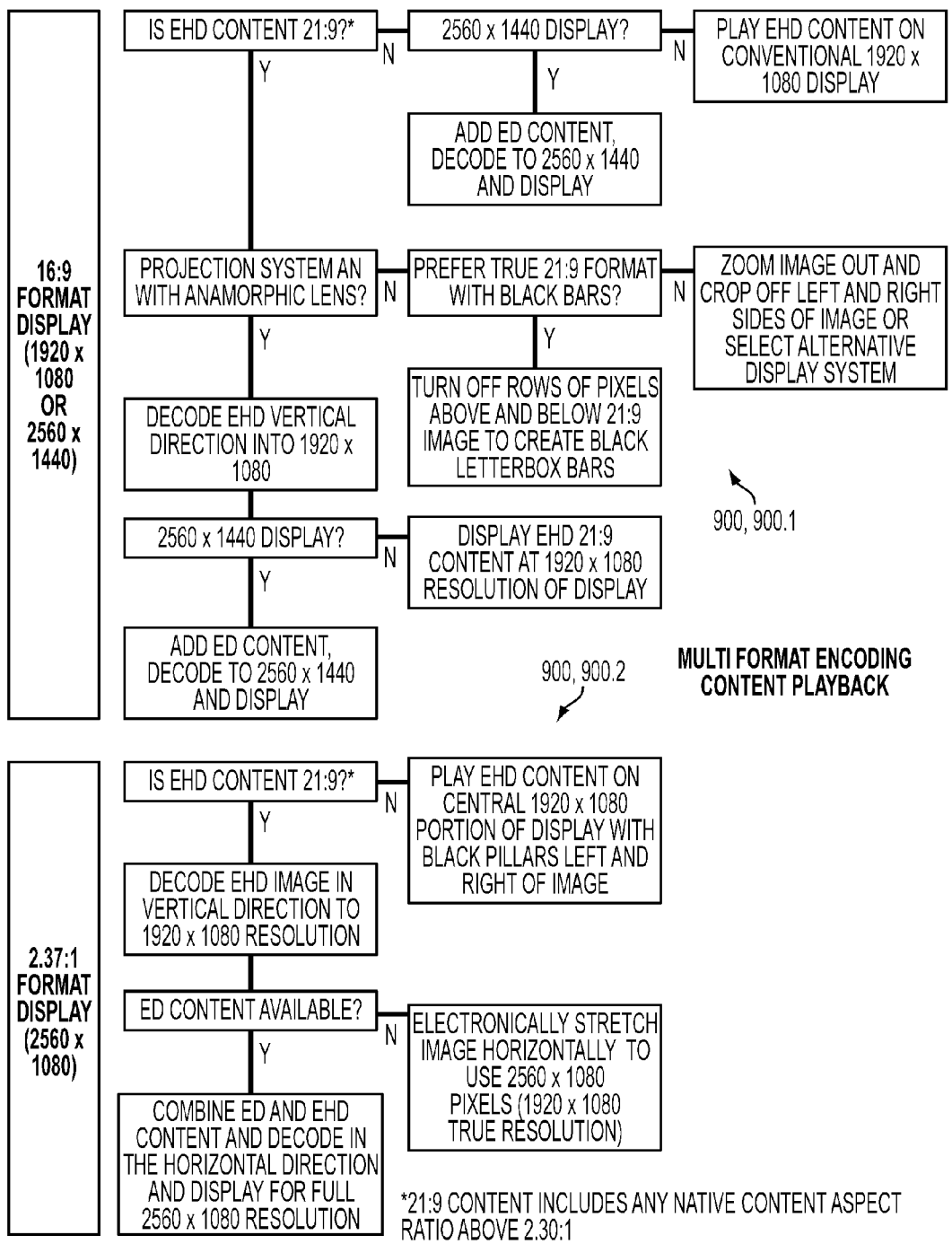
FIG. 9 illustrates a flow chart of a process of displaying images that have been encoded in accordance with the process illustrated in FIG. 2.

Referring to FIG. 9, there is illustrated a flow chart of an associated aspect-ratio-dependent decoding process 900 that provides for reconstructing the relatively-higher-resolution digitized image 12 from the corresponding encoded image 14. However, the encoded image 14 need not, and is not, decoded when viewing only the relatively lower resolution relatively-lower-resolution image 38, for example, on a legacy display 16.1. With appropriate blanking options, the encoded image is therefore fully compatible with display devices which do not provide the decoding process. However, if the full resolution of the encoded image 14 is to be viewed, the lower resolution relatively-lower-resolution image 38 values are be combined with the remaining encoded values outside the region of the relatively-lower-resolution image 38 using the decoding process 900 illustrated in FIG. 9, which is in inverse of the encoding process 200 illustrated in FIG. 2. This decoding process 900 is essentially an algebraic or mathematical solution for each initial image value which may include such operations as addition; subtraction; direct substitution; or multiplication or division by factors of two; all of which are very simple to perform, especially with digital logic in the case of typically digitally represented images. As with the encoding process 200, the decoding process 900 is dependent upon the aspect ratio of the relatively-higher-resolution digitized image 12. For example, a first decoding process 900.1 is illustrated for the 16:9 aspect ratio, and a second decoding process 900.2 is illustrated for the 2.37:1 aspect ratio, consistent with the corresponding delineation in the above-described encoding process 200.

The decoding process 900 may be readily incorporated into the image processing hardware components and/or software of a variety of devices including but not limited to displays, set top content boxes, BLU-RAY DISC™ and similar media players, computer systems, gaming consoles, dedicated image processors, video distribution and storage systems and even handheld devices. Furthermore, such devices may further include a capability of receiving and/or storing one or more separate segments of an initial image, one of which includes the relatively-lower-resolution image 38, and where such segments may potentially arrive at different times and/or through different communication methods, and then recombining these segments in synchronization and with sufficient data to apply the appropriate decoding algorithm and to therefore recreate the initial high resolution image. Such segments may each arrive, for example, through individual optical discs (such as a BLU-RAY DISC™) or streaming content. In the case of the relatively-lower-resolution image 38 residing on one optical disc and the remaining encoded values of the encoded image arriving on a second optical disc, a synchronized dual optical disc player provides for reading both discs in synchronization to decode the respective encoded values and therefore to reconstruct the relatively-higher-resolution initial image in real time without the need for storage of any segment.

Figure 10:
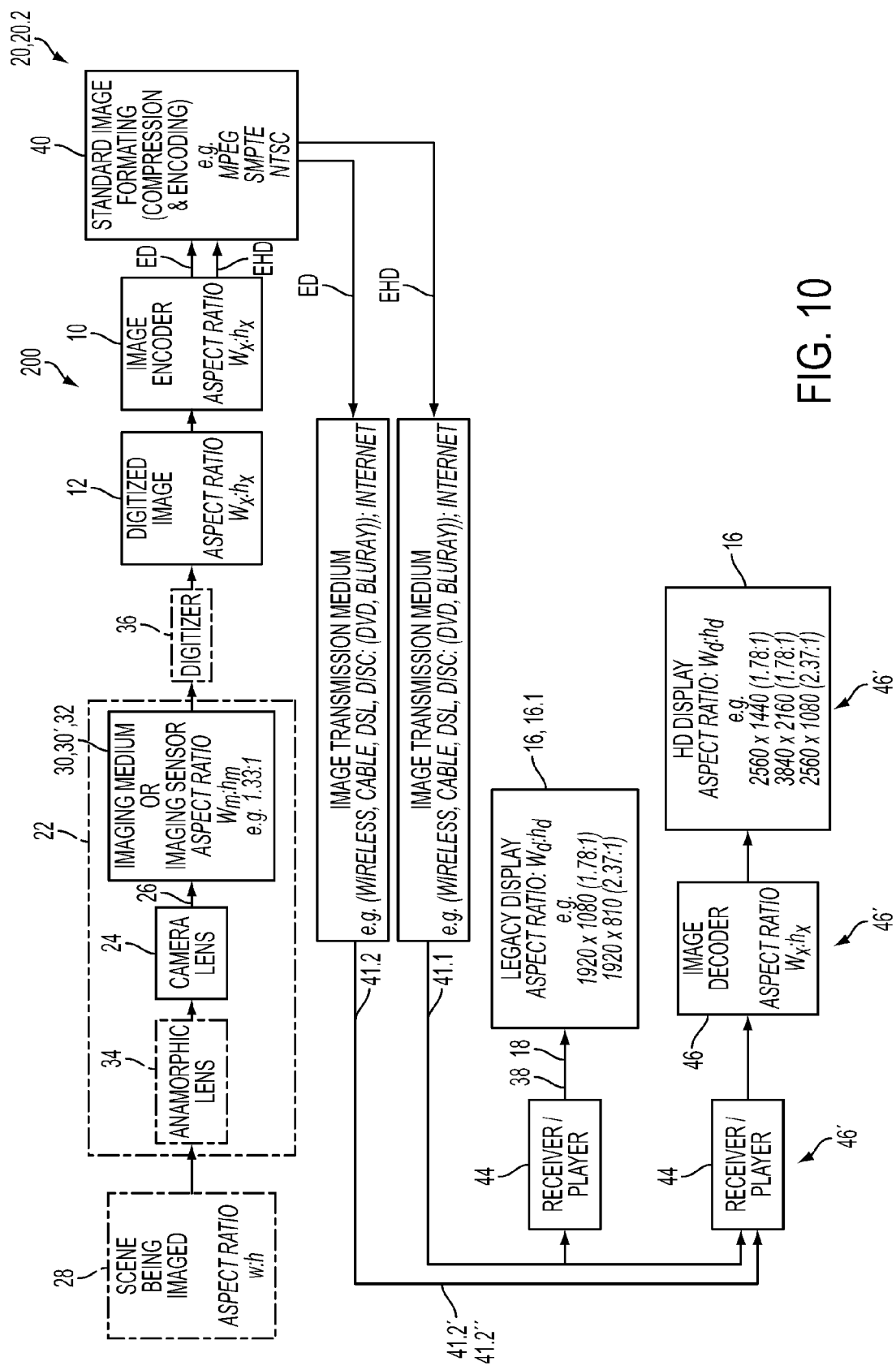
FIG. 10 illustrates a block diagram of a second aspect of a system for generating, transmitting and displaying encoded images.

Referring to FIG. 10, the encoding process 200 provides for producing a region of redistributed values representing a lower resolution approximation of the initial image (i.e. encoded HD (EHD) content) along with additional encoded values (i.e. extended data (ED) content) that can later be used with the corresponding encoded HD (EHD) content to reconstruct or decode the initial image. In some applications in which the display resolution or in which the transmission or transportation of the image is limited to this lower resolution approximation, it may be desirable to separate the encoded image 14 into the lower resolution region values (i.e. encoded HD (EHD) content) and the remaining set of encoded values (i.e. extended data (ED) content)—each of which is transmitted separately as a separate image signal 41.1, 41.2—since they are entirely independent of each other until decoding is called for. As long as the lower resolution image and its corresponding remaining encoded values can be synchronized at a later time to provide the complete set of encoded image values then a resulting reconstructed initial image will be the same regardless of whether the encoded HD (EHD) content and the encoded HD (EHD) content are sent as separate image signals 41.1, 41.2, or are combined as an encoded image 14 in a single composite image signal 41, for example, within each image frame.

Accordingly, in accordance with one example of this second aspect of a system for generating, transmitting and displaying encoded images 20.2, a relatively-higher-resolution digitized image 12 with a native aspect ratio of 16:9 is transferred to an initial image of 2560 columns×1440 rows of pixels 37 (1.78:1). The encoding process is then applied to both dimensions of the image to create a centralized, lower resolution image of 1920 columns×1080 rows of pixels 37 (1.78:1). Because this example applies the same 75% scaling in both directions, the lower resolution image retains the identical aspect ratio of the initial image. The relatively-lower-resolution image 38 (i.e. the encoded HD (EHD) content) may further be communicated and displayed without the additional encoded values (i.e. the extended data (ED) content) through conventional means of HDTV, such as using a BLU-RAY DISC™ for storage and a 1920×1080 (1.78:1) TV for display. The additional encoded values (i.e. the extended data (ED) content) that, in this case, surround the relatively-lower-resolution image 38 in the encoded higher resolution image, may be communicated by a separate means. In this case there are fewer pixel values representing the additional encoded image (i.e. the extended data (ED) content) than in the relatively-lower-resolution image 38 (i.e. the encoded HD (EHD) content). Therefore, the entire additional information can also be communicated through conventional means of HDTV, such as using a second BLU-RAY DISC™ or using streaming technology. Accordingly, a display capable of presenting a higher resolution such as 2560×1440 (1.78:1) pixels 37 can be accompanied by an electronic processing capability to receive both sets of communications to rebuild the full encoded image 14 and subsequently decode this image to create the 2560×1440 (1.78:1) initial relatively-high-resolution image.

The one-dimensional encoding process 300 provides for independently encoding and/or decoding in multiple dimensions. For example, upon receiving the relatively-lower resolution 1920×1080 (1.78:1) image 38 plus sufficient remaining encoded values (i.e. the extended data (ED) content), an alternative display solution may be to decode only in the horizontal direction, so as to produce a relatively-higher-resolution image of 2560×1080 (2.37:1) that can be shown on a display 16 of the same resolution. In this case of course, the content will be horizontally stretched. However, for some users this wider aspect ratio has value that makes up for the fact that the image is distorted.

In accordance with another aspect, the relatively-lower-resolution image 38 of the encoded image 14 is sent first and immediately followed by the remaining pixel values (i.e. the extended data (ED) content), of the encoded image. However, in this embodiment, the receiving display may either allow this process to continue, decoding the two packets of information as they come in, or the display 16 (or accompanying device) may at any time direct the sending device to exclude the additional information packet due to bandwidth limitations or due to the user directing the display to discontinue processing the information to reconstruct the initial image. In many cases, especially relying on wireless communications, the bandwidth of those communications may vary. Accordingly, this provides for at least the relatively-lower-resolution image 38 to be communicated and displayed during low bandwidth availability but then switched to the higher resolution initial image when bandwidth availability is higher and/or when the user desires a higher resolution image.

The image encoder 10 provides an encoded image which can be shown either as a low resolution representation of the initial image or, with appropriate decoding, as the higher resolution initial image itself. If raw pixel values of the extended data (ED) content outside the relatively-lower-resolution image region are displayed without decoding, those displayed values will typically appear as visual noise. Accordingly, these pixel values should be suppressed by the display 16, 16.1 or by an intermediate device. A simple method of performing such suppression is to allow the user the ability to effectively adjust the extent of black image bars on the display 16, 16.1 until only the relatively-lower-resolution image 38 is shown. With typical content such as video, the size of the relatively-lower-resolution image 38 is a constant for the entire content, so the extent of such black bars need only be adjusted at the beginning of the viewing experience. However, the size and aspect ratio of the relatively-lower-resolution image 38 may be encoded within an information frame typically placed at the beginning of the content. The display 16, 16.1 or intermediate device may therefore interpret this basic information and automatically turn off the pixels 37 outside the relatively-lower-resolution image region.

For example, an initial image of 1920 columns×1080 rows of pixels 37 (1.78:1) formed by transferring a movie with a native aspect ratio of 2.37:1 but produced with a 33.33% vertical (anamorphic) stretch, employs the full resolution of 1920×1080 (1.78:1). An encoded image 14 can now be produced by applying the encoding algorithm only in the vertical direction to produce a lower resolution image of 1920 columns×810 rows of pixels 37 (2.38:1), leaving the 135 rows of pixels 37 above and below the lower resolution image for redistributed pixel values to support later reconstruction of the higher resolution initial image. Since the entire encoded image is in the standard resolution of HDTV, it could simply be shown on a standard 1920×1080 (1.78:1) HDTV display 16, 16.1. However, if all the pixel values of the encoded image are shown then there will be 135 rows above and below the lower resolution image which will appear as noise. Therefore, the HDTV display 16, 16.1 or some intermediate device would allow the 135 rows above and below the lower resolution image to be turned off as a setting either selected by the user or automatically selected by the display 16, 16.1 or the intermediate device based on initial information provided by the content.

Note again that since the above example considers 2.37:1 content anamorphically stretched before encoding, the relatively-lower-resolution image 38 of the encoded image 14 (i.e. within the 810 central rows of 1080 total rows) will be of the proper 2.37:1 aspect ratio when displayed on the 1920×1080 (1.78:1) display 16, 16.1. The blanking process applied to the 135 rows above and below the relatively-lower-resolution image 38 effectively just creates the standard "letter-boxed" appearance of a conventional HDTV showing native 2.37:1 content.

The above-described encoding process 200 and associated decoding process 900 can help establish a market for displays 16 having higher resolution than the HDTV resolution of 1920×1080 pixels 37, by enabling a single content source to support both 1920×1080 pixel imaging without encoding and also relatively-higher-resolution imaging when used in cooperation with the decoding process 900, so as to provide for developing a content base that can support the market development of higher resolution displays 16.

Although the relatively-lower-resolution image 38 has been illustrated centered in the associated encoded image 14, it should be understood that the relatively-lower-resolution image 38 could be located anywhere within the associated encoded image 14. Furthermore, there may be certain applications, such as stereo three-dimensional imaging, for which there may be a plurality of relatively-lower-resolution image 38 associated with a common encoded image 14.

Figure 11:
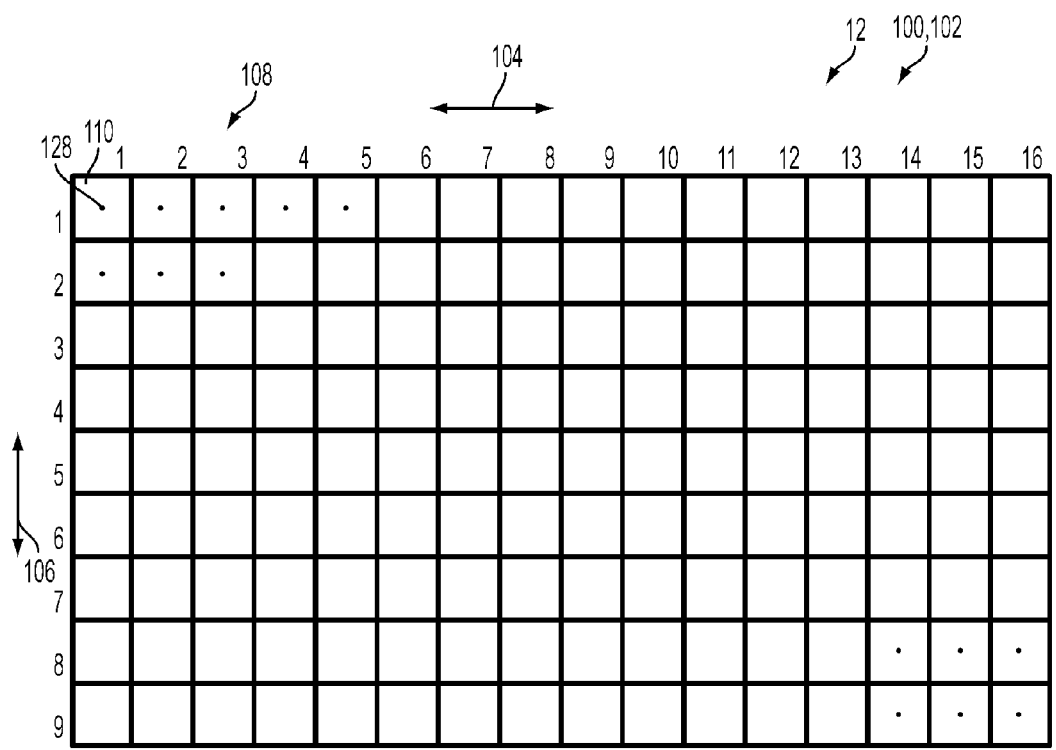
FIG. 11 illustrates a relatively-higher-resolution digitized image comprising a plurality of pixels organized into a plurality of first kernel arrays in accordance with a third aspect of an image encoding process.

Referring to FIG. 11, in accordance with a third aspect of an image encoding process, a relatively-higher-resolution digitized image 12 comprises a first plurality 100 of uniformly spaced pixels 37 that are arranged in a first two-dimensional array 102, with the width of the relatively-higher-resolution digitized image 12 along a first dimension 104 of the first two-dimensional array 102, and a height of the relatively-higher-resolution digitized image 12 along a second dimension 106 of the first two-dimensional array 102. The first plurality of pixels 100, 37 are organized within the first two-dimensional array 102 as a second two-dimensional array 108 of first kernel arrays 110, each first kernel array 110 comprising either a one- or two-dimensional array of uniformly spaced pixels 37, wherein all of the first kernel arrays 110 are of the same size and dimensionality.

Figure 12:
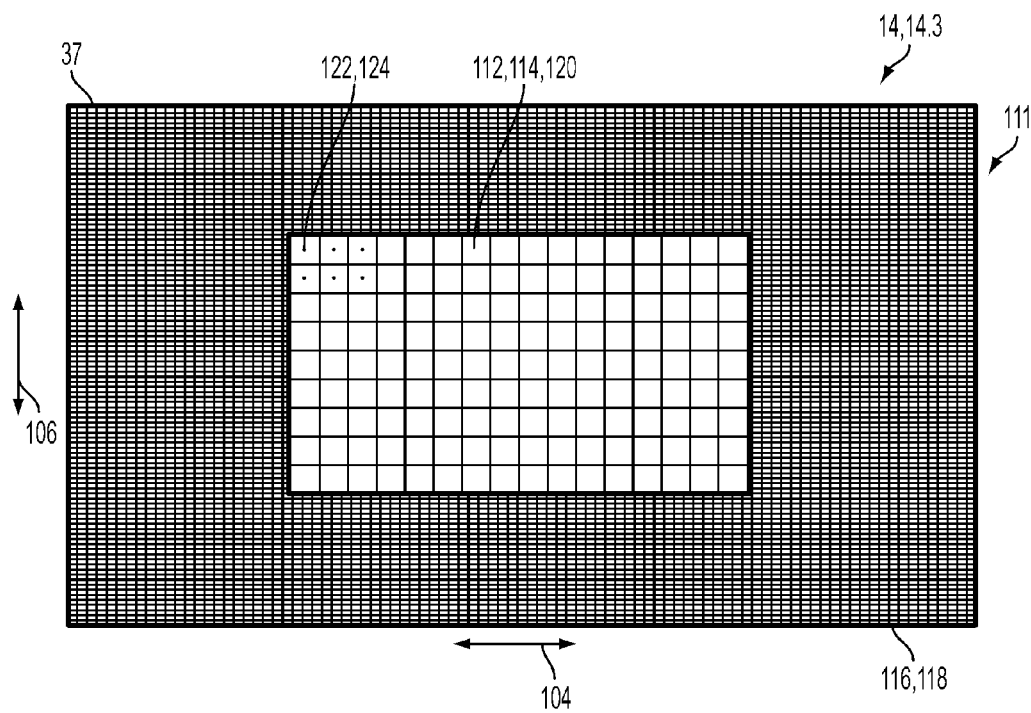
FIG. 12 illustrates a first embodiment of an encoded image in accordance with the third aspect of the image encoding process.

Referring to FIG. 12, in accordance with the third aspect of the image encoding process, the first plurality of pixels 100, 37 are transformed into a first embodiment of an encoded image 14.3 that is encoded within a third two-dimensional array 111 comprising a first group 112 of a second plurality of pixels 114 and a second group 116 of a third plurality of pixels 118. In accordance with one set of embodiments, the first group 112 of the second plurality of pixels 114 is contiguous and arranged in a fourth two-dimensional array 120 so as to provide for displaying a representation of the digitized image with relatively lower resolution relative to that of first plurality of pixels 100, 37 in the first two-dimensional array 102, and the first 112 and second 116 groups of the second 114 and third 118 pluralities of pixels together provide for reconstructing the first two-dimensional array 102 of the digitized image therefrom substantially without loss of associated information. The second plurality of pixels 114 are organized within the fourth two-dimensional array 120 as a fifth two-dimensional array 122 of second kernel arrays 124 equal in number to the number of first kernel arrays 110 and in one-to-one correspondence therewith, wherein the dimensionality of each the second kernel array 124 (i.e. one-dimensional or two-dimensional) is the same as that of a corresponding the first kernel array 110, and a size of each the second kernel array 124 is less than that of the corresponding the first kernel array 110.

Figure 13:
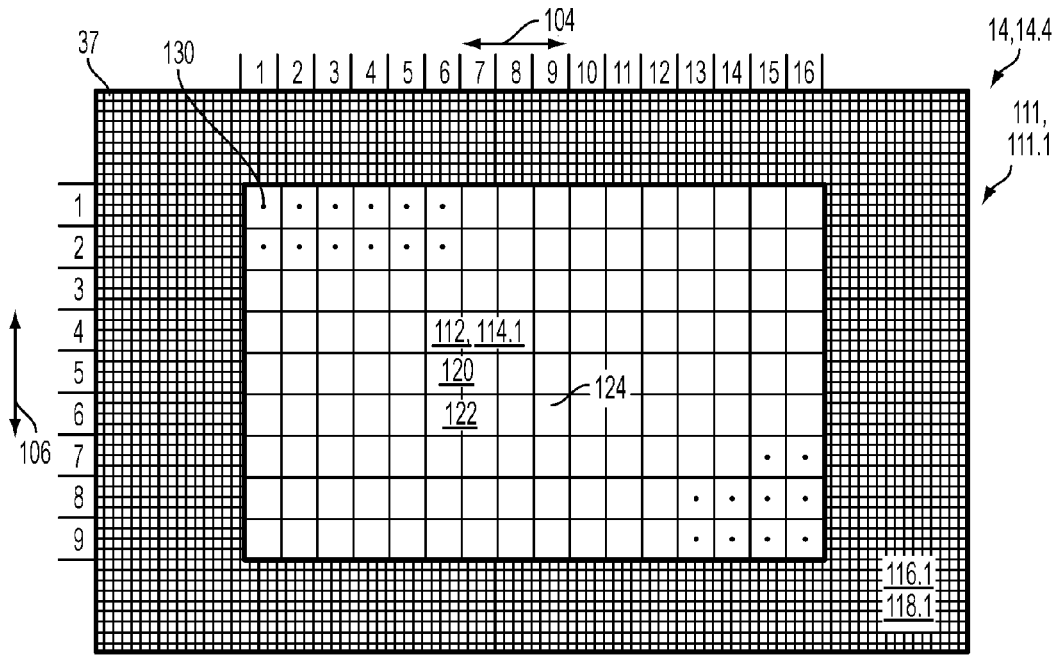
FIG. 13 illustrates a second embodiment of an encoded image in accordance with the third aspect of the image encoding process, comprising first and second groups of pixels.

For example, referring to FIG. 13, a second embodiment of an encoded image 14.4 in accordance with the third aspect of the image encoding process is encoded within a third two-dimensional array 111, 111.1 comprising respective first 112, 112.1 and second 116, 116.1 groups of respective second 114, 114.1 and third 118, 118.1 pluralities of pixels that are transformed from the first plurality of pixels 100, 37 by an associated 3-to-2 encoding process 126—illustrated in FIGS. 15*a-b*, 16 or 17*a-b*—for example, in one embodiment, by which each corresponding first kernel array 110, 110.3 of the original relatively-higher-resolution digitized image 12 comprises a 3-by-3 array of nine pixels 37 and each corresponding second kernel array 124, 124.3 of the first group 112, 112.1 of the second plurality of pixels 114 comprises a corresponding 2-by-2 array of four down-sampled pixel 37', so that along each of the first 104 and second 106 dimensions, every three pixels 37 of the first plurality of pixels 100, 37 is transformed into a corresponding two down-sampled pixels 37' of the second plurality of pixels 114, 114.1. An image signal 41 generated from the composite encoded image 14.4 provides for displaying the relatively-lower-resolution image 38 from the first group 112, 112.1 of the second plurality of pixels 114, 114.1 alone, and provides for displaying the relatively-higher-resolution digitized image 12 from both the first 112, 112.1 and second 116, 116.1 groups of second 114, 114.1 and third 118, 118.1 pluralities of pixels, in combination.

Figure 14A:
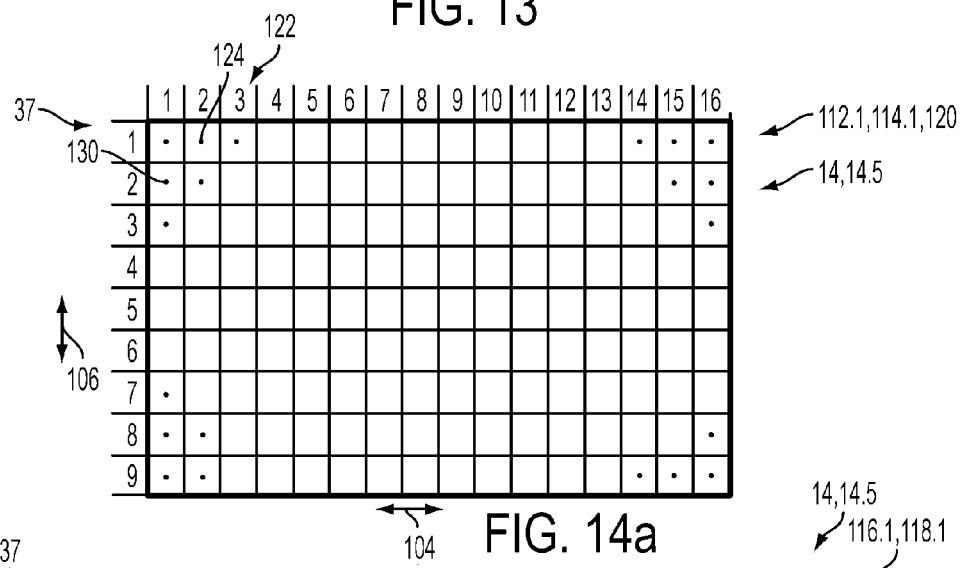
FIG. 14a illustrates a first embodiment of a first group of pixels of a relatively-lower-resolution digitized image of a third embodiment of an encoded image in accordance with the third aspect of the image encoding process.
Figure 14B:
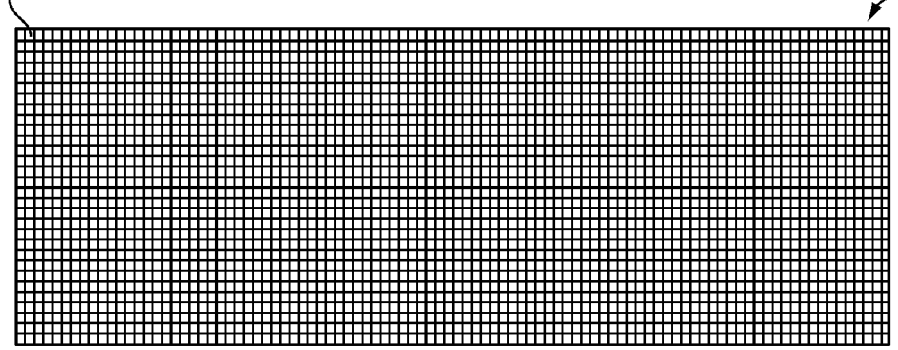
FIG. 14b illustrates a first embodiment of extended data of the third embodiment of an encoded image that can be combined with the relatively-lower-resolution digitized image illustrated in FIG. 14a in order to substantially reconstruct the original relatively-higher-resolution digitized image illustrated in FIG. 11.

Alternatively, referring to FIGS. 14*a* and 14*b*, the first group 112, 112.1 of the second plurality of pixels 114, 114.1 and the second group 116, 116.1 of the third plurality of pixels 118, 118.1 in a third embodiment of an encoded image 14.5 in accordance with the third aspect of the image encoding process can be respectively arranged for transmission as respective separate image signals 41.1, 41.2 that provide for displaying the relatively-lower resolution image from the first group 112, 112.1 of the second plurality of pixels 114, 114.1 alone, and provide for displaying the relatively-higher-resolution digitized image 12 by recombining the first 112, 112.1 and second 116, 116.1 groups of second 114, 114.1 and third 118, 118.1 pluralities of pixels from the separate image signals 41.1, 41.2.

In accordance with the third aspect of the image encoding process, the location of the respective centers 128, 130 of the first 110 and second 124 kernel arrays correspond to the same region of the relatively-higher-resolution digitized image 12 so as to be substantially aligned with one another relative to the associated digitized image. The operation(s) of transforming each first kernel array 110 into the corresponding second kernel array 124 is or are symmetric with respect to the corresponding centers 128, 130 thereof and is or are identical for each set of corresponding first 110 and second 124 kernel arrays, which provides using a relatively simple and fast associated data processing algorithm. The operation or operations of transforming each first kernel array 110 into the corresponding second kernel array 124 is or are formulated as associated interpolations, wherein the locations of the transformed pixels in the second kernel array 124 are symmetrically shifted in location by a relatively small perturbation δ, symmetric relative to the center 130 of the second kernel array 124, with a substantially zero total net shift within each second kernel array 124, so as to diminish the influence of the fundamental spatial frequencies of the underlying sampling process that might otherwise cause associated noticeable sampling artifacts in the resulting associated image, and so that each second kernel array 124 appears in the resulting relatively-lower-resolution image 38 to be aligned with the corresponding center 128 of the corresponding first kernel array 110 of the relatively-higher-resolution digitized image 12, so as to provide for a relatively better macroscopic representation of the original image. Accordingly, each first 110 and second 124 kernel array may be macroscopically considered as an effective larger pixel of the underlying digitized image, so that a best down-sampled representation of each second kernel array 124—independent of the others—provides for a corresponding best aggregate representation of the entire relatively relatively-lower-resolution image 38.

In accordance with the third aspect of the image encoding process, the value of each down-sampled pixel 37' of the second kernel array 124 is generated from a linear spatial interpolation of corresponding associated relatively adjacent pixels 37 of the first kernel array 110, but with the associated interpolation coefficients modified relative to corresponding values for the actual relative spatial locations of the associated original 37 and down-sampled 37' pixels. More particularly, the associated interpolation coefficients are calculated assuming that the associated down-sampled pixel 37' is shifted in space by a relatively small perturbation δ relative to a corresponding nominal geometric location. Accordingly, the resulting interpolation process introduces an intentional error in either the value of the down-sampled pixel 37' at the corresponding nominal location, or in the location of the down-sampled pixel 37' for a corresponding value. Furthermore, the direction of the spatial shifts is varied for different down-sampled pixels 37' of the second kernel array 124 so that there is substantially zero net total spatial shift of all geometric locations within each second kernel array 124. This variation in spatial shifts of the down-sampled pixels 37' within the second kernel array 124 provides for effectively diminishing the influence of the associated fundamental spatial frequencies of the regularly spaced array of geometric down sampled pixel locations, wherein sampling artifacts would otherwise typically result from the interaction of these fundamental sampling spatial frequencies with spatial frequencies of the original image. Accordingly, the above-described spatial shifts effectively provide for sacrificing an increase in location sampling error for the benefit of a decrease in more noticeable sampling artifacts.

For example, for original pixels 37, designated by values $A_1$ and $A_2$ that geometrically span one down-sampled pixel 37' designated by value $B_1$, with the down-sampled pixel $B_1$ separated from pixels $A_1$ and $A_2$ by distances $d_1$ and $d_2$, respectively, then the value $B_1$ of the down-sampled pixel 37' is given by the following linear interpolation of values $A_1$ and $A_2$:

$$B_1 = \frac{\alpha \cdot A_1 + \beta \cdot A_2}{\alpha + \beta} \tag{1}$$

wherein $$\alpha = d_2 + \delta \tag{2}$$

$$\beta = d_1 - \delta \tag{3}$$

and perturbation δ is the effective shift of the down-sampled pixel $B_1$ from its nominal uniformly-spaced location of the corresponding sampling point in the corresponding encoded image 14. If the value of the perturbation δ is set to zero, then the value of the down-sampled pixel $B_1$ is given by a conventional spatial linear interpolation of values A1 and A2 at the nominal location of the down-sampled pixel $B_1$. The modified interpolation method of equations (1)-(3) may be interpreted as either a) resulting from an effective offset of the sampling location from the corresponding geometric location of a corresponding down-sampled pixel 37' in a regularly spaced down-sampled image pixel array, b) resulting from a conventional linear interpolation applied to the geometric location of an irregularly spaced, down-sampled image pixel array, or c) resulting from a conventional linear interpolation applied to a regularly-spaced down-sampled image pixel array using associated coefficients that are modified with some type of bias that effectively alters their values.

Furthermore, when applied to the interpolation of different pairs of pixels 37 in the first kernel arrays 110, the amount and direction of the perturbation δ is symmetric with respect to the centers 128, 130 of the first 110 and second 124 kernel arrays so that within the second kernel array 124, the sum of all resulting effective shifts in the locations of the down-sampled pixels 37' is substantially zero. The particular values of the associated interpolation coefficients α, β may be determined empirically so that the resulting encoded image 14 provides the best subjective appearance, wherein the resulting set of associated interpolation coefficients α, β will have an underlying associated corresponding value for the associated perturbation δ.

Generally, the down-sampling ratio R is the ratio of the number of pixels 37 along a single dimension 104, 106 in the first kernel array 110 to the corresponding number of down-sampled pixels 37' along the same dimension 104, 106 in the second kernel array 124. The down-sampling ratio R—or product of plural down-sampling ratios R—will depend upon the configurations of the original relatively-higher-resolution digitized image 12 in relation to the relatively-lower-resolution display format 18 of the associated displays 16, 16.1 to be used to display the resulting corresponding relatively-lower-resolution image 38 of the associated second two-dimensional array 108 of down-sampled pixels 37'. Furthermore, each down-sampling ratio R has a corresponding particular set of best interpolation coefficients α, β, each of which may be empirically determined for best subjective appearance, and which may be different for different down-sampling ratios R.

For example, standard display resolutions are frequently used for video and computer displays 16, 16.1. For example, the video resolution of Quad Full High Definition ("QFHD") is 3840×2160 pixels 37. In one embodiment, a resolution of some high resolution computer monitors is 2560×1600 pixels 37, 37'. Accordingly, a down-sampling ratio R of 3-to-2 applied to a QFHD image will produce a relatively-lower-resolution image 38 with 2560×1440 pixels 37' that will fill the width of such a computer display 16, 16.1. A second down-sampling ratio R of 4-to-3 operating on this intermediate image will result in a standard Full High Definition ("HD") relatively-lower-resolution image 38" of 1920×1080 pixels 37, 37'. Equivalently, the 2560×1440 intermediate image contains ⅔ the resolution of the QFHD image in each dimension and the 1920×1080 HD image contains ¾ the resolution of the intermediate image in each dimension. Therefore, relative to the QFHD original image, the HD image has a resolution equal to the product these ratios, or ½ the resolution in each dimension. The 4-to-3 down-sampling ratio R applied in one dimension is also useful with anamorphic imaging for video applications. It should be understood that the 3-to-2 and 4-to-3 down-sampling ratios R described herein are examples that are used for purposes of illustration, and that these particular examples should not otherwise be considered to be limiting.

For example, referring to FIG. 15a, a first embodiment of a one-dimensional encoding process 132.1 in accordance with the third aspect provides for a down-sampling ratio R of 3-to-2, wherein the associated first kernel array 110, 110.1 is illustrated as row of three sequential pixels 37: $A_1, A_2, A_3$ that are transformed into a second kernel array 124, 124.1 with a corresponding row of two down-sampled pixels 37': $B_1, B_2$, with one of the remaining pixels 37, e.g. $A_2$, stored in the second group 116, 116.1 of the third plurality of pixels 118, 118.1. For example, the first embodiment of the one-dimensional encoding process 132.1 might be applied either to a relatively-higher-resolution digitized image 12, or to a relatively-lower-resolution image 38, containing 3N pixels 37, 37' along the associated second dimension 106, where N is a positive integer. The resulting down-sampled pixels 37': $B_1$, $B_2$ are given from equation (1) as:

$$B_1 = \frac{\alpha \cdot A_1 + \beta \cdot A_2}{\alpha + \beta} \quad (4)$$

$$B_2 = \frac{\alpha \cdot A_3 + \beta \cdot A_2}{\alpha + \beta} \quad (5)$$

Pixels $A_1$ and $A_3$ are located on the corresponding first 134.1 and second 134.2 edges of the first kernel array 110, 110.1, pixel $A_2$ is located at the center 128 of the first kernel array 110, 110.1, and the down-sampled pixels $B_1$, $B_2$ are located on the corresponding first 136.1 and second 136.2 edges of the second kernel array 124, 124.1, wherein down-sampled pixel $B_1$ is interpolated between corresponding pixels $A_1$ and $A_2$, and down-sampled pixel $B_2$ is interpolated between corresponding pixels $A_3$ and $A_2$. Values of α=2 and β=1 for the interpolation coefficients α, β appeared to provide for best subjective appearance of the resulting relatively-lower-resolution image 38, and to provide for relatively fast associated data processing, the latter of which is described more fully hereinbelow.

Referring to FIG. 15a, in accordance with one interpretation, the down-sampled pixel $B_1$ is located midway between pixels $A_1$ and $A_2$, and down-sampled pixel $B_2$ is located midway between pixels $A_3$ and $A_2$, so that for pixels 37: $A_1, A_2, A_3$ each separated by one unit, and for values of α=2 and β=1 for the interpolation coefficients α, β, then the interpolation coefficients α, β can be expressed as follows:

$$\alpha = \gamma \cdot (d_2 + \delta) = 2 \quad (6)$$

$$\beta = \gamma \cdot (d_1 - \delta) = 1 \quad (7)$$

so that for associated distances $d_1$ and $d_2$ are each having a value of ½, $d_1 = d_2 = ½$, γ3 and δ⅙. Accordingly, for best subjective appearance, the values of the down-sampled pixels $B_1$, $B_2$ are interpolated as if each was shifted from its respective nominal location by a distance of ⅙ away from the center 128 of the first kernel array 110, 110.1 to corresponding shifted locations $B_1^*$, $B_2^*$.

Alternatively, referring to FIG. 15b, in accordance with another interpretation, the down-sampled pixels $B_1$, $B_2$ are uniformly spaced within the resulting relatively-lower-resolution image 38 of the first group 112, 112.1 of the second plurality of pixels 114, 114.1, so that for the pixels 37: $A_1, A_2, A_3$ each separated by one unit, the resulting down-sampled pixels $B_1$, $B_2$—⅔ in number—would each then be separated by 3/2 or 1.5 units, so that the nominal locations of the down-sampled pixels $B_1$, $B_2$ are each located ¾ units from the center 128 of the first kernel array 110, so that $d_1 = ¼$ and $d_2 = ¾$, which, from equations (6) and (7), for α=2 and β=1 for best subjective appearance, then γ3 and δ=−1/12. Accordingly, for best subjective appearance, the values of the down-sampled pixels $B_1$, $B_2$ are interpolated as if each was shifted from its respective nominal location by a distance of 1/12 towards the center 128 of the first kernel array 110, 110.1 to corresponding shifted locations $B_1^*$, $B_2^*$, which are the same as illustrated in FIG. 15a, each being at a distance from the center 128 of the first kernel array 110, 110.1 of ¾−1/12=½+⅙=⅔.

For values of α=2 and β=1 for the interpolation coefficients α, β, the values of the down-sampled pixels $B_1$, $B_2$ are given by:

$$B_1 = \frac{2A_1 + A_2}{3} \quad (8)$$

$$B_2 = \frac{2A_3 + A_2}{3} \quad (9)$$

Equations (8) and (9) can be implemented by a relatively fast data processing algorithm by using binary shift operations to perform the associated multiplications and divisions, which is provided for by use of appropriate values for the associated interpolation coefficients α, β, assuming that the associated relatively-higher-resolution digitized image 12 and relatively-lower-resolution image 38 each comprise digital values for the associated pixels 37 and down-sampled pixels 37'.

For example, a multiplication of a binary value X by an $n^{th}$ power of 2, i.e. $2^n$, is equivalent to left shifting the binary value by n bits, which is represented herein by X<<n. Similarly, a division of a binary value Y by an $n^{th}$ power of 2, i.e. $2^n$, is equivalent to right shifting the binary value by n bits, which is represented herein by Y>>n.

Division by a value of $(2^n-1)$ can be approximated using the following formulae based upon the geometric series:

$$\frac{1}{x-1} = \sum_{i=1}^{\infty} \left(\frac{1}{x}\right)^i, \tag{10.1}$$

or, for $x=2^n-1$, $$\frac{1}{2^n-1} = \sum_{i=1}^{\infty} \left(\frac{1}{2^n}\right)^i. \tag{10.2}$$

Accordingly, $$\frac{X}{2^n-1} = X \cdot \sum_{i=1}^{\infty} \left(\frac{1}{2^n}\right)^i = \sum_{i=1}^{\infty} (X \gg n^i), \tag{11.1}$$

so that, for division of X by $3=2^2-1$, equation (11.1) with n=2 becomes:

$$\frac{X}{3} = \sum_{i=1}^{\infty} (X \gg 2^i). \tag{11.1}$$

According, using binary shift operations for a relatively fast algorithmic implementation for a one-dimensional interpolation of pixels 37: $A_1, A_2, A_3$ in accordance with a down-sampling ratio R of 3-to-2 so as to generate the corresponding down-sampled pixels 37': $B_1, B_2$ using values of $\alpha=2$ and $\beta=1$ for the interpolation coefficients $\alpha, \beta$ for best subjective quality of the resulting relatively-lower-resolution image 38, equations (8) and (9) are then approximated by:

$$B_1 = \sum_{i=1}^{p} (A_1 \ll 1 + A_2) \gg 2^i \tag{12}$$

$$B_2 = \sum_{i=1}^{p} (A_3 \ll 1 + A_2) \gg 2^i \tag{13}$$

where p is equal to half the number of bits in the digital representation of the values of the pixels 37, 37'.

Referring to FIG. 16, a second embodiment of a one-dimensional encoding process 132.2 in accordance with the third aspect provides for a down-sampling ratio R of 3-to-2, wherein the associated first kernel array 110, 110.2 is illustrated as column of three sequential pixels 37: $A_1, A_2, A_3$ that are transformed into a second kernel array 124, 124.2 of a corresponding column of two down-sampled pixels 37': $B_1$, $B_2$, with one of the remaining pixels 37, e.g. $A_2$, stored in the second group 116, 116.1 of the third plurality of pixels 118, 118.1. Otherwise, the above-described associated interpolation equations (4)-(9), (12) and (13) are the same as for the first embodiment of the one-dimensional encoding process 132.1 illustrated in FIGS. 15a and 15b. For example, the second embodiment of the one-dimensional encoding process 132.2 might be applied either to a relatively-higher-resolution digitized image 12, or to a relatively-lower-resolution image 38, containing 3M pixels 37, 37' along the associated first dimension 104, where M is a positive integer.

The first 132.1 and second 132.2 one-dimensional encoding processes can be performed sequentially, in either order, to provide for transforming each 3-by-3 first kernel array 110, 110.3 into a corresponding 2-by-2 second kernel array 124, 124.3.

Alternatively, referring to FIG. 17a, a first embodiment of a two-dimensional encoding process 138.1 in accordance with the third aspect of the image encoding process provides for directly transforming each 3-by-3 first kernel array 110, 110.3 into a corresponding 2-by-2 second kernel array 124, 124.3 in accordance with the interpolation equations illustrated in FIG. 17b, wherein the down-sampled pixels 37': $B_{11}$, $B_{12}, B_{21}, B_{22}$ are each calculated responsive to a corresponding corner pixel 37.1: $A_{11}, A_{13}, A_{31}, A_{33}$ of the first kernel array 110, 110.3 and also responsive to a portion of the remaining relatively central pixels 37.2: $A_{12}, A_{21}, A_{32}, A_{23}$, $A_{22}$ of the first kernel array 110, 110.3, wherein the relatively central pixels 37.2: $A_{12}, A_{21}, A_{32}, A_{23}, A_{22}$ are then stored in the second group 116, 116.1 of the third plurality of pixels 118, 118.1. For example, the first embodiment of the two-dimensional encoding process 138.1 might be applied either to a relatively-higher-resolution digitized image 12, or to a relatively-lower-resolution image 38, containing 3N pixels 37, 37' along the associated second dimension 106, and 3M pixels 37, 37' along the associated first dimension 104, where N and M are positive integers. In an alternative embodiment, the bracketed ([ . . . ]) portions of the equations illustrated in FIG. 17b may also be stored in the second group 116, 116.1 of the third plurality of pixels 118, 118.1—at the expense of increased memory usage—so as to facilitate the associated decoding process.

Referring to FIG. 18a, a first embodiment of a one-dimensional decoding process 140.1 provides for decoding the first 112, 112.1 and second 116, 116.1 groups of the second 114, 114.1 and third 118, 118.1 pluralities of pixels—encoded in accordance with the first embodiment of the one-dimensional encoding process 132.1 illustrated in FIG. 15a—so as to reconstruct the corresponding relatively-higher-resolution digitized image 12 therefrom with substantially no loss in associated image content, wherein for each second kernel array 124, 124.1, a corresponding row of two previously down-sampled pixels 37': $B_1, B_2$ are recombined with the corresponding separately stored pixel 37: $A_2$ in accordance with the decoding equations illustrated in FIG. 18c so as to regenerate the remaining original pixels 37: $A_1, A_3$, so as to form the corresponding row of three pixels 37: $A_1, A_2, A_3$ of the resulting corresponding first kernel array 110, 110.2.

Similarly, referring to FIG. 18b, a second embodiment of a one-dimensional decoding process 140.2 provides for decoding the first 112, 112.1 and second 116, 116.1 groups of the second 114, 114.1 and third 118, 118.1 pluralities of pixels—encoded in accordance with the second embodiment of the one-dimensional encoding process 132.2 illustrated in FIG. 16—so as to reconstruct the corresponding relatively-higher-resolution digitized image 12 therefrom with substantially no loss in associated image content, wherein for each second kernel array 124, 124.2, a corresponding column of two previously down-sampled pixels 37': $B_1, B_2$ are recombined with the corresponding separately stored pixel 37: $A_2$ in accordance with the decoding equations illustrated in FIG. 18c so as to regenerate the remaining original pixels 37: $A_1, A_3$, so as to form the corresponding column of three pixels 37: $A_1, A_2, A_3$ of the resulting corresponding first kernel array 110, 110.2.

If the first 132.1 and second 132.2 one-dimensional encoding processes had been performed sequentially, in a given order, to provide for transforming each 3-by-3 first kernel array 110, 110.3 into a corresponding 2-by-2 second kernel array 124, 124.3, then each second kernel array 124, 124.3 would then be decoded—in combination with the second group 116, 116.1 of the third plurality of pixels 118, 118.1— so as to form the corresponding first kernel array 110, 110.3 by associated second 140.2 and first 140.1 one-dimensional decoding processes performed in the reverse order to the corresponding encoding processes 132.1, 132.2, so that the last one-dimensional encoding process 132.2, 132.1 to have been performed is decoded first, and the first one-dimensional encoding process 132.1, 132.2 to have been performed is decoded last.

For values of $\alpha=2$ and $\beta=1$ for the interpolation coefficients $\alpha$, $\beta$ used in the associated first 132.1 or second 132.2 one-dimensional encoding processes, and for pixel 37: $A_2$ having been stored as the residual datum in the second group 116, 116.1 of the third plurality of pixels 118, 118.1, then the resulting equations of the corresponding first 140.1 or second 140.2 one-dimensional decoding processes become:

$$A_1 = \frac{3 \cdot B_1 - A_2}{2}, \text{ and} \quad (14)$$

$$A_3 = \frac{3 \cdot B_2 - A_2}{2}, \quad (15)$$

which can be implemented as follows using binary shift operations for associated multiplications and divisions:

$$A_1 = (B_1 << 1 + B_1 - A_2) >> 1, \text{ and} \quad (16)$$

$$A_3 = (B_2 << 1 + B_2 - A_2) >> 1. \quad (17)$$

Referring to FIG. 19a, a first embodiment of a two-dimensional decoding process 142.1 provides for decoding an image encoded in accordance with the first embodiment of the two-dimensional encoding process 138.1 illustrated in FIG. 17a, using the equations illustrated in FIG. 19b to reconstruct the values of the pixels 37: $A_{11}, A_{13}, A_{31}, A_{33}$ of the first kernel array 110, 110.3 from values of the corresponding corner down-sampled pixels 37.1': $B_{11}, B_{12}, B_{21}, B_{22}$, respectively, in combination with separately stored relatively central pixels 37.2: $A_{12}, A_{21}, A_{32}, A_{23}, A_{22}$ of the first kernel array 110, 110.3, the latter of which are used directly to reconstruct the corresponding central pixels 37.2: $A_{12}, A_{21}, A_{32}, A_{23}, A_{22}$ of the first kernel array 110, 110.3, so as to thereby reconstruct the corresponding first kernel array 110, 110.3 in entirety without substantial loss.

Figure 20:
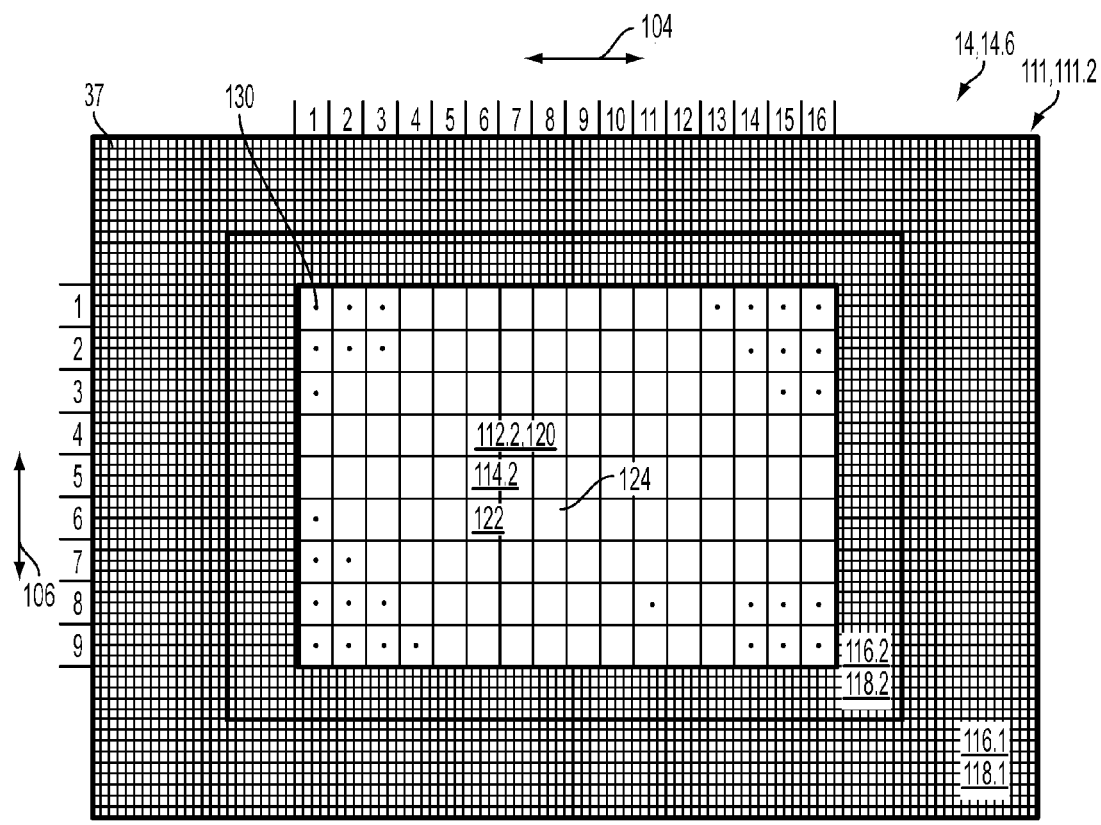
FIG. 20 illustrates a fourth embodiment of an encoded image in accordance with the third aspect of the image encoding process, comprising first and second groups of pixels.

Referring to FIG. 20, a fourth embodiment of an encoded image 14.6 in accordance with the third aspect of the image encoding process is encoded within a third two-dimensional array 111, 111.2 comprising respective first 112, 112.2 and second 116, 116.2 groups of respective second 114, 114.2 and third 118, 118.2 pluralities of pixels that are further transformed from a previously-encoded first group 112, 112.1 of a second plurality of pixels 114, 114.1—the latter of either the second or third embodiments of the encoded images 14.4, 14.5 illustrated in FIG. 13 or 14a, respectively—by an associated 4-to-3 encoding process 144—illustrated in FIGS. 22a-b, 23 or 24a-c—for example, in one embodiment, by which each corresponding first kernel array 110, 110.6 comprises a 4-by-4 array of sixteen pixels 37 and each corresponding second kernel array 124, 124.6 comprises a corresponding 3-by-3 array of nine pixels 37, so that along each of the first 104 and second 106 dimensions, every four down-sampled pixels 37' of the second plurality of pixels 114, 114.1 of the previously-encoded encoded image 14.4, 14.5 is transformed into a corresponding three down-sampled pixels 37' of the resulting second plurality of pixels 114, 114.2. An image signal 41 generated from the composite encoded image 14.6 provides for displaying the relatively-lower resolution image from the first group 112, 112.2 of a second plurality of pixels 114, 114.2 alone, and provides for displaying the relatively-higher-resolution digitized image 12 from a combination of the first 112, 112.2 and second 116, 116.2 groups of second 114, 114.2 and third 118, 118.2 pluralities of pixels, and the previously-encoded second group 116, 116.1 of the third plurality of pixels 118, 118.1 of the encoded images 14.4, 14.5 illustrated in FIG. 13 or 14a.

Figure 21A:
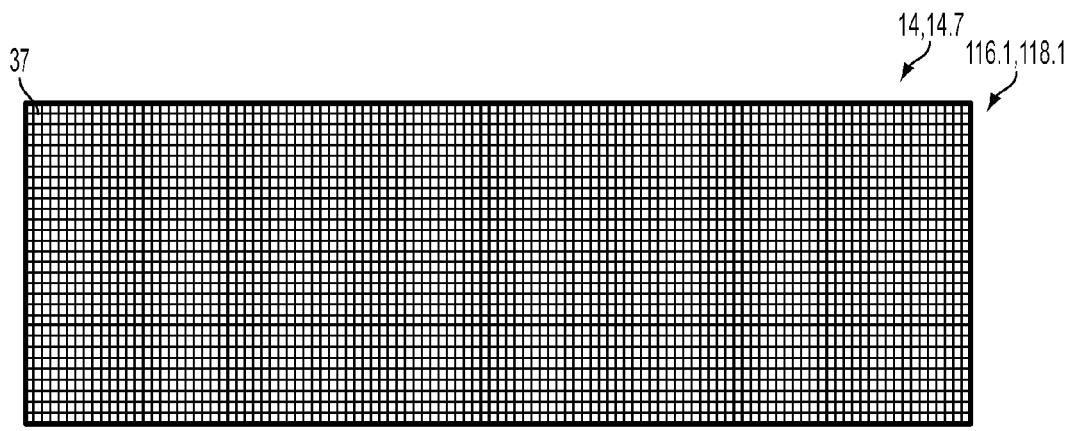
FIG. 21a illustrates a first portion of a second embodiment of extended data of a fifth embodiment of an encoded image that can be combined with the relatively-lower-resolution digitized image illustrated in FIG. 21b and the second portion of extended data illustrated in FIG. 21c in order to substantially reconstruct the original relatively-higher-resolution digitized image illustrated in FIG. 11.
Figure 21B:
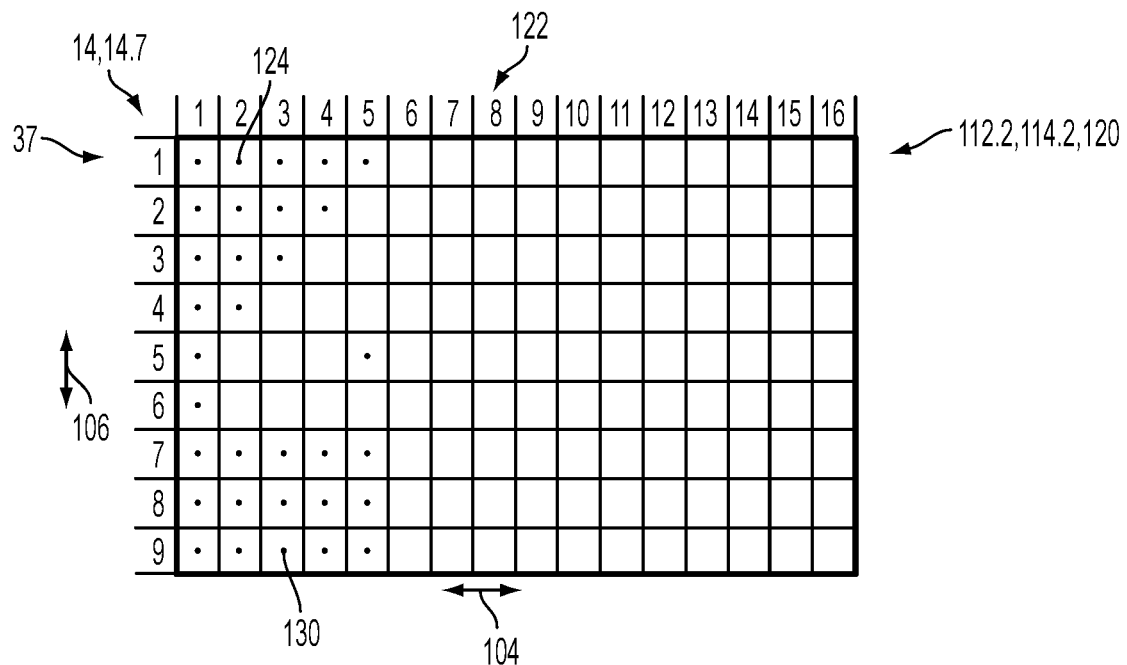
FIG. 21b illustrates a second embodiment of a first group of pixels of a relatively-lower-resolution digitized image of the fifth embodiment of an encoded image in accordance with the third aspect of the image encoding process.
Figure 21C:
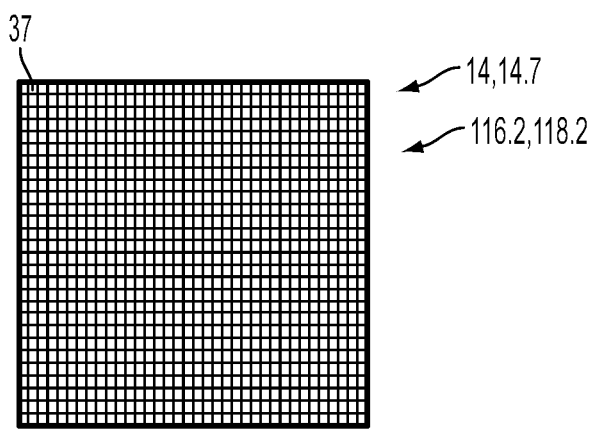
FIG. 21c illustrates a second portion of the second embodiment of extended data of the fifth embodiment of an encoded image that can be combined with the relatively-lower-resolution digitized image illustrated in FIG. 21b and the first portion of extended data illustrated in FIG. 21a in order to substantially reconstruct the original relatively-higher-resolution digitized image illustrated in FIG. 11.

Alternatively, referring to FIGS. 21a and 21b, in accordance with a fifth embodiment of an encoded image 14.7, the first group 112, 112.2 of the second plurality of pixels 114, 114.2, the second group 116, 116.2 of the third plurality of pixels 118, 118.2, and the previously-encoded second group 116, 116.1 of the third plurality of pixels 118, 118.1 of the encoded images 14.4, 14.5 illustrated in FIG. 13 or 14a, can be respectively arranged for transmission as respective separate image signals 41.1, 41.2', 41.2" that provide for displaying the relatively-lower resolution image from the first group 112, 112.2 of a second plurality of pixels 114, 114.2 alone, and provide for displaying the relatively-higher-resolution digitized image 12 by recombining the first 112, 112.2 and second 116, 116.1, 116.2 groups of second 114, 114.2 and third 118, 118.1, 118.2 pluralities of pixels from the separate image signals 41.1, 41.2', 41.2'.

Accordingly, the encoded images 14.6, 14.7 illustrated in FIGS. 20 and 21a-c result from an initial 3-to-2 encoding process 126 operating on the entire relatively-higher-resolution digitized image 12 of the first two-dimensional array 102—so as to generate the resulting previously-encoded first 112, 112.1 and second 116, 116.1 groups of corresponding second 114, 114.1 and third 118, 118.1 pluralities of pixels,— followed by a 4-to-3 encoding process 144 operating on only the previously-encoded first group 112, 112.1 of the second plurality of pixels 114, 114.1, without affecting the associated previously-encoded second group 116, 116.1 of the third plurality of pixels 118, 118.1, so as to generate therefrom the first group 112, 112.2 of the second plurality of pixels 114, 114.2 and the second group 116, 116.2 of the third plurality of pixels 118, 118.2. The resulting encoded images 14.6, 14.7 are decoded in reverse order, i.e. by first decoding the first group 112, 112.2 of the second plurality of pixels 114, 114.2 in combination with the second group 116, 116.2 of the third plurality of pixels 118, 118.2 so as to reconstruct the previously-encoded first group 112, 112.1 of the second plurality of pixels 114, 114.1, and then to decode that reconstructed previously-encoded first group 112, 112.1 of the second plurality of pixels 114, 114.1 in combination with the corresponding previously-encoded second group 116, 116.1 of the third plurality of pixels 118, 118.1 so as to reconstruct the original relatively-higher-resolution digitized image 12. The result of applying both the 3-to-2 and the 4-to-3 encoding processes 126, 144 in series is that the number of down-sampled pixels 37' along each dimension 104, 106 is half the corresponding number of original pixels 37, so that the total number of down-sampled pixels 37' is one fourth the total number of original pixels 37.

Alternatively, the 4-to-3 encoding process 144 could operate directly on the relatively-higher-resolution digitized image 12 of the first two-dimensional array 102, either alone, or followed by the 3-to-2 encoding process 126.

Figure 22A:
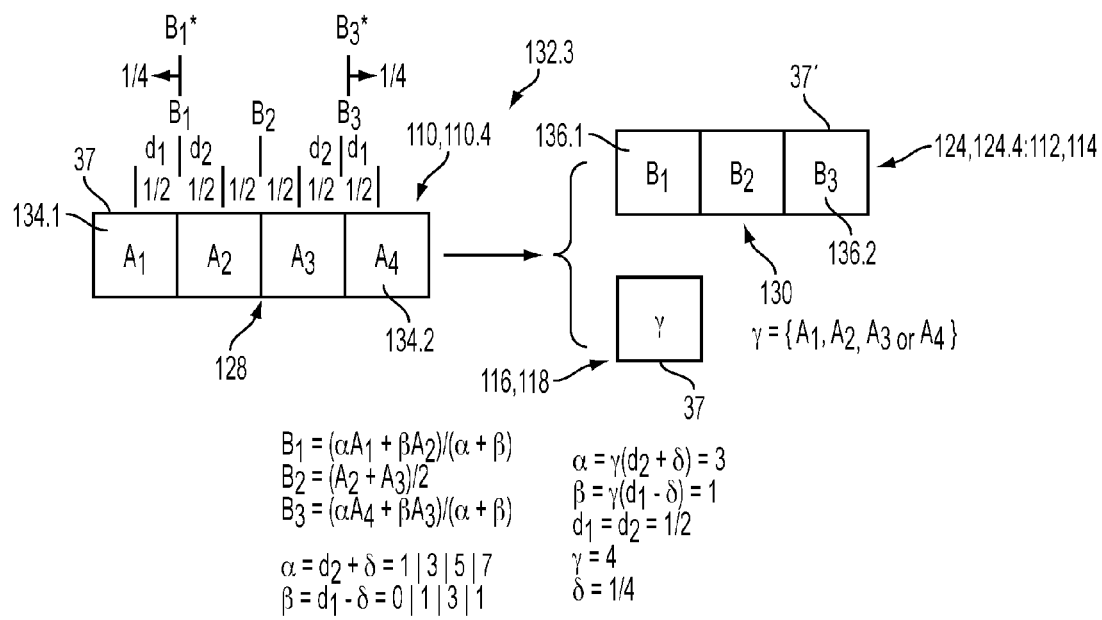
FIG. 22a illustrates a third embodiment of a one-dimensional encoding process in accordance with the third aspect of the image encoding process.

For example, referring to FIG. 22a, a third embodiment of a one-dimensional encoding process 132.3 in accordance with the third aspect provides for a down-sampling ratio R of 4-to-3, wherein the associated first kernel array 110, 110.4 is illustrated as row of four sequential pixels 37: $A_1, A_2, A_3, A_4$ that are transformed into a second kernel array 124, 124.4 with a corresponding row of three down-sampled pixels 37': $B_1, B_2, B_3$, with one of the remaining pixels 37, e.g. $A_1, A_2, A_3,$ or $A_4$, stored in the second group 116 of the third plurality of pixels 118. For example, the third embodiment of the one-dimensional encoding process 132.3 might be applied either to a relatively-higher-resolution digitized image 12, or to a relatively-lower-resolution image 38, each containing 4N pixels 37, 37' along the associated second dimension 106, where N is a positive integer. The resulting down-sampled pixels 37': $B_1, B_2, B_3$ are given by:

$$B_1 = \frac{\alpha \cdot A_1 + \beta \cdot A_2}{\alpha + \beta} \quad (18)$$

$$B_2 = \frac{A_2 + A_3}{2} \quad (19)$$

$$B_3 = \frac{\alpha \cdot A_4 + \beta \cdot A_3}{\alpha + \beta} \quad (20)$$

wherein equations (18) and (20) are based on equation (1), and provide for respective interpolations that incorporate symmetric shifts (i.e. perturbations δ) with respect to the respective centers 128, 130 of the first 110, 110.4 and second 124, 124.4 kernel arrays.

Pixels $A_1$ and $A_4$ are located on the corresponding first 134.1 and second 134.2 edges of the first kernel array 110, 110.4, pixels $A_2$ and $A_3$ straddle the center 128 of the first kernel array 110, 110.1, the down-sampled pixels $B_1, B_3$ are located on the corresponding first 136.1 and second 136.2 edges of the second kernel array 124, 124.4, and down-sampled pixel $B_2$ is located at the center 130 of the second kernel array 124, 124.4 wherein down-sampled pixel $B_1$ is interpolated between corresponding pixels $A_1$ and $A_2$, down-sampled pixel $B_3$ is interpolated between corresponding pixels $A_4$ and $A_3$, and down-sampled pixel $B_2$ is the average of pixels $A_2$ and $A_3$.

Values of $\alpha=3$ and $\beta=1$ for the interpolation coefficients $\alpha$, $\beta$ appeared to provide for best subjective appearance of the resulting relatively-lower-resolution image 38 in combination with relatively fast associated data processing using the binary shifting techniques for multiplications and divisions, as described more fully hereinbelow.

Referring to FIG. 22a, in accordance with one interpretation, the down-sampled pixel $B_1$ is located midway between pixels $A_1$ and $A_2$, and down-sampled pixel $B_3$ is located midway between pixels $A_4$ and $A_3$, so that for pixels 37: $A_1, A_2, A_3, A_4$ each separated by one unit, and for values of $\alpha=3$ and $\beta=1$ for the interpolation coefficients $\alpha$, $\beta$, then the interpolation coefficients $\alpha$, $\beta$ can be expressed as follows:

$$\alpha = \gamma \cdot (d_2 + \delta) = 3 \quad (21)$$

$$\beta = \gamma \cdot (d_1 - \delta) = 1 \quad (22)$$

so that for associated distances $d_1$ and $d_2$ each having a value of ½, $d_1 = d_2 = ½$, $\gamma = 4$ and $\delta = ¼$. Accordingly, for best subjective appearance, the values of the down-sampled pixels $B_1, B_3$ are interpolated as if each was shifted from its respective nominal location by a distance of ¼ away from the center 128 of the first kernel array 110, 110.4 to corresponding shifted locations $B_1^*, B_3^*$.

Figure 22B:
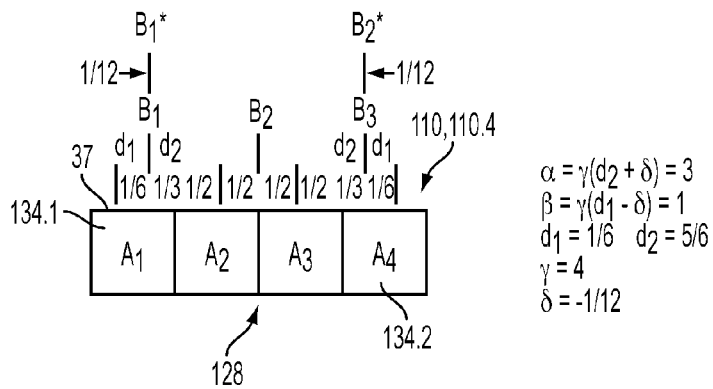
FIG. 22b illustrates a second aspect of the third embodiment of the one-dimensional encoding process in accordance with the third aspect of the image encoding process.

Alternatively, referring to FIG. 22b, in accordance with another interpretation, the down-sampled pixels $B_1, B_2, B_3$ are uniformly spaced within the resulting relatively-lower-resolution image 38 of the first group 112 of the second plurality of pixels 114, so that for the pixels 37: $A_1, A_2, A_3, A_4$ each separated by one unit, the resulting down-sampled pixels $B_1, B_2, B_3$—¾ in number—would each then be separated by 4/3 units, so that with down-sampled pixels $B_s$ located at the center 128 of the first kernel array 110, down-sampled pixels $B_1$ and $B_3$ are each located ⅔ units from the center 128 of the first kernel array 110, so that $d_1 = ⅙$ and $d_2 = ⅚$, which, from equations (6) and (7), for $\alpha = 3$ and $\beta = 1$ for best subjective appearance, then $\gamma = 4$ and $\delta = -1/12$, the same perturbation δ as for the 3-to-2 one-dimensional encoding process 132.1 illustrated in FIG. 15b. Accordingly, for best subjective appearance, the values of the down-sampled pixels $B_1, B_3$ are interpolated as if each was shifted from its respective nominal location by a distance of 1/12 towards the center 128 of the first kernel array 110, 110.4 to corresponding shifted locations $B_1^*, B_3^*$, which are the same as illustrated in FIG. 22a, each being at a distance from the center 128 of the first kernel array 110, 110.4 of $⅔ - 1/12 = 1 + ¼ = 5/4$.

Interpolation equations (18)-(20) can be implemented in a relatively fast data processing algorithm by using binary shift operations to perform the associated multiplications and divisions, which is provided for by use of appropriate values for the associated interpolation coefficients $\alpha$, $\beta$—assuming that the associated relatively-higher-resolution digitized image 12 and relatively-lower-resolution image 38 each comprise digital values for the associated pixels 37 and down-sampled pixels 37'—for example, by choosing values of the interpolation coefficients $\alpha$, $\beta$ for which a) the sum ($\alpha+\beta$) is the minimum sum that provides for best subjective image quality, b), $\alpha$ and $\beta$ are non-negative integers, and c) the sum ($\alpha+\beta$)=$2^m$, where m is a non-negative integer. Furthermore, the associated data processing operations are facilitated by choosing a value for the associated perturbation δ—that provides for the associated effective shift in sampling location—so that the resulting associated interpolation coefficients $\alpha$, $\beta$ become simple fractions that support implementation of the associated interpolation equations with relatively faster binary operations instead of relatively slower, albeit more general, floating-point operations. Although a shift adjustment to facilitate computational efficiency may create an additional error in geometric location of a given pixel value, it is presumed that such an error would not be as visually noticeable as would be the associated reduction in sampling artifacts. However, it should be understood that the interpolation equations can generally be implemented with any kind of operations, for example, either floating-point operations, integer operations, binary operations, or a combination thereof.

The following combinations of interpolation coefficients $\alpha$, $\beta$ are examples of values for which $(\alpha+\beta)=2^m$:

| $\alpha$ | $\beta$ | $(\alpha+\beta)$ |
|---|---|---|
| 1 | 0 | 1 |
| 3 | 1 | 4 |

-continued $$\begin{array}{ccc} 5 & 3 & 8 \\ 7 & 1 & 8 \end{array}$$

The selection of the particular interpolation coefficients α, β that provide for best resulting image quality can be subjective. Typically the best realistic representation of an original image is a compromise between a high clarity but artifact-laden image at one extreme and a perceptibly soft but artifact-free image at the other. Equations (18)-(20) were applied to a variety of digital test images using the above values for the interpolation coefficients α, β in order to determine which set of values provided for the best subjective image quality. For example, the first set of interpolation coefficients α, β, with α=1 and β=0, the resulting down-sampled image exhibited relatively high clarity but noticeable residual jaggedness in curved lines. For the second set of interpolation coefficients α, β, with α=3 and β=1, the resulting down-sampled image exhibited substantially reduced artifacts with only a slight reduction in clarity. Furthermore, the results using this second set of interpolation coefficients α, β (α=3, β=1) was visually similar to that of far more complicated interpolation methods. Experiments with additional sets of values for the interpolation coefficients α, β yielded at best only very relatively minor improvements in visual quality that were not considered sufficiently significant to justify the presumed increase in reconstruction error.

Using values of α=3 and β=1 for the interpolation coefficients α, β, the resulting equations for the values of the down-sampled pixels $B_1$, $B_2$, $B_3$ are given by:

$$B_1 = \frac{3A_1 + A_2}{4} \quad (23)$$

$$B_2 = \frac{A_2 + A_3}{2} \quad (19)$$

$$B_3 = \frac{3A_4 + A_3}{4} \quad (24)$$

Equations (19), (23) and (24) can be implemented in a relatively fast data processing algorithm by using binary shift operations to perform the associated multiplications and divisions, which is provided for by use of appropriate values for the associated interpolation coefficients α, β, assuming that the associated relatively-higher-resolution digitized image 12 and relatively-lower-resolution image 38 each comprise digital values for the associated pixels 37 and down-sampled pixels 37'. According, the relatively fast algorithmic implementation of equations (19), (23) and (24) to provide for a one-dimensional interpolation of pixels 37: $A_1$, $A_2$, $A_3$, $A_4$ in accordance with a down-sampling ratio R of 4-to-3 so as to generate the corresponding down-sampled pixels 37': $B_1$, $B_2$, $B_3$ using values of α=3 and β=1 for the interpolation coefficients α, β for best subjective quality of the resulting relatively-lower-resolution image 38 is approximated by:

$$B_1 = (A_1 + A_1 \ll 1 + A_2) \gg 2 \quad (25)$$

$$B_2 = (A_1 + A_3) \gg 1 \quad (26)$$

$$B_3 = (A_4 + A_4 \ll 1 + A_3) \gg 2 \quad (27)$$

Figure 23:
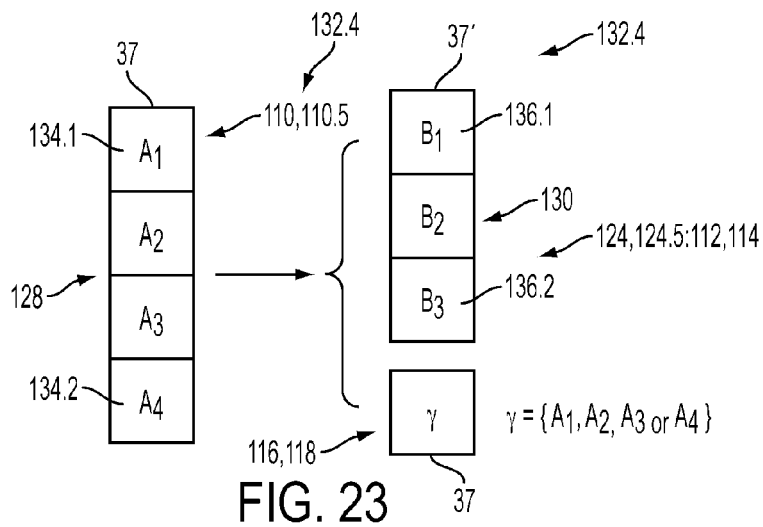
FIG. 23 illustrates a fourth embodiment of a one-dimensional encoding process in accordance with the third aspect of the image encoding process.

Referring to FIG. 23, a fourth embodiment of a one-dimensional encoding process 132.4 in accordance with the third aspect provides for a down-sampling ratio R of 4-to-3, wherein the associated first kernel array 110, 110.5 is illustrated as column of four sequential pixels 37: $A_1$, $A_2$, $A_3$, $A_4$ that are transformed into a second kernel array 124, 124.5 with a corresponding column of three down-sampled pixels 37': $B_1$, $B_2$, $B_3$, with one of the remaining pixels 37, e.g. $A_1$, $A_2$, $A_3$, or $A_4$, stored in the second group 116 of the third plurality of pixels 118. Otherwise, the above-described associated interpolation equations (18)-(20) and (23)-(27) are the same as for the third embodiment of the one-dimensional encoding process 132.3 illustrated in FIGS. 22a and 22b. For example, the fourth embodiment of the one-dimensional encoding process 132.4 might be applied either to a relatively-higher-resolution digitized image 12, or to a relatively-lower-resolution image 38, each containing 4M pixels 37, 37' along the associated second dimension 106, where M is a positive integer.

The third 132.3 and fourth 132.4 one-dimensional encoding processes can be performed sequentially, in either order, to provide for transforming each 4-by-4 first kernel array 110, 110.6 into a corresponding 3-by-3 second kernel array 124, 124.6.

Alternatively, referring to FIG. 24a, a second embodiment of a two-dimensional encoding process 138.2 in accordance with the third aspect of the image encoding process provides for directly transforming each 4-by-4 first kernel array 110, 110.6 into a corresponding 3-by-3 second kernel array 124, 124.6 in accordance with the interpolation equations illustrated in FIG. 24c, wherein the down-sampled pixels 37': $B_{11}$, $B_{14}$, $B_{31}$, $B_{33}$ are each calculated responsive to a corresponding corner pixel 37.1: $A_{11}$, $A_{14}$, $A_{41}$, $A_{44}$ of the first kernel array 110, 110.6 and also responsive to a portion of the remaining relatively central pixels 37.2: $A_{22}$, $A_{32}$, $A_{22}$, $A_{23}$ and edge pixels 37.3: $A_{12}$, $A_{13}$, $A_{21}$, $A_{31}$, $A_{42}$, $A_{43}$, $A_{24}$, $A_{34}$ of the first kernel array 110, 110.6, wherein a portion of those relatively central 37.2 and edge 37.3 pixels are then stored in the second group 116, 116.2 of the third plurality of pixels 118, 118.2 as indicated in FIG. 24b. For example, the second embodiment of the two-dimensional encoding process 138.2 might be applied either to a relatively-higher-resolution digitized image 12, or to a relatively-lower-resolution image 38, containing 4N pixels 37, 37' along the associated second dimension 106, and 4M pixels 37, 37' along the associated first dimension 104, where N and M are positive integers.

Referring to FIG. 25a, a third embodiment of a one-dimensional decoding process 140.3 provides for decoding the first 112, 112.2 and second 116, 116.2 groups of the second 114, 114.2 and third 118, 118.2 pluralities of pixels—encoded in accordance with the third embodiment of the one-dimensional encoding process 132.2 illustrated in FIG. 22a—so as to reconstruct the corresponding relatively-higher-resolution digitized image 12 therefrom with substantially no loss in associated image content, wherein for each second kernel array 124, 124.4, a corresponding row of three previously down-sampled pixels 37': $B_1$, $B_2$, $B_3$ are recombined with the corresponding separately stored pixel 37: $A_1$ in accordance with the decoding equations illustrated in FIG. 25c so as to regenerate the remaining original pixels 37: $A_2$, $A_3$, $A_4$, so as to form the corresponding row of four pixels 37: $A_1$, $A_2$, $A_3$, $A_4$ of the resulting corresponding first kernel array 110, 110.4.

Similarly, referring to FIG. 25b, a fourth embodiment of a one-dimensional decoding process 140.4 provides for decoding the first 112, 112.2 and second 116, 116.2 groups of the second 114, 114.2 and third 118, 118.2 pluralities of pixels—encoded in accordance with the fourth embodiment of the one-dimensional encoding process 132.4 illustrated in FIG. 23—so as to reconstruct the corresponding relatively-higher-resolution digitized image 12 therefrom with substantially no loss in associated image content, wherein for each second kernel array 124, 124.5, a corresponding column of three previously down-sampled pixels 37': $B_1$, $B_2$, $B_3$ are recombined with the corresponding separately stored pixel 37: $A_1$ in accordance with the decoding equations illustrated in FIG. 25c so as to regenerate the remaining original pixels 37: $A_2$, $A_3$, $A_4$, so as to form the corresponding column of four pixels 37: $A_1$, $A_2$, $A_3$, $A_4$ of the resulting corresponding first kernel array 110, 110.5.

If the third 132.3 and fourth 132.4 one-dimensional encoding processes had been performed sequentially, in a given order, to provide for transforming each 4-by-4 first kernel array 110, 110.6 into a corresponding 3-by-3 second kernel array 124, 124.6, then each second kernel array 124, 124.6 would then be decoded—in combination with the second group 116, 116.2 of the third plurality of pixels 118, 118.2—so as to form the corresponding first kernel array 110, 110.6 by associated fourth 140.4 and third 140.3 one-dimensional decoding processes performed in the reverse order to the corresponding encoding processes 132.3, 132.4, so that last one-dimensional encoding process 132.4, 132.3 to have been performed is decoded first, and the first one-dimensional encoding process 132.3, 132.4 to have been performed is decoded last.

For values of $\alpha=3$ and $\beta=1$ for the interpolation coefficients $\alpha$, $\beta$ using in the associated third 132.3 or fourth 132.4 one-dimensional encoding processes, and for pixel 37: $A_1$ having been stored as the residual datum in the second group 116, 116.2 of the third plurality of pixels 118, 118.2, then the resulting equations of the corresponding third 140.3 or fourth 140.4 one-dimensional decoding processes become:

$$A_2 = 4B_1 - 3A_1 \quad (28)$$

$$A_3 = 2B_2 - A_2 \quad (29)$$

$$A_4 = \frac{4B_3 - A_3}{3} \quad (30)$$

which can be implemented as follows using binary shift operations for associated multiplications and divisions:

$$A_2 = B_1 << 2 - A_1 << 1 - A_1 \quad (31)$$

$$A_3 = B_2 << 1 - A_2 \quad (32)$$

$$A_4 = \sum_{i=1}^{p} (B_3 << 2 - A_3) >> 2^i \quad (33)$$

where, as for equations (12) and (13) hereinabove, p is equal to half the number of bits in the digital representation of the values of the pixels 37, 37'.

The choice of storing pixel 37: $A_1$ instead of pixel 37: $A_2$ as the residual datum in the second group 116, 116.2 of the third plurality of pixels 118, 118.2 provides for improved accuracy, because otherwise, if pixel 37: $A_2$ had been saved as the residual datum, then pixel 37: $A_1$ would have been given by:

$$A_1 = \frac{4B_1 - A_2}{3} \quad (34)$$

for which the result may have been fractional with an associated truncation error.

Referring to FIG. 26, a second embodiment of a two-dimensional decoding process 142.2 provides for decoding an image encoded in accordance with the second embodiment of the two-dimensional encoding process 138.2 illustrated in FIG. 24a, to reconstruct the values of the pixels 37 of the first kernel array 110, 110.6 from values of the down-sampled pixels 37' so as to reconstruct the corresponding first kernel array 110, 110.6 in entirety without substantial loss, for example, as follows:

First, the values of central pixels 37.2: $A_{22}, A_{32}, A_{33}, A_{23}$ are determined from the central down-sampled pixel 37.2': $B_{22}$ in combination with stored pixels 37: $\gamma_5, \gamma_6, \gamma_7$ as defined in FIG. 24b, using an equation derived from the equations illustrated in FIG. 24c.

Then, using equations derived from those illustrated in FIG. 24c, the following operations are performed in any order:

Edge pixels 37.3: $A_{12}$ and $A_{13}$ are determined from corresponding edge down-sampled pixel 37.3': $B_{12}$ in combination with stored pixel 37: $\gamma_1$ as defined in FIG. 24b and previously-determined central pixels 37.2: $A_{22}$ and $A_{23}$;

Edge pixels 37.3: $A_{21}$ and $A_{31}$ are determined from corresponding edge down-sampled pixel 37.3': $B_{21}$ in combination with stored pixel 37: $\gamma_2$ as defined in FIG. 24b and previously-determined central pixels 37.2: $A_{22}$ and $A_{32}$;

Edge pixels 37.3: $A_{42}$ and $A_{43}$ are determined from corresponding edge down-sampled pixel 37.3': $B_{32}$ in combination with stored pixel 37: $\gamma_3$ as defined in FIG. 24b and previously-determined central pixels 37.2: $A_{32}$ and $A_{33}$; and Edge pixels 37.3: $A_{24}$ and $A_{34}$ are determined from corresponding edge down-sampled pixel 37.3': $B_{23}$ in combination with stored pixel 37: $\gamma_4$ as defined in FIG. 24b and previously-determined central pixels 37.2: $A_{23}$ and $A_{33}$.

Finally, using equations derived from those illustrated in FIG. 24c, the values of corner pixels 37.1: $A_{11}, A_{41}, A_{44}, A_{14}$ are respectively determined from the corresponding respective corner down-sampled pixels 37.1': $B_{11}, B_{31}, B_{33}, B_{13}$, in combination with the previously-determined associated edge 37.3 and central 37.2 pixels.

Figure 27:
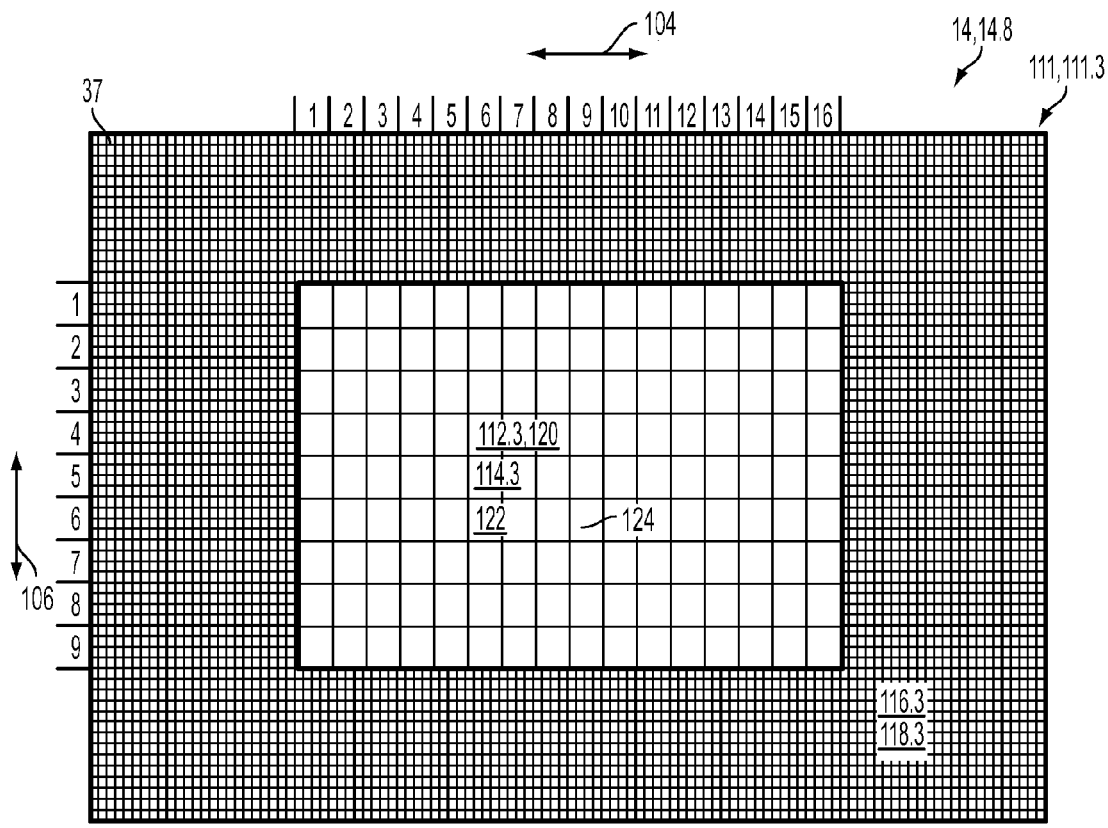
FIG. 27 illustrates a sixth embodiment of an encoded image in accordance with the third aspect of the image encoding process, comprising first and second groups of pixels.
Figure 29:
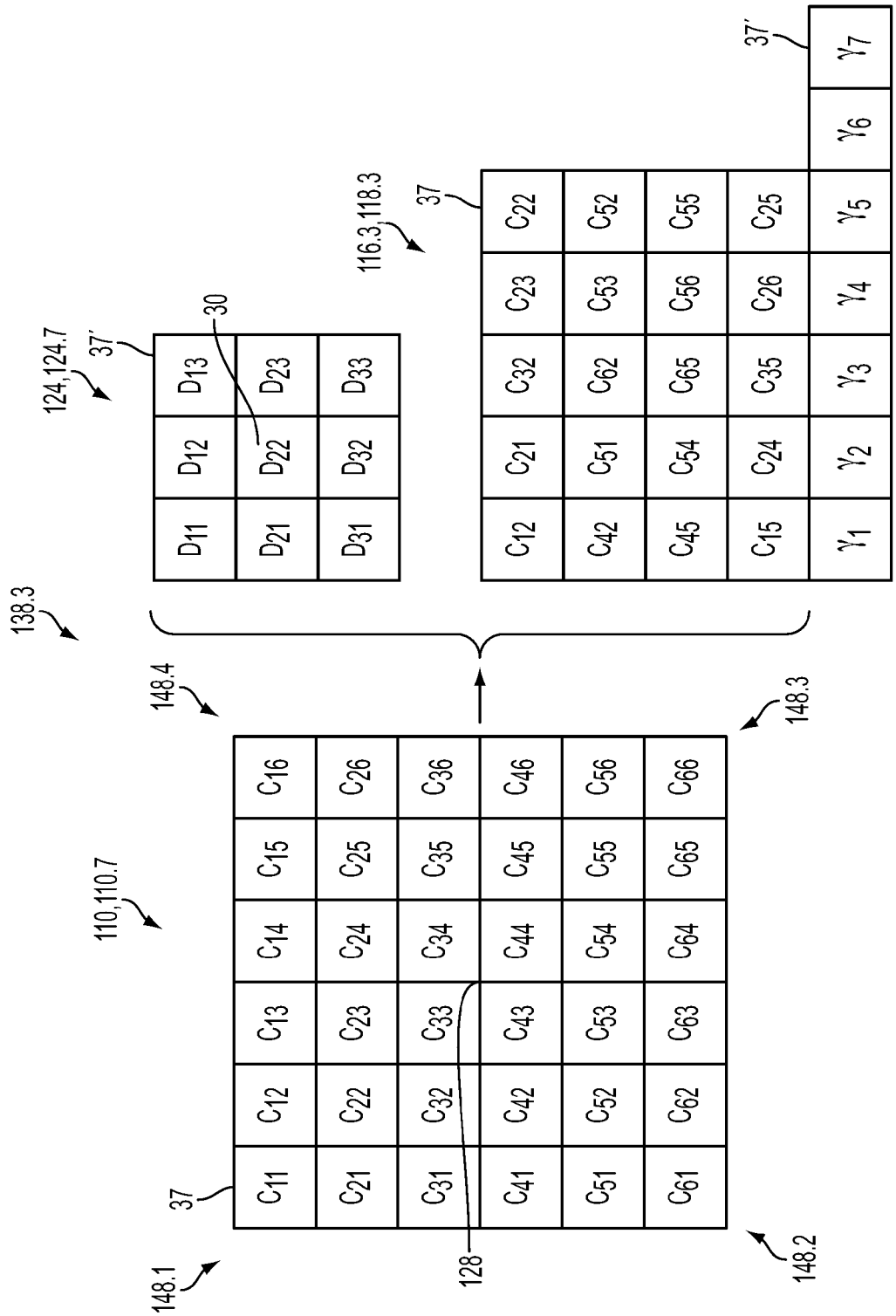
FIG. 29 illustrates a third embodiment of a two-dimensional encoding process in accordance with the third aspect of the image encoding process.

Referring to FIG. 27, a sixth embodiment of an encoded image 14.8 in accordance with the third aspect of the image encoding process is encoded within a third two-dimensional array 111, 111.3 comprising respective first 112, 112.3 and second 116, 116.3 groups of respective second 114, 114.3 and third 118, 118.3 pluralities of pixels that are transformed from the first plurality of pixels 100, 37 by an associated 6-to-3 encoding process 146—illustrated in FIGS. 29-31—for example, in one embodiment, by which each corresponding first kernel array 110, 110.7 of the original relatively-higher-resolution digitized image 12 comprises a 6-by-6 array of thirty-six pixels 37 and each corresponding second kernel array 124, 124.7 of the first group 112, 112.3 of the second plurality of pixels 114, 114.3 comprises a corresponding 3-by-3 array of nine down-sampled pixel 37', so that along each of the first 104 and second 106 dimensions, every six pixels 37 of the first plurality of pixels 100, 37 is transformed into a corresponding three pixels 37 of the second plurality of pixels 114, 114.3. An image signal 41 generated from the composite encoded image 14.8 provides for displaying the relatively-lower-resolution image 38 from the first group 112, 112.3 of the second plurality of pixels 114, 114.3 alone, and provides for displaying the relatively-higher-resolution digitized image 12 from the combination of both the first 112, 112.3 and second 116, 116.3 groups of second 114, 114.3 and third 118, 118.3 pluralities of pixels.

Figure 28A:
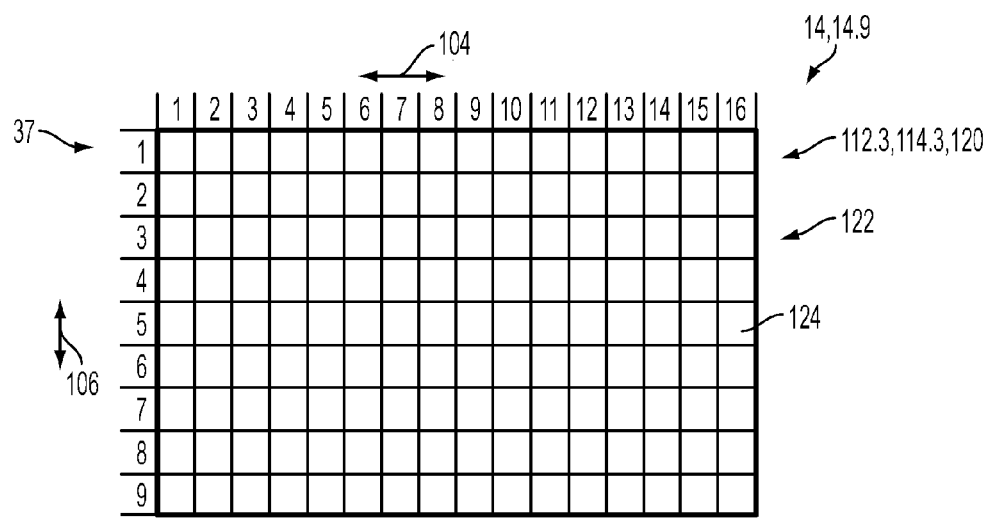
FIG. 28a illustrates a third embodiment of a first group of pixels of a relatively-lower-resolution digitized image of a seventh embodiment of an encoded image in accordance with the third aspect of the image encoding process.
Figure 28B:
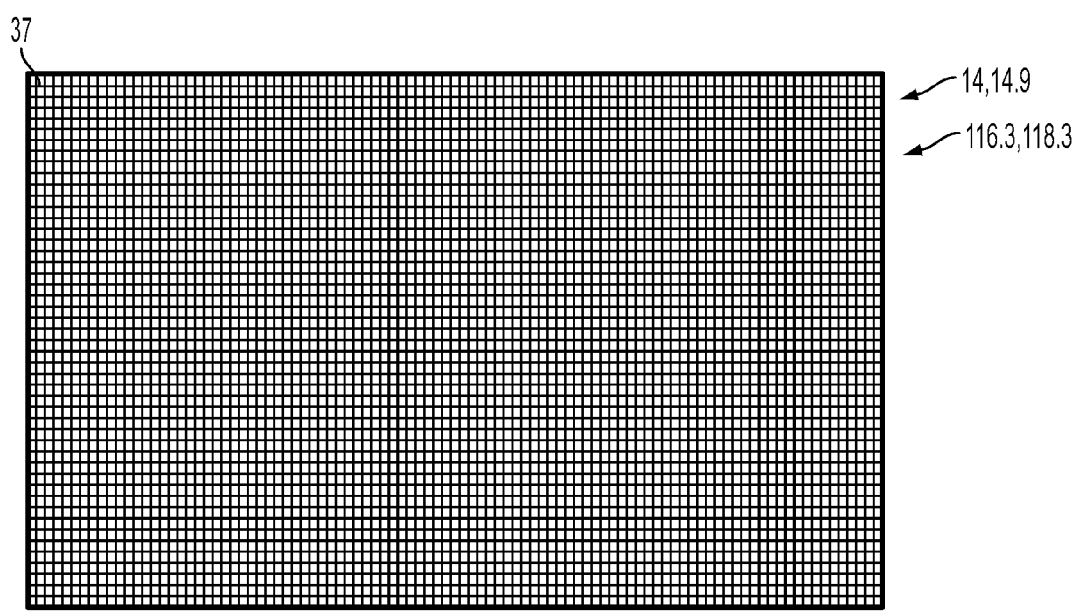
FIG. 28b illustrates a third embodiment of extended data that can be combined with the relatively-lower-resolution digitized image of the seventh embodiment of an encoded image illustrated in FIG. 28a in order to substantially reconstruct the original relatively-higher-resolution digitized image illustrated in FIG. 11.

Alternatively, referring to FIGS. 28a and 28b, the first group 112, 112.3 of the second plurality of pixels 114, 114.3 and the second group 116, 116.3 of the third plurality of pixels 118, 118.3 in a seventh embodiment of an encoded image 14.9 in accordance with the third aspect of the image encoding process can be respectively arranged for transmission as respective separate image signals 41.1, 41.2 that provide for displaying the relatively-lower resolution image from the first group 112, 112.3 of a second plurality of pixels 114, 114.3 alone, and provide for displaying the relatively-higher-resolution digitized image 12 by recombining the first 112, 112.3 and second 116, 116.3 groups of second 114, 114.3 and third 118, 118.3 pluralities of pixels from the separate image signals 41.1, 41.2.

Referring to FIG. 29, a third embodiment of a two-dimensional encoding process 138.3 in accordance with the third aspect of the image encoding process provides for directly transforming each 6-by-6 first kernel array 110, 110.7 into a corresponding 3-by-3 second kernel array 124, 124.7, wherein the down-sampled pixels 37': $D_{11}$, $D_{12}$, $D_{13}$, $D_{21}$, $D_{22}$, $D_{23}$, $D_{31}$, $D_{32}$, $D_{33}$ are each calculated in accordance with corresponding interpolation equations that are derived from a combination of 3-to-2 encoding processes 126.1, 126.2, 126.3, 126.4 as illustrated in FIGS. 30*a-d*, each respectively acting on a corresponding respective 3-by-3 quadrant 148.1, 148.2, 148.3, 148.4 of the first kernel array 110, 110.7 so as to respectively provide for generating a respective corresponding 2-by-2 intermediate kernel array 150.1, 150.2, 150.3, 150.4, each of which constitutes a different corresponding quadrant 152.1, 152.2, 152.3, 152.4 of a corresponding 4-by-4 intermediate kernel array 152, which, as illustrated in FIG. 31, is then transformed into the resulting 3-by-3 second kernel array 124, 124.7 using a 4-to-3 encoding process 144, wherein each 3-to-2 encoding processes 126.1, 126.2, 126.3, 126.4 operates in accordance with the equations illustrated in FIG. 17*b*, the 4-to-3 encoding process 144 operates in accordance with the equations illustrated in FIG. 24*c*, and the corresponding second group 116, 116.3 of the third plurality of pixels 118, 118.3 is populated in accordance with the 3-to-2 encoding processes 126.1, 126.2, 126.3, 126.4 and the 4-to-3 encoding process 144 as illustrated in FIGS. 17*a* and 24*a-b*, and described hereinabove.

In accordance with the third embodiment of the two-dimensional encoding process 138.3, the corresponding second group 116, 116.3 of the third plurality of pixels 118, 118.3 includes a combination of original pixel values ($C_{12}$-$C_{25}$) and calculated pixel values ($\gamma_1$-$\gamma_7$) as illustrated in FIG. 29. However, it should be understood that generally for the first kernel array 110 containing q pixels 37 and the second kernel array 124 containing r pixels 37, the second group 116, 116.3 of the third plurality of pixels 118, 118.3 could contain q-r original pixel values—rather than a combination of original and calculated pixel values as illustrated in FIGS. 29 and 31—similar to how the second group 116 of the third plurality of pixels 118 of the embodiment illustrated in FIG. 24*b* contains all original pixel values. For example, in one such embodiment, $\gamma_1$ could contain either original pixels $C_{13}$ or $C_{14}$, $\gamma_2$ could contain either original pixels $C_{31}$ or $C_{41}$, $\gamma_3$ could contain either original pixels $C_{63}$ or $C_{64}$, $\gamma_4$ could contain either original pixels $C_{36}$ or $C_{46}$, and the set $\{\gamma_5, \gamma_6, \gamma_7\}$ could contain any three of the four original pixels $C_{33}$, $C_{34}$, $C_{43}$ or $C_{44}$, so that second group 116, 116.3 of the third plurality of pixels 118, 118.3 would then contain exclusively original pixel values, which can provide for faster processing, wherein the down-sampled pixels 37' of the 3-by-3 second kernel array 124, 124.7 are then calculated from the remaining original pixel values of the 6-by-6 first kernel array 110, 110.7 that have not been incorporated in the second group 116, 116.3 of the third plurality of pixels 118, 118.3, in combination with the original pixel values of the second group 116, 116.3 of the third plurality of pixels 118, 118.3, in accordance with an associated set of equations that are formulated to accommodate this structure of the first 112, 112.3 and second 116, 116.3 groups of the second 114, 114.3 and third 118, 118.3 pluralities of pixels.

Accordingly, generally, the above-described one-132 and two-138 dimensional encoding processes provide for quickly down-sampling a first plurality of pixels 100, 37 containing a relatively-higher-resolution digitized image 12 so as to generate both a first group 112 of a second plurality of pixels 114 containing a relatively-lower-resolution image 38 and a second group 116 of a third plurality of pixels 118, wherein the first group 112 of the second plurality of pixels 114 alone provides for displaying a relatively high quality lower-resolution representation of the original image, and in combination with the second group 116 of the third plurality of pixels 118 using a corresponding one-140 or two-142 decoding process provides for relatively quickly reconstructing the original relatively-higher-resolution digitized image 12 substantially without loss of associated visual detail. The above-described one-132 and two-138 dimensional encoding processes provide for relatively fast operation by using linear interpolation implemented with integer arithmetic operations during both the encoding and decoding processes. In one set of embodiments, associated multiplications and divisions are implemented using binary shift operations where possible to provide for faster associated data processing.

The sampling shifts, i.e. perturbations δ, that are symmetric with respect to the centers 128, 130 of each associated kernel array 110, 124 constituting the digitized image provide for a net zero shift within each kernel array 110, 124, and provide for the associated linear interpolation process to be applied with a given down-sampling ratio R. Providing there are a sufficient number of pixels 37 in the original relatively-higher-resolution digitized image 12, a plurality of associated encoding processes 132, 138 using various associated down-sampling ratios R may be applied in sequence so as to effectively produce a new down-sampling ratio R equal in value to the product of all the individual down-sampling ratios R. Furthermore, if an original relatively-higher-resolution digitized image 12 does not have a sufficient number of pixels 37 for an integral number of associated first kernel arrays 110, then the relatively-higher-resolution digitized image 12 can be padded with zero-valued pixels 37 as necessary to accommodate an integral number of associated first kernel arrays 110, followed by appropriate truncation of the resulting zero values in the second kernel arrays 124 of the down-sampled relatively-lower-resolution image 38. It should be understood that the method of creating associated optimized encoding algorithms for specific resolutions of original and down-sampled images, as well as the algorithms themselves, may therefore be find application beyond the particular examples illustrated herein.

Referring again to FIG. 1, the associated process of standard image formatting 40—for example, image compression or coding with a CODEC—can introduce artifacts into the formatted encoded image 14' relative to the associated encoded image 14. For example, an associated image compression process may operate on what is referred to as a motion vector responsive to variation in time or space of the value of corresponding image pixels 37. For an encoded image 14 containing a combination of encoded HD (EHD) content and extended data (ED) content in separate first 112 and second 116 groups of respective second 114 and third 118 pluralities of pixels in separate regions of the encoded image 14—so as to provide for displaying either the encoded HD (EHD) content alone in a relatively-lower-resolution display format 18 on a legacy display 16.1, or a decoded combination of the both the encoded HD (EHD) content and extended data (ED) content together in a relatively-higher-resolution digitized image 12 on an associated relatively higher resolution display 16—the extended data (ED) content contains a combination of relatively disparate portions of the original relatively-higher-resolution digitized image 12, and is therefore relatively more susceptible to distortion by the associated process of standard image formatting 40, for example, by the associated image compression process.

Figure 32:
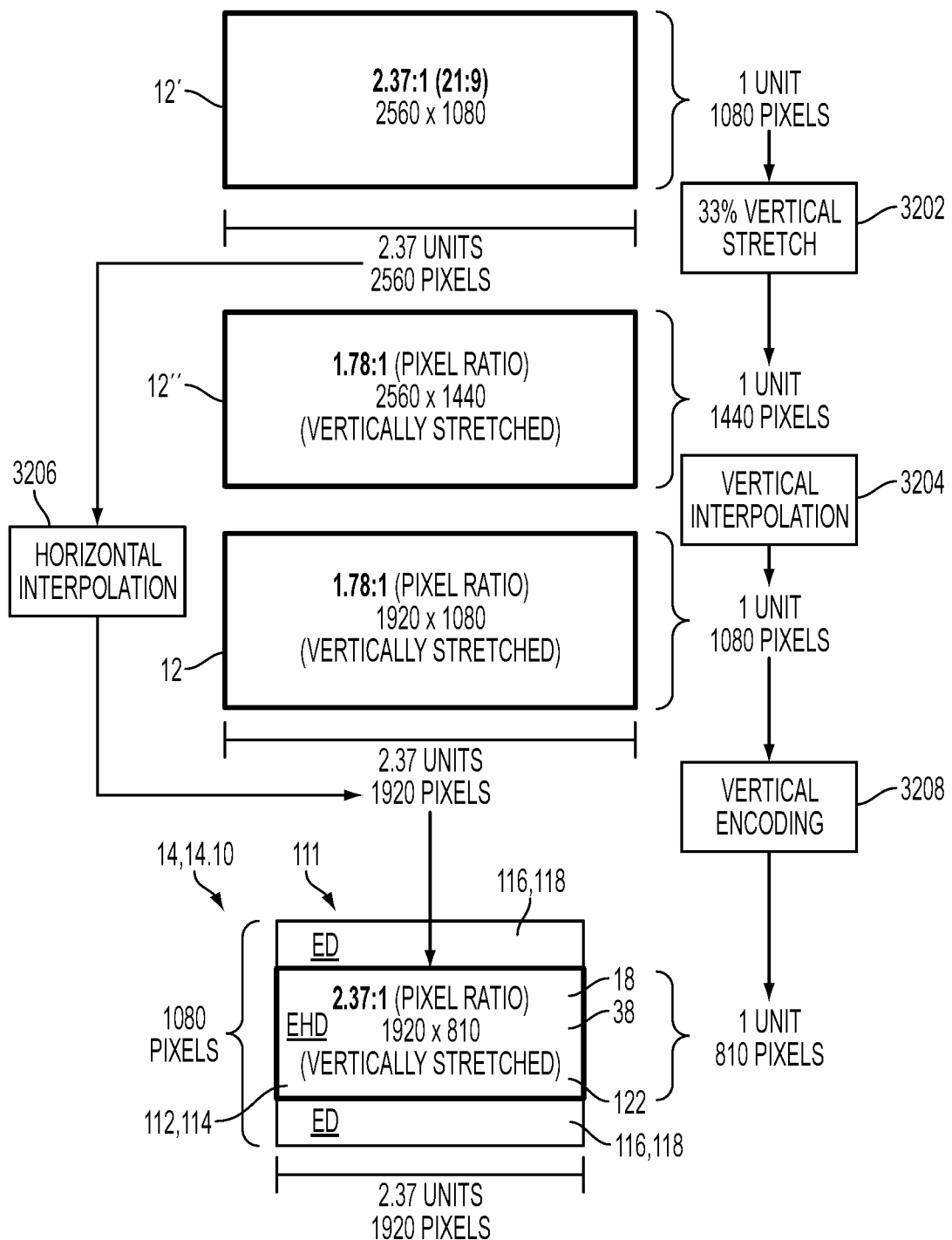
FIG. 32 illustrates an example of an image encoding process.

Processes for mitigating such distortion are described hereinbelow in respect of an example of an abstract encoded image 14, 14.10 and an associated process illustrated in FIG. 32 adapted for native use with an associated anamorphic projection system using an associated image signal 41 from a BLU-RAY DISC™ optical disc. More particularly, an original 2560×1080 relatively-higher-resolution digitized image 12' comprising 2560×1080 pixels 37—having a 2.37:1 aspect ratio (horizontal/vertical)—is transformed into a vertically-stretched 1920×1080 relatively-higher-resolution digitized image 12 comprising 1920×1080 pixels 37—having a 1.78:1 aspect ratio—the standard resolution of a BLU-RAY DISC™ optical disc, —by vertically stretching 3202 the original relatively-higher-resolution digitized image 12' by a factor of 4/3, and then both vertically 3204 and horizontally 3206 interpolating (e.g. sampling) the resulting vertically-stretched 2560× 1440 relatively-higher-resolution digitized image 12" so as to form the 1920×1080 relatively-higher-resolution digitized image 12, i.e. so as to fill an associated 1920×1080 array with interpolated pixels 37. Such "anamorphic" content can be used with either a 1920×1080 projection system employing an anamorphic lens to properly display the original 2.37:1 content, or with wider format, a 2560×1080 display 16 which can employ this full vertical resolution while electronically stretching the horizontal dimension to similarly provide the proper final aspect ratio. The 1920×1080 relatively-higher-resolution digitized image 12 may then be vertically encoded 3208 using a 4-to-3 encoding process 144 so as to generate an encoded image 14, 14.10 comprising a first group 112 of a second plurality of pixels 114 in a 1920×810 array of encoded HD (EHD) content, and a second group 116 of a third plurality of pixels 118 in a remaining 270 rows of pixels 37 of extended data (ED) content located above and below the encoded HD (EHD) content in the encoded image 14, 14.10. Because the 1920×1080 relatively-higher-resolution digitized image 12 was vertically stretched by a factor of 4/3 from its original aspect ratio, and because the encoded HD (EHD) content of the encoded image 14, 14.10 in a relatively-lower-resolution display format 18 is vertically scaled by the inverse amount, the resulting down-sampled image of the encoded HD (EHD) content in a relatively-lower-resolution display format 18 exhibits the original 2.37:1 aspect ratio, and may be displayed on a conventional HDTV display 16 as a familiar "letterbox" image by simply adding black bars of pixel values above and below this encoded HD (EHD) content.

The encoded HD (EHD) content and extended data (ED) content may be incorporated together within a common associated encoded image 14, 14.10—i.e. comprising a third two-dimensional array 111—in a variety of formats. For example, in accordance with one set of embodiments of a first aspect of formatting the encoded HD (EHD) content and extended data (ED) content within the associated encoded image 14, 14.10, the encoded HD (EHD) content is incorporated as a single contiguous two-dimensional array of pixels 37—i.e. a fifth two-dimensional array 122—within the encoded image 14, 14.10, and the extended data (ED) content is stored in a complementary region or regions of pixels 37 of the encoded image 14, 14.10. Accordingly, in respect of the above example illustrated in FIG. 32, the encoded HD (EHD) consists of 810 rows of pixels 37 in a relatively-lower-resolution display format 18, with 135 rows of pixels 37 of extended data (ED) content spread both above and below the relatively central encoded HD (EHD) content. Accordingly the first aspect of formatting provides for a resulting "letterbox" relatively-lower-resolution image 38 surrounded above and below by black bars formed by simply blanking out the pixels 37 of the associated extended data (ED) content. However, the 1920×1080 encoded image 14, 14.10 formatted in accordance with the first aspect, but then subsequently processed with standard image formatting 40—for example, using known compression schemes, so as to generate a formatted encoded image 14' suitable for transmission as an associated image signal 41—might be susceptible to errors when the relatively-higher-resolution digitized image 12 is subsequently reconstructed by decoding the encoded image 14, 14.10 reconstructed from the associated formatted encoded image 14'. More particularly, each neighboring row of extended data (ED) content represents information associated with each group of four rows from the original 1920×1080 relatively-higher-resolution digitized image 12, the latter of which typically can exhibit greater variance with respect to every fourth pixel 37 than with respect to adjacent pixels 37, resulting in typically a greater variation from row to row in the extended data (ED) content—adjacent rows of which correspond to every fourth row of the relatively-higher-resolution digitized image 12—than in the relatively-lower-resolution image 38 of the encoded HD (EHD) content. It is presumed that standard image formatting 40 compression schemes perform most optimally with smoothly varying image content rather than the relatively abrupt variations exhibited by the extended data (ED) content portion of the encoded image 14, 14.10. This problem is exacerbated by the fact that any error that impacts neighboring rows of pixels 37 of the extended data (ED) content results in corresponding errors in three other corresponding associated rows of the reconstructed relatively-higher-resolution digitized image 12 associated with the corresponding encoded HD (EHD) content, thereby creating visible artifacts therein.

Figure 33:
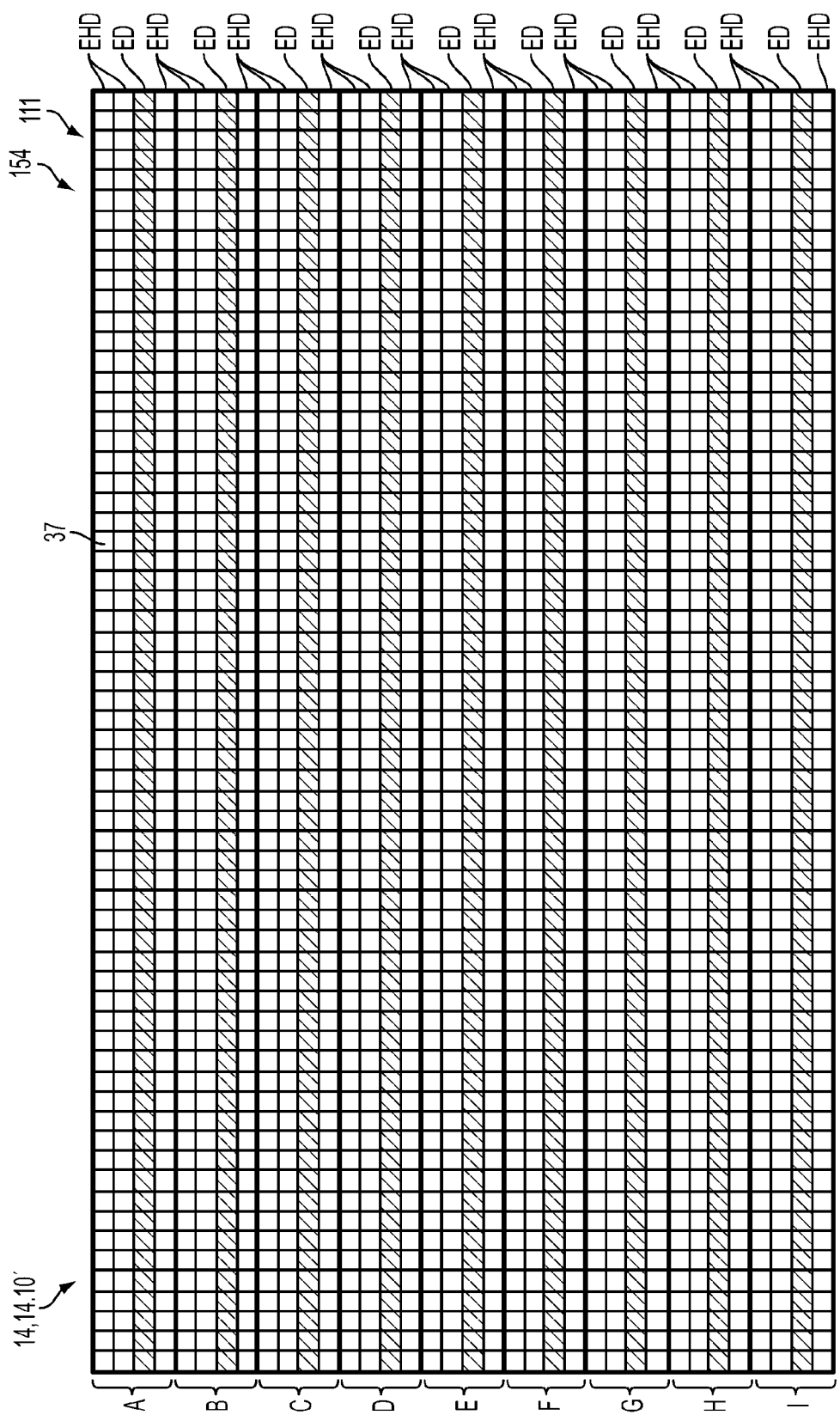
FIG. 33 illustrates an example of an encoded image formatted in accordance with a second aspect in which associated extended data (ED) content is interleaved with associated encoded HD (EHD) content.

Referring to FIG. 33, in accordance with a second aspect of formatting the encoded HD (EHD) content and extended data (ED) content within the associated encoded image 14, 14.10', the extended data (ED) content is interleaved with the associated encoded HD (EHD) content. For example, with reference to FIG. 32, for the 1920×1080 relatively-higher-resolution digitized image 12, the resulting encoded HD (EHD) content comprises three rows of down-sampled pixels 37 for every one row of pixels 37 of the associated extended data (ED) content. For example, for a given column of pixels 37, if the third pixel 37 of each set of the original four pixels 37 of the 1920×1080 relatively-higher-resolution digitized image 12 is moved to the extended data (ED) content, and the remaining first, second, and fourth pixels 37 correspond to the encoded HD (EHD) content. For example, the extended data (ED) content is interlaced within the encoded HD (EHD) content, with each row of the extended data (ED) content corresponding to the third row of a group of four rows in the relatively-higher-resolution digitized image 12 interlaced between the corresponding rows of encoded HD (EHD) content corresponding to the corresponding second and fourth rows of the relatively-higher-resolution digitized image 12. The resulting interlaced image 154 exhibits substantially less row-to-row variation relative to the extended data (ED) content formatted in accordance with the above-described non-interlaced format of the first aspect. Furthermore, any errors resulting form standard image formatting 40, e.g. compression, would substantially impact only relatively immediate neighboring rows of pixels 37, rather than relatively more distant rows of pixels 37 as would result from the first aspect of formatting. Accordingly, the second aspect of formatting, with the extended data (ED) content interlaced with the encoded HD (EHD) content, would be relatively less susceptible to errors caused by the subsequent standard image formatting 40 compression process, and also can provide for relatively fewer artifacts in a relatively-higher-resolution digitized image 12 reconstructed by decoding the encoded image 14, 14.10'. However, the relatively-lower-resolution image 38 content incorporated in the interlaced image 154 cannot be displayed directly on legacy display 16.1 without first being recovered by preprocessing the encoded image 14, 14.10'. More particularly, in order to display the relatively-lower-resolution image 38 alone, every third row of the interlaced image 154 would first need to be discarded or ignored, and black bars would need to be added above and below the resulting remaining relatively-lower-resolution image 38 so as to provide for an associated "letterbox" format of the relatively-lower-resolution image 38. Accordingly, in order to display the relatively-lower-resolution image 38 in "letterbox" format, the interlaced format of the second aspect requires an additional, albeit computationally simple, processing step that would not otherwise be required for the non-interlaced format in accordance with the first aspect of formatting.

The above-described errors in the reconstruction of the relatively-higher-resolution digitized image 12—caused by the process of standard image formatting 40 of the encoded image 14 formatted in accordance with the first aspect—can also be mitigated by appropriate configuration of the associated encoding 126, 132, 138, 144, 146 or decoding 140 processes so as to reduce the sensitivity of resulting values of reconstructed pixels 37 of the relatively-higher-resolution digitized image 12 to errors in the associated formatted encoded image 14', and in the encoded image 14 reconstructed therefrom, caused by the process of standard image formatting 40 and by the associated inverse process.

For example, the following examples illustrate the affect of particular formulations of the equations associated with a 4-to-3 encoding process 144 and associated decoding process 140 on the sensitivity of resulting values of reconstructed pixels 37 of the relatively-higher-resolution digitized image 12 to errors in the associated extended data (ED) content caused by the associated process of standard image formatting 40, e.g. compression, or by the associated inverse process.

From equations (19), (23) and (24), the values $B_i$ of the second kernel array 124 are given from the corresponding values $A_i$ of the first kernel array 110, as follows for a one-dimensional encoding process 132:

$$B_1 = \frac{3A_1 + A_2}{4}, \quad (23)$$

$$B_2 = \frac{A_2 + A_3}{2}, \text{ and} \quad (19)$$

$$B_3 = \frac{3A_4 + A_3}{4}. \quad (24)$$

In accordance with a first aspect of a one-dimensional decoding process 140', either $A_1$ or $A_4$ is stored—for example, $A_1$—in the extended data (ED) content, and the resulting corresponding reconstructed values $A_i$ of the first kernel array 110 are given as a function of the value of $A_1$ in combination with the values $B_i$ of the second kernel array 124 by:

$$A_2 = 4B_1 - 3A_1, \quad (28)$$

$$A_3 = 2B_2 - A_2 = 2B_2 - 4B_1 + 3A_1, \text{ and} \quad (29.1)$$

$$A_4 = \quad (30.1)$$
$$\frac{4B_3 - A_3}{3} = \frac{4B_3 - 2B_2 + 4B_1 - 3A_1}{3} = \frac{4B_3 - 2B_2 + 4B_1}{3} - A_1.$$

Accordingly, if the process of standard image formatting 40 in generating the formatted encoded image 14' from the encoded image 14, or its inverse in generating the encoded image 14 from the formatted encoded image 14', causes an error $\epsilon$ in the value of $A_1$, then reconstructed value $\overline{A_1}$ of $A_1$ is given by:

$$\overline{A_1} = A_1 + \epsilon \quad (35)$$

Accordingly, by substituting the value $\overline{A_1}$ for $A_1$ in equations (28), (29.1) and (30.1), the difference between the reconstructed $\overline{A_i}$ and actual $A_i$ values—i.e. the error in the resulting reconstructed relatively-higher-resolution digitized image 12—is then given by:

$$\overline{A_1} - A_1 = \epsilon, \quad (36.1)$$

$$\overline{A_2} - A_2 = -3\epsilon, \quad (36.2)$$

$$\overline{A_3} - A_4 = 3\epsilon, \text{ and} \quad (36.3)$$

$$\overline{A_4} - A_4 = -\epsilon. \quad (36.4)$$

Accordingly, the maximum error in the reconstructed pixels 37 is less than or equal to three times the error $\epsilon$ in the values $A_1$ of the pixels 37 of each group of four pixels 37 that are stored in the extended data (ED) content.

In accordance with a second aspect of a one-dimensional decoding process 140'', either $A_2$ or $A_3$ is stored—for example, $A_2$—in the extended data (ED) content, and the resulting corresponding reconstructed values $A_i$ of the first kernel array 110 are given as a function of the value of $A_2$ in combination with the values $B_i$ of the second kernel array 124 by:

$$A_1 = \frac{4B_1 - A_2}{3} = \frac{4B_1}{3} - \frac{A_2}{3}, \quad (34.1)$$

$$A_3 = 2B_2 - A_2, \quad (29)$$
and
$$A_4 = \frac{4B_3 - A_3}{3} = \frac{4B_3 - 2B_2 + A_2}{3} = \frac{4B_3 - 2B_2}{3} + \frac{A_2}{3}. \quad (30.2)$$

Accordingly, if the process of standard image formatting 40 in generating the formatted encoded image 14' from the encoded image 14, or its inverse in generating the encoded image 14 from the formatted encoded image 14', causes an error $\epsilon$ in the value of $A_2$, then reconstructed value $\overline{A_2}$ of $A_2$ is given by:

$$\overline{A_2} = A_2 + \epsilon \quad (37)$$

Accordingly, by substituting the value $\overline{A_2}$ for $A_2$ in equations (34), (29) and (30.2), the difference between the reconstructed $\overline{A_i}$ and actual $A_i$ values—i.e. the error in the resulting reconstructed relatively-higher-resolution digitized image 12—is then given by:

$$\overline{A_2} - A_2 = \varepsilon, \quad (38.1)$$

$$\overline{A_1} - A_1 = -\frac{\varepsilon}{3}, \quad (38.2)$$

$$\overline{A_3} - A_3 = -\varepsilon, \quad (38.3)$$

and $$\overline{A_4} - A_4 = \frac{\varepsilon}{3}. \quad (38.4)$$

Accordingly, the maximum error in the reconstructed pixels 37 is less than or equal to the error $\varepsilon$ in the values $A_2$ of the pixels 37 of each group of four pixels 37 that are stored in the extended data (ED) content.

Generally, the extended data (ED) content is not limited to storing values of original pixels 37 of the relatively-higher-resolution digitized image 12, but instead, may contain values derived the original pixels 37 of the relatively-higher-resolution digitized image 12, for example, from a combination of values of original pixels 37 sufficient in combination with the encoded HD (EHD) content to algebraically reconstruct the original pixels 37 of the relatively-higher-resolution digitized image 12. For example, the encoded HD (EHD) content may be based upon a difference of two original pixel values having the least influence on the down-sampled and reconstructed images. For example, in accordance with a third aspect of a one-dimensional decoding process 140''', the difference between $A_2$ and $A_3$ of two relatively central pixels 37, for example, $$C = A_2 - A_3 \quad (39)$$

is stored in the extended data (ED) content, and the resulting corresponding reconstructed values $A_i$ of the first kernel array 110 are given as a function of the value $C$ in combination with the values $B_i$ of the second kernel array 124 by:

$$A_2 = B_2 + \frac{C}{2}, \quad (40)$$

(found by simultaneously solving $A_2 - A_3 = C$ and $A_2 + A_3 = 2B_2$ from equations (39) and (29), respectively)

$$A_3 - 2B_2 - A_2 = B_2 - \frac{C}{2}, \quad (29.2)$$

$$A_1 = \frac{4B_1 - A_2}{3} = \frac{4B_1 - B_2}{3} - \frac{C}{6}, \quad (34.2)$$

and $$A_4 = \frac{4B_3 - A_3}{3} = \frac{4B_3 - B_2}{3} + \frac{C}{6}. \quad (30.3)$$

Accordingly, if the process of standard image formatting 40 in generating the formatted encoded image 14' from the encoded image 14, or its inverse in generating the encoded image 14 from the formatted encoded image 14', causes an error $\varepsilon$ in the value of $C$, then reconstructed value $\overline{C}$ of $C$ is given by:

$$\overline{C} = C + \varepsilon \quad (41)$$

Accordingly, by substituting the value $\overline{C}$ for $C$ in equations (29.2), (34.2) and (30.3), the difference between the reconstructed $\overline{A_i}$ and actual $A_i$ values—i.e. the error in the resulting reconstructed relatively-higher-resolution digitized image 12—is then given by:

$$\overline{A_1} - A_1 = -\frac{\varepsilon}{6}, \quad (42.1)$$

$$\overline{A_2} - A_2 = \frac{\varepsilon}{2}, \quad (42.1)$$

$$\overline{A_3} - A_3 = -\frac{\varepsilon}{2}, \quad (42.3)$$

and $$\overline{A_4} - A_4 = \frac{\varepsilon}{6}. \quad (42.4)$$

Accordingly, the maximum error in the reconstructed pixels 37 is less than or equal to half the error $\varepsilon$ in the values of $C$ of each group of four pixels 37 that are stored in the extended data (ED) content.

Accordingly, in reconstructing the values of four original pixels 37 from corresponding values of three down-sampled pixels 37' as described hereinabove, the value stored in the extended data (ED) content is adapted to have relatively minor affect on the corresponding associated pixels 37 of the relatively-higher-resolution digitized image 12 that are reconstructed from the encoded HD (EHD) content in combination with the extended data (ED) content. Accordingly, any error or noise in a value stored in the extended data (ED) content that has a lesser contribution to corresponding reconstructed values will result in correspondingly lower error or noise in the resulting reconstructed relatively-higher-resolution digitized image 12.

Although the above first through thirds aspects of the one-dimensional decoding process 140', 140'', 140''' have been illustrated with respect to a 4-to-3 encoding process 144, it should be understood that a similar analysis can be applied with other encoding processes, for example, the 3-to-2 encoding process 126 or the 6-to-3 encoding process 146 that have been described hereinabove. Generally, for any combination of encoding and decoding processes, the error or noise in the reconstruction of the relatively-higher-resolution digitized image 12 caused by the process of standard image formatting 40 can be reduced by adapting the decoding process, and possibly also the associated encoding process, to minimize the following cost function:

$$\Omega = \sum_{i=1}^{N} (\overline{A_i} - A_i)^2. \quad (43)$$

It should be understood that the algebraic manipulations are not necessarily limited to those of the first through thirds aspects of the one-dimensional decoding process 140', 140'', 140''' described hereinabove.

Furthermore, the associated encoding processes may also be considered for manipulation to minimize or reduce the contribution of a particular stored original data value to the error or noise in the resulting reconstruction of the relatively-higher-resolution digitized image 12. However, such alteration may result in a tradeoff in the fidelity of the associated relatively-lower-resolution image 38.

For decoding processes for which the value stored in the extended data (ED) content is an algebraic manipulation of values of the original pixels 37 of the relatively-higher-resolution digitized image 12, it is beneficial that the resulting value that is stored in the extended data (ED) content be of similar magnitude to the other pixels 37 of the encoded image 14 so as to mitigate against the above-described distortion that might result from the process of standard image formatting 40 in generating the formatted encoded image 14' from the encoded image 14, or its inverse in generating the encoded image 14 from the formatted encoded image 14'. For example, because all the values of pixels 37 in the relatively-higher-resolution digitized image 12 are non-negative, then the above-described distortion can be mitigated to at least some extent if the resulting values that are stored in the extended data (ED) content are also non-negative. For example, in cooperation with the third aspect of the one-dimensional decoding process 140''', this can be achieved by storing the non-negative value C' in the extended data (ED) content, instead of just storing the value C, wherein C' is given by:

$$C' = \frac{C+\gamma}{2}, \tag{44}$$

wherein $\gamma$ is the maximum value of a pixel 37 (for example, 255 for an 8-bit representation of a single color of a pixel value).

Accordingly, by appropriate formulation of the associated decoding process, the reduction in susceptibility to errors $\epsilon$ caused by the process of standard image formatting 40 in generating the formatted encoded image 14' from the encoded image 14, or its inverse in generating the encoded image 14 from the formatted encoded image 14', provides for a substantial improvement in the resulting reconstructed relatively-higher-resolution digitized image 12 that is sufficient to achieve acceptable results when using the first aspect of formatting the encoded HD (EHD) content and extended data (ED) content within the associated encoded image 14, 14.10 because of substantially less sensitivity to compression errors and associated noise. This is because the associated values stored in the extended data (ED) content are differences in values of adjacent pixels 37 in the original relatively-higher-resolution digitized image 12, so that the variation in intensity or color between adjacent corresponding pixel values of the extended data (ED) content is relatively small and therefore relatively less sensitive to associated errors from image compression during the process of standard image formatting 40. Furthermore, any error resulting from image compression and decompression during the process of standard image formatting 40 in generating the formatted encoded image 14' from the encoded image 14, or its inverse in generating the encoded image 14 from the formatted encoded image 14', would be affecting the corresponding difference between neighboring pixels 37 in the reconstructed relatively-higher-resolution digitized image 12, rather then directly affecting the values of the pixels 37, which substantially reduces the visibility of such an error.

Figure 34:
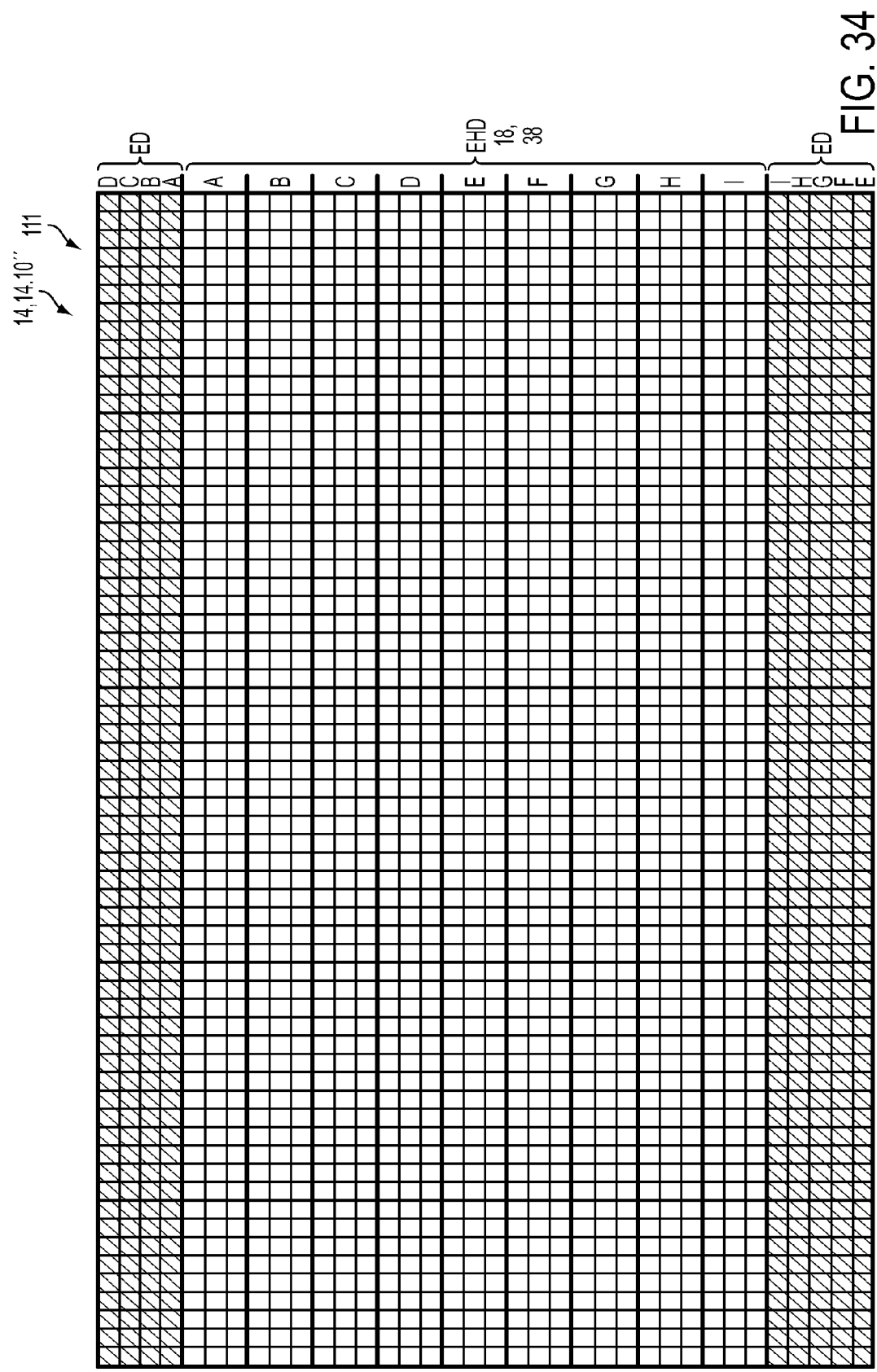
FIG. 34 illustrates an example of an encoded image formatted in accordance with a third aspect.

Referring to FIG. 34, in accordance with the first aspect of formatting the encoded HD (EHD) content and extended data (ED) content within an associated encoded image 14, 14.10'', the associated reconstructed relatively-higher-resolution digitized image 12 may be made further relatively less sensitive to errors associated with the process of standard image formatting 40 by ordering the pixels 37 in the extended data (ED) content so that their order mirrors the order of the associated corresponding regions of the encoded HD (EHD) content, so as to present relatively smoother transitions from one pixel 37 to another. For example, for the 4-to-3 encoding process 144 described hereinabove in respect of FIG. 32, with the original four-row regions from a portion of the original relatively-higher-resolution digitized image 12 identified in FIG. 34 as "A" through "I", and sequentially ordered in the associated encoded HD (EHD) content from top to bottom, the associated extended data (ED) content for regions "A" through "D"—corresponding to roughly the upper-half portion of the relatively-higher-resolution digitized image 12—is located above the encoded HD (EHD) content, but in reverse order, so that the extended data (ED) content for region "A" is adjacent to the encoded HD (EHD) content for region "A", and the associated extended data (ED) content for regions "I" through "E"—corresponding to roughly the lower-half portion of the relatively-higher-resolution digitized image 12—is located below the encoded HD (EHD) content, also in reverse order, so that the extended data (ED) content for region "I" is adjacent to the encoded HD (EHD) content for region "I". This provides for urging a relatively smoother transition between the encoded HD (EHD) content and the associated encoded HD (EHD) content of the encoded image 14, so as to urge a reduction in errors associated with the process of standard image formatting 40 in generating the formatted encoded image 14' from the encoded image 14, or its inverse in generating the encoded image 14 from the formatted encoded image 14', for example, during the corresponding associated compression and decompression processes.

In accordance with a fourth aspect of an associated decoding process, the encoded HD (EHD) content may be decoded directly to provide an approximation of the relatively-higher-resolution digitized image 12 without necessitating the associated extended data (ED) content, whereby the data of the extended data (ED) content is instead estimated from the associated data of the encoded HD (EHD) content, so as to provide for displaying the resulting approximation of the relatively-higher-resolution digitized image 12 on a display 16 having a relatively higher resolution than the resolution of the relatively-lower-resolution image 38 provided by the encoded HD (EHD) content alone.

For example, equations (8) and (9) of the one-dimensional 3-to-2 encoding process 126,—for example, as illustrated in FIGS. 15a-b and 16,—that provides for generating associated encoded HD (EHD) content, can be represented in vector-matrix form as follows;

$$\overline{B} = \begin{bmatrix} B_1 \\ A_2 \\ B_2 \end{bmatrix} = \begin{bmatrix} \frac{2}{3} & \frac{1}{3} & 0 \\ 0 & 1 & 0 \\ 0 & \frac{1}{3} & \frac{2}{3} \end{bmatrix} \cdot \begin{bmatrix} A_1 \\ A_2 \\ A_3 \end{bmatrix} = \overline{E} \cdot \overline{A} \tag{45}$$

wherein $\overline{B}$ is the vector containing a composite of corresponding portions of the first group 112 of the second plurality of pixels 114 ($B_1$, $B_2$) and the second group 116 of the third plurality of pixels 118 ($A_2$), $\overline{A}$ is the vector of corresponding original pixel 37 values of the relatively-higher-resolution digitized image 12, and $\overline{E}$ is the associated transformation matrix that provides for implementing the associated 3-to-2 encoding process 126.

Equations (14) and (15) of the corresponding associated one-dimensional decoding process 140.1, 140.2 illustrated in FIGS. 18a-b, can be represented in vector-matrix form, as follows;

$$\overline{A} = \begin{bmatrix} A_1 \\ A_2 \\ A_3 \end{bmatrix} = \begin{bmatrix} \frac{3}{2} & -\frac{1}{2} & 0 \\ 0 & 1 & 0 \\ 0 & -\frac{1}{2} & \frac{3}{2} \end{bmatrix} \cdot \begin{bmatrix} B_1 \\ A_2 \\ B_2 \end{bmatrix} = \overline{D} \cdot \overline{B} \qquad (46)$$

wherein $\overline{E}$ is the associated transformation matrix that provides for implementing the associated one-dimensional decoding process 140.1, 140.2.

Substituting equation (45) into equation (46), if the residual pixel 37 value ($A_2$) is saved and used, the associated one-dimensional decoding process 140.1, 140.2 provides for reconstructing all pixels exactly, as follows:

$$\overline{A} = \overline{D} \cdot \overline{B} = \overline{D} \cdot \overline{E} \cdot \overline{A} \qquad (47.1)$$

or, $$\overline{A} = \begin{bmatrix} \frac{3}{2} & -\frac{1}{2} & 0 \\ 0 & 1 & 0 \\ 0 & -\frac{1}{2} & \frac{3}{2} \end{bmatrix} \cdot \begin{bmatrix} \frac{2}{3} & \frac{1}{3} & 0 \\ 0 & 1 & 0 \\ 0 & \frac{1}{3} & \frac{2}{3} \end{bmatrix}. \qquad (47.2)$$

$$\overline{A} = \begin{bmatrix} 1 & 0 & 0 \\ 0 & 1 & 0 \\ 0 & 0 & 1 \end{bmatrix} \cdot \overline{A} = \overline{I} \cdot \overline{A} = \overline{A}.$$

However, for purposes of decoding in accordance with the fourth aspect of the associated decoding process, the value ($A_2$) corresponding to the residual pixel 37 of the 3-to-2 encoding process 126 may be approximated from the values of the second plurality of pixels 114 ($B_1$, $B_2$), for example, by an approximation function $f(B_1, B_2)$, so as to provide for reconstructing an approximation of the relatively-higher-resolution digitized image 12 for display on a display 16 having a relatively higher resolution than the resolution of the relatively-lower-resolution image 38 provided by the encoded HD (EHD) content of the second plurality of pixels 114 ($B_1$, $B_2$), alone, without requiring the corresponding original second group 116 of the third plurality of pixels 118 ($A_2$). Accordingly, using this approximation $f(B_1, B_2)$ for the residual pixel 37 value ($A_2$), the corresponding approximation of the corresponding pixels 37 ($A_1$, $A_2$, $A_3$) of the relatively-higher-resolution digitized image 12 for the one-dimensional decoding process 140.1, 140.2 is then given by:

$$\overline{A}' = \begin{bmatrix} A_1' \\ A_2' \\ A_3' \end{bmatrix} = \begin{bmatrix} \frac{3}{2} & -\frac{1}{2} & 0 \\ 0 & 1 & 0 \\ 0 & -\frac{1}{2} & \frac{3}{2} \end{bmatrix} \cdot \begin{bmatrix} B_1 \\ f(B_1, B_2) \\ B_2 \end{bmatrix} \qquad (48)$$

wherein $\overline{A}'$ is the resulting vector containing the approximation of the pixels 37 ($A_1$, $A_2$, $A_3$) of the relatively-higher-resolution digitized image 12.

For example, in one embodiment, the value ($A_2$) corresponding to the residual pixel 37 is approximated by the average of surrounding values of the second plurality of pixels 114 ($B_1$, $B_2$), or $f(B_1, B_2) = (B_1+B_2)/2$, so that equation (48) becomes:

$$\overline{A}' = \begin{bmatrix} A_1' \\ A_2' \\ A_3' \end{bmatrix} = \begin{bmatrix} \frac{5}{4} & -\frac{1}{4} \\ \frac{1}{2} & \frac{1}{2} \\ -\frac{1}{4} & \frac{5}{4} \end{bmatrix} \cdot \begin{bmatrix} B_1 \\ B_2 \end{bmatrix} = \overline{D}' \cdot \overline{B}'. \qquad (49)$$

From equation (45), the vector $\overline{B}'$ containing the first group 112 of the second plurality of pixels 114 ($B_1$, $B_2$) alone is given by:

$$\overline{B}' = \begin{bmatrix} \frac{2}{3} & \frac{1}{3} & 0 \\ 0 & \frac{1}{3} & \frac{2}{3} \end{bmatrix} \cdot \begin{bmatrix} A_1 \\ A_2 \\ A_3 \end{bmatrix} = \overline{E}' \cdot \overline{A} \qquad (50)$$

wherein $\overline{E}'$ is the associated transformation matrix that provides for implementing the associated 3-to-2 encoding process 126.

The approximation of the pixels 37 ($A_1'$, $A_2'$, $A_3'$) of the relatively-higher-resolution digitized image 12 is then given as follows by substituting equation (50) into equation (49):

$$\overline{A}' = \overline{D}' \cdot \overline{B}' = \overline{D}' \cdot \overline{E}' \cdot \overline{A} \qquad (51.1)$$

or, $$\overline{A}' = \begin{bmatrix} \frac{5}{4} & -\frac{1}{4} \\ \frac{1}{2} & \frac{1}{2} \\ -\frac{1}{4} & \frac{5}{4} \end{bmatrix} \cdot \begin{bmatrix} \frac{2}{3} & \frac{1}{3} & 0 \\ 0 & \frac{1}{3} & \frac{2}{3} \end{bmatrix}. \qquad (51.2)$$

$$\begin{bmatrix} A_1 \\ A_2 \\ A_3 \end{bmatrix} = \begin{bmatrix} \frac{5}{6} & \frac{1}{3} & -\frac{1}{6} \\ \frac{1}{3} & \frac{1}{3} & \frac{1}{3} \\ -\frac{1}{6} & \frac{1}{3} & \frac{5}{6} \end{bmatrix} \cdot \overline{A} = \overline{G} \cdot \overline{A},$$

wherein the matrix $\overline{G}$ would be equal to the identity matrix $\overline{I}$ if the approximation was exact.

The difference between the approximate ($A_1'$, $A_2'$, $A_3'$) and actual ($A_1$, $A_2$, $A_3$) values of the pixels 37 of the relatively-higher-resolution digitized image 12 is then given by:

$$\overline{A}' - \overline{A} = [\overline{G} - \overline{I}] \cdot \overline{A}, \qquad (52)$$

and the associated sum of squares of the differences between the approximate ($A_1'$, $A_2'$, $A_3'$) and actual ($A_1$, $A_2$, $A_3$) values is then given by an error measure Q as follows:

$$Q = \text{Trace}(\overline{A}^T \cdot [\overline{G} - \overline{I}]^T \cdot [\overline{G} - \overline{I}] \cdot \overline{A}), \qquad (53)$$

which, for a given set of pixel 37 values ($A_1$, $A_2$, $A_3$), provides a measure of the quality or fidelity of the approximation, and which can be used to select amongst possible approximation functions $f(B_1, B_2)$ so as to provide improving the quality or fidelity of the approximation, if possible.

As a second example of the fourth aspect of the associated decoding process, equations (23), (19) and (24) of the one-dimensional 4-to-3 encoding process 144,—for example, as illustrated in FIGS. 22a-b and 23,—that provides for generating associated encoded HD (EHD) content, can be represented in vector-matrix form as follows;

$$\overline{B} = \begin{bmatrix} B_1 \\ A_2 \\ B_2 \\ B_3 \end{bmatrix} = \begin{bmatrix} \frac{3}{4} & \frac{1}{4} & 0 & 0 \\ 0 & 1 & 0 & 0 \\ 0 & \frac{1}{2} & \frac{1}{2} & 0 \\ 0 & 0 & \frac{1}{4} & \frac{3}{4} \end{bmatrix} \cdot \begin{bmatrix} A_1 \\ A_2 \\ A_3 \\ A_4 \end{bmatrix} = \overline{E} \cdot \overline{A}. \quad (54)$$

wherein $\overline{B}$ is the vector containing a composite of corresponding portions of the first group 112 of the second plurality of pixels 114 ($B_1$, $B_2$, $B_3$) and the second group 116 of the third plurality of pixels 118 ($A_2$), $\overline{A}$ is the vector of corresponding original pixel 37 values of the relatively-higher-resolution digitized image 12, and $\overline{E}$ is the associated transformation matrix that provides for implementing the associated 4-to-3 encoding process 144.

Equations (34.1), (29) and (30.2) of the corresponding associated one-dimensional decoding process 140.3, 140.4 illustrated in FIGS. 25a-b, can be represented in vector-matrix form, as follows;

$$\overline{A} = \begin{bmatrix} A_1 \\ A_2 \\ A_3 \\ A_4 \end{bmatrix} = \begin{bmatrix} \frac{4}{3} & -\frac{1}{3} & 0 & 0 \\ 0 & 1 & 0 & 0 \\ 0 & -1 & 2 & 0 \\ 0 & \frac{1}{3} & -\frac{2}{3} & \frac{4}{3} \end{bmatrix} \cdot \begin{bmatrix} B_1 \\ A_2 \\ B_2 \\ B_3 \end{bmatrix} = \overline{D} \cdot \overline{B}. \quad (55)$$

wherein $\overline{D}$ is the associated transformation matrix that provides for implementing the associated one-dimensional decoding process 140.3, 140.4.

Substituting equation (54) into equation (55), if the residual pixel 37 value ($A_2$) is saved and used, the associated one-dimensional decoding process 140.3, 140.4 provides for reconstructing all pixels exactly, as follows:

$$\overline{A} = \overline{D} \cdot \overline{B} = \overline{D} \cdot \overline{E} \cdot \overline{A} \quad (56.1)$$

or, $$\overline{A} = \begin{bmatrix} \frac{4}{3} & -\frac{1}{3} & 0 & 0 \\ 0 & 1 & 0 & 0 \\ 0 & -1 & 2 & 0 \\ 0 & \frac{1}{3} & -\frac{2}{3} & \frac{4}{3} \end{bmatrix}. \quad (56.2)$$

$$\begin{bmatrix} \frac{3}{4} & \frac{1}{4} & 0 & 0 \\ 0 & 1 & 0 & 0 \\ 0 & \frac{1}{2} & \frac{1}{2} & 0 \\ 0 & 0 & \frac{1}{4} & \frac{3}{4} \end{bmatrix} \cdot \overline{A} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \cdot \overline{A} = \overline{I} \cdot \overline{A} = \overline{A}$$

However, for purposes of decoding in accordance with the fourth aspect of the associated decoding process, the value ($A_2$) corresponding to the residual pixel 37 of the 3-to-2 encoding process 126 may be approximated from the values of the second plurality of pixels 114 ($B_1$, $B_2$), for example, by an approximation function $f(B_1, B_2, B_3)$, so as to provide for reconstructing an approximation of the relatively-higher-resolution digitized image 12 for display on a display 16 having a relatively higher resolution than the resolution of the relatively-lower-resolution image 38 provided by the encoded HD (EHD) content of the second plurality of pixels 114 ($B_1$, $B_2$, $B_3$), alone, without requiring the corresponding original second group 116 of the third plurality of pixels 118 ($A_2$). Accordingly, using this approximation for the residual pixel 37 value ($A_2$), the corresponding approximation of the corresponding pixels 37 ($A_1$, $A_2$, $A_3$, $A_4$) of the relatively-higher-resolution digitized image 12 for the one-dimensional decoding process 140.1, 140.2 is then given by:

$$\overline{A'} = \begin{bmatrix} A'_1 \\ A'_2 \\ A'_3 \\ A'_4 \end{bmatrix} = \begin{bmatrix} \frac{4}{3} & -\frac{1}{3} & 0 & 0 \\ 0 & 1 & 0 & 0 \\ 0 & -1 & 2 & 0 \\ 0 & \frac{1}{3} & -\frac{2}{3} & \frac{4}{3} \end{bmatrix} \cdot \begin{bmatrix} B_1 \\ f(B_1, B_2, B_3) \\ B_2 \\ B_3 \end{bmatrix} \quad (57)$$

wherein $\overline{A'}$ is the resulting vector containing the approximation of the pixels 37 ($A_1$, $A_2$, $A_3$, $A_4$) of the relatively-higher-resolution digitized image 12.

For example, in one embodiment, the value ($A_2$) corresponding to the residual pixel 37 is approximated by the average of surrounding values of the second plurality of pixels 114 ($B_1$, $B_2$), or $f(B_1, B_2) = (B_1 + B_2)/2$, so that equation (57) becomes:

$$\overline{A'} = \begin{bmatrix} A'_1 \\ A'_2 \\ A'_3 \\ A'_4 \end{bmatrix} = \begin{bmatrix} \frac{7}{6} & -\frac{1}{6} & 0 \\ \frac{1}{2} & \frac{1}{2} & 0 \\ -\frac{1}{2} & \frac{3}{2} & 0 \\ \frac{1}{6} & -\frac{1}{2} & \frac{4}{3} \end{bmatrix} \cdot \begin{bmatrix} B_1 \\ B_2 \\ B_3 \end{bmatrix} = \overline{D'} \cdot \overline{B'} \quad (58)$$

From equation (54), the vector $\overline{B'}$ containing the first group 112 of the second plurality of pixels 114 ($B_1$, $B_2$, $B_3$) alone is given by:

$$\overline{B'} = \begin{bmatrix} \frac{3}{4} & \frac{1}{4} & 0 & 0 \\ 0 & \frac{1}{2} & \frac{1}{2} & 0 \\ 0 & 0 & \frac{1}{4} & \frac{3}{4} \end{bmatrix} \cdot \begin{bmatrix} A_1 \\ A_2 \\ A_3 \\ A_4 \end{bmatrix} = \overline{E'} \cdot \overline{A} \quad (59)$$

wherein $\overline{E'}$ is the associated transformation matrix that provides for implementing the associated 4-to-3 encoding process 144.

The approximation of the pixels 37 ($A_1'$, $A_2'$, $A_3'$, $A_4'$) of the relatively-higher-resolution digitized image 12 is then given as follows by substituting equation (59) into equation (58):

$$\overline{A'} = \overline{D'} \cdot \overline{B'} = \overline{D'} \cdot \overline{E'} \cdot \overline{A} \qquad (60.1)$$

or, $$\overline{A'} = \begin{bmatrix} \frac{7}{6} & -\frac{1}{6} & 0 \\ \frac{1}{2} & \frac{1}{2} & 0 \\ -\frac{1}{2} & \frac{3}{2} & 0 \\ \frac{1}{6} & -\frac{1}{2} & \frac{4}{3} \end{bmatrix}. \qquad (60.2)$$

$$\begin{bmatrix} \frac{3}{4} & \frac{1}{4} & 0 & 0 \\ 0 & \frac{1}{2} & \frac{1}{2} & 0 \\ 0 & 0 & \frac{1}{4} & \frac{3}{4} \end{bmatrix} \cdot \begin{bmatrix} A_1 \\ A_2 \\ A_3 \\ A_4 \end{bmatrix} = \begin{bmatrix} \frac{7}{8} & \frac{5}{24} & -\frac{1}{12} & 0 \\ \frac{3}{8} & \frac{3}{8} & \frac{1}{4} & 0 \\ \frac{3}{8} & \frac{5}{8} & \frac{3}{4} & 0 \\ \frac{1}{8} & -\frac{5}{24} & \frac{1}{12} & 1 \end{bmatrix} \cdot \overline{A} = \overline{G} \cdot \overline{A}$$

wherein the matrix $\overline{G}$ would be equal to the identity matrix $\overline{I}$ if the approximation was exact.

The difference between the approximate ($A_1'$, $A_2'$, $A_3'$, $A_4'$) and actual ($A_1$, $A_2$, $A_3$, $A_4$) values of the pixels 37 of the relatively-higher-resolution digitized image 12 is then given by:

$$\overline{A'} - \overline{A} = [\overline{G} - \overline{I}] \cdot \overline{A}, \qquad (61)$$

and the associated sum of squares of the differences between the approximate ($A_1'$, $A_2'$, $A_3'$, $A_4'$) and actual ($A_1$, $A_2$, $A_3$, $A_4$) pixel 37 values is then given by an error measure Q as follows:

$$Q = \text{Trace}(\overline{A}^T \cdot [\overline{G} - \overline{I}]^T \cdot [\overline{G} - \overline{I}] \cdot \overline{A}) \qquad (62)$$

which, for a given set of pixel 37 values ($A_1$, $A_2$, $A_3$, $A_4$), provides a measure of the quality or fidelity of the approximation, and which can be used to select amongst possible approximation functions $f(B_1, B_2, B_3)$ so as to provide improving the quality or fidelity of the approximation, if possible.

Similarly, the fourth aspect of the decoding process may be applied to the two-dimensional decoding processes 142.1, 142.2, wherein, for example, the associated approximation functions $f()$ may generally be dependent upon values from either adjacent rows, adjacent columns, or both adjacent rows and adjacent columns of the associated first group 112 of the second plurality of pixels 114. For example, for the second kernel array 124, 124.3 illustrated in FIG. 17a, the corresponding value of pixel 37 ($A_{22}$) could be approximated by the average of values of pixels 37 ($B_{11}$, $B_{12}$, $B_{21}$, $B_{23}$). Accordingly, the form of the associated approximation function $f()$ is not limited, although the averaging of adjacent values is relatively simple and can be readily implemented in a computationally efficient manner.

The above-described encoding and decoding processes can be adapted for relatively fast computation, for example, using integer arithmetic operations instead of floating point operations, or using relatively fast binary shift operations for multiplications or divisions by powers of two. With division operations, a non-integer result may need to be approximated by an integer result, which is most efficiently accomplished by simply truncating the resulting value to exclude any remainder. However, truncation is not as accurate as rounding when the value being truncated is closer in magnitude to the next higher integer value. A more accurate approach would be to round the initial value to the closest integer. However, rounding is inherently a more complex process and computationally expensive than truncation, and therefore less desirable. The affect of a resulting quotient truncation error may be mitigated in a division operation by a priori increasing the value of the dividend by an amount sufficient for the result to be relatively close in a value to a corresponding result that would have been achieved by rounding. For example, when dividing an integer by a value of four, there are only four possible remainders, as follows: 0.0, 0.25, 0.50 and 0.75. A truncation of this remainder results in an associated truncation error. Assuming that each remainder has an equal likelihood, then the corresponding average truncation error would be 0.375. The average truncation error can be reduced by adding a value of half the divisor to the dividend. For example, for a divisor having a value of four, the addition of a value of two to the dividend results in possible net truncation errors of 0.0, 0.25, 0.50 and 0.25, resulting in an average truncation error of 0.25. Similarly, for a divisor having a value of three, the addition of a value of one to the dividend will similarly reduce the associated average truncation error.

Furthermore, if an arithmetic operation would result in a pixel value having a value that is either less than zero or greater than the maximum pixel value—for example, 255 for a pixel color represented by 8 bits,—then such a value would be replaced with a corresponding clipped value, for example, replaced with zero if the value is below zero or replaced with 255 if the value is greater than 255.

If the cumulative effects of truncation and other computational errors still ultimately impact the fidelity of resultant images, additional modifications similar to those above may be contemplated to improve the empirical result.

Referring to FIGS. 35a and 35b, respective fifth and sixth embodiments of a one-dimensional encoding process 132.5, 132.6 in accordance with the third aspect provide for a down-sampling ratio R of 4-to-3, wherein either the associated first kernel array 110, 110.5 is illustrated as row of four sequential pixels 37: $A_1$, $A_2$, $A_3$, $A_4$ that are transformed into a second kernel array 124, 124.5 with a corresponding row of three down-sampled pixels 37': $B_1$, $B_2$, $B_3$ as illustrated in FIG. 35a, or the associated first kernel array 110, 110.6 is illustrated as column of four sequential pixels 37: $A_1$, $A_2$, $A_3$, $A_4$ that are transformed into a second kernel array 124, 124.6 with a corresponding column of three down-sampled pixels 37': $B_1$, $B_2$, $B_3$ as illustrated in FIG. 35b, and a corresponding extra data pixel $\gamma$ responsive to a difference between two of the original pixels 37: $A_2$, $A_3$ is stored in the second group 116 of the third plurality of pixels 118, so as to provide for reconstructing the values of the original four sequential pixels 37: $A_1$, $A_2$, $A_3$, $A_4$ responsive to the values of the down-sampled pixels 37': $B_1$, $B_2$, $B_3$ in combination with the value of the corresponding extra data pixel $\gamma$, wherein the values of the down-sampled pixels 37': $B_1$, $B_2$, $B_3$ an the corresponding extra data pixel $\gamma$ are given by:

$$B_1 = (4A_1 + A_2)/5, \qquad (63)$$

$$B_2 = (A_2 + A_3)/2, \qquad (64)$$

$$B_3 = (4A_4 + A_3)/5, \text{ and} \qquad (65)$$

$$\gamma = (A_3 - A_2 + \mu)/2. \qquad (66)$$

or generally in respect of equations (63) and (65):

$$B_1 = (\alpha A_1 + \beta A_2)/(\alpha + \beta), \qquad (63.1)$$

$$B_3 = (\alpha A_4 + \beta A_3)/(\alpha + \beta), \text{ and} \qquad (65.1)$$

wherein $\mu$ is the maximum value of a pixel 37 (for example, 255 if a single color of a pixel value is represented by 8 bits).

Alternatively, referring to FIG. 35c, it will be recognized that equations (63)-(65) are given from equations (18)-(20) with α=4 and β=1.

Alternatively, equations (63)-(66) may be expressed in vector-matrix form as:

$$[\bar{B}|\gamma] = \begin{bmatrix} B_1 \\ B_2 \\ B_3 \\ \gamma \end{bmatrix} = \begin{bmatrix} \frac{4}{5} & \frac{1}{5} & 0 & 0 \\ 0 & \frac{1}{2} & \frac{1}{2} & 0 \\ 0 & 0 & \frac{1}{5} & \frac{4}{5} \\ 0 & -\frac{1}{2} & \frac{1}{2} & 0 \end{bmatrix} \cdot \begin{bmatrix} A_1 \\ A_2 \\ A_3 \\ A_4 \end{bmatrix} + \begin{bmatrix} 0 \\ 0 \\ 0 \\ \frac{\mu}{2} \end{bmatrix} = \bar{E} \cdot \bar{A} + \bar{H} \quad (67)$$

The second kernel arrays 124, 124.5, 124.6 and the corresponding associated extra data pixels γ are respectively stored in a corresponding first 112, 112.2 and second 116, 116.2 groups of the second 114, 114.2 and third 118, 118.2 pluralities of pixels, as described more fully hereinabove.

Accordingly, an original relatively-higher-resolution digitized image 12 having 4N pixels 37 in one dimension is treated as having N cells, i.e. first kernel arrays 110, 110.4, 110.5, of four pixels 37 each, wherein N is a positive integer, and a down-sampled relatively-lower-resolution image 38 having 3N pixels in the same dimension is treated as having N cells, i.e. second kernel arrays 124, 124.5, 124.6, of three pixels each. The sequential position of any original image cell 110, 110.5, 110.6 is in correspondence with the same sequential position of the down-sampled image cell 124, 124.5, 124.6, wherein the four pixel 37 values of a given cell A (110, 110.5, 110.6) of the original image are identified sequentially as $A_1$, $A_2$, $A_3$ and $A_4$ and the three down-sampled pixel 37' values of cell B (124, 124.5, 124.6) of the down sampled relatively-lower-resolution image 38 are identified sequentially as $B_1$, $B_2$ and $B_3$. Accordingly, $A_1$ is on one side, or the "edge", of the cell A (110, 110.5, 110.6) corresponding to the edge pixel $B_1$ on the same side. Similarly, $A_4$ and $B_3$ are the corresponding edge pixels 37, 37' on the opposite side of their respective cells A, B.

Figure 36A:
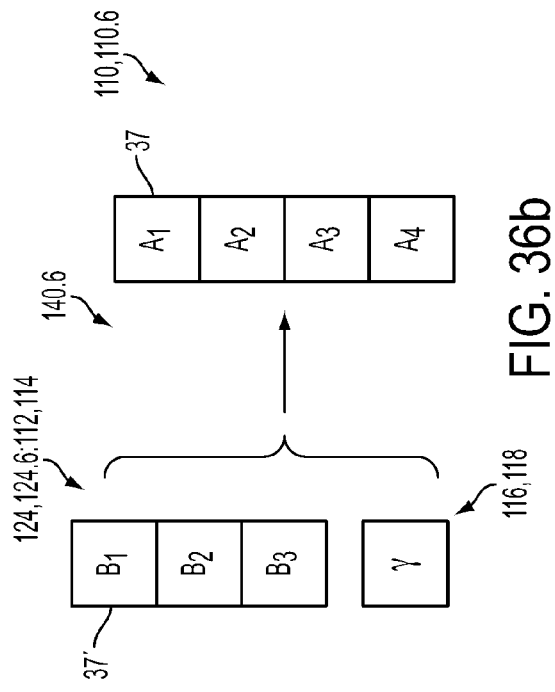
Figure 36B:
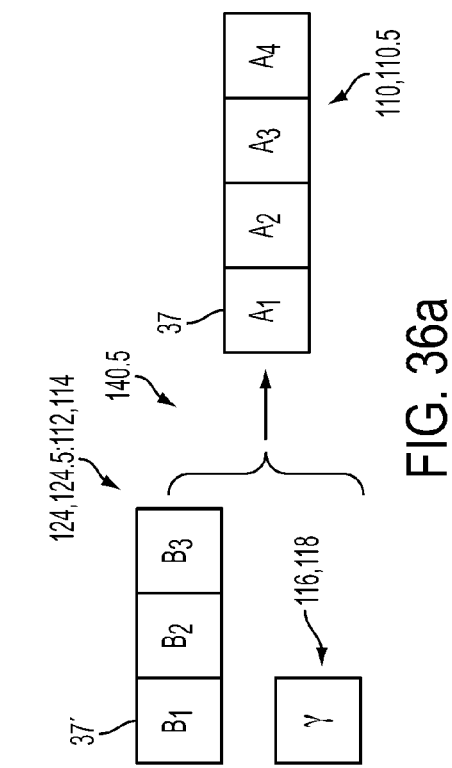
FIG. 36b illustrates a sixth embodiment of a one-dimensional decoding process in accordance with the third aspect of the image encoding process, for decoding an image encoded in accordance with the sixth embodiment of the one-dimensional encoding process illustrated in FIG. 35b.

Referring to FIGS. 36a and 36b, corresponding respective fifth and sixth embodiments of an associated one-dimensional decoding process 140.5, 140.6 provides for decoding the first 112, 112.2 and second 116, 116.2 groups of the second 114, 114.2 and third 118, 118.2 pluralities of pixels—encoded in accordance with the corresponding fifth and sixth embodiments of the one-dimensional encoding process 132.5, 132.6 illustrated respectively in FIGS. 35a and 35b—so as to reconstruct the corresponding relatively-higher-resolution digitized image 12 therefrom with substantially no loss in associated image content, wherein for each second kernel array 124, 124.5, 124.6, a corresponding row or column, respectively, of three previously down-sampled pixels 37': $B_1$, $B_2$, $B_3$ are recombined with the corresponding extra data pixel γ in accordance with the following decoding equations, so as to regenerate the remaining original pixels 37: $A_2$, $A_3$, $A_4$, so as to form the corresponding row or column, respectively, of four pixels 37: $A_1$, $A_2$, $A_3$, $A_4$ of the resulting corresponding first kernel array 110, 110.5, 110.6, i.e.:

$$A_2 = B_2 - \gamma + \mu/2, \quad (68)$$

$$A_1 = (5B_1 - A_2)/4, \quad (69)$$

$$A_3 = 2B_2 - A_2, \text{ and} \quad (70)$$

$$A_4 = (5B_3 - A_3)/4. \quad (71)$$

or, in respect of equations (69) and (71), generally:

$$A_1 = ((\alpha+\beta)B_1 - \beta A_2)/\alpha, \quad (69.1)$$

$$A_4 = ((\alpha+\beta)B_3 - \beta A_3)/\alpha. \quad (71.1)$$

Alternatively, equations (68)-(71) may be expressed in vector-matrix form as a function of the down-sampled pixels 37': $B_1$, $B_2$, $B_3$ and the extra data pixel γ as:

$$\bar{A} = \begin{bmatrix} A_1 \\ A_2 \\ A_3 \\ A_4 \end{bmatrix} = \begin{bmatrix} \frac{5}{4} & -\frac{1}{4} & 0 & \frac{1}{4} \\ 0 & 1 & 0 & -1 \\ 0 & 1 & 0 & 1 \\ 0 & -\frac{1}{4} & \frac{5}{4} & -\frac{1}{4} \end{bmatrix} \cdot \begin{bmatrix} B_1 \\ B_2 \\ B_3 \\ \gamma \end{bmatrix} + \begin{bmatrix} -\frac{\mu}{8} \\ \frac{\mu}{2} \\ -\frac{\mu}{2} \\ \frac{\mu}{8} \end{bmatrix} = \bar{D} \cdot \bar{B} + \bar{H}' \quad (72)$$

The formulation of equations (68)-(71) or equation (72) beneficially provides for a greater—i.e. more heavily weighted—dependence of the reconstructed pixels 37: $A_1$, $A_2$, $A_3$, $A_4$, upon the associated down-sampled pixel values 37': $B_1$, $B_2$, $B_3$ than upon the value of the associated extra data pixel γ, thereby providing for increased fidelity of the reconstructed relatively-higher-resolution digitized image 12 if the extra data pixel γ is either erroneous or must be estimated.

Furthermore, equations (68)-(71) or equation (72) may be beneficially reformulated so as to provide for the evaluation thereof using relatively fast binary operations. The reformulated equations may be adapted with additional values so as to minimize the effects of associated truncation errors, and optimized so as to reduce or minimize associated aggregate global errors as opposed to minimizing the error of each associated operation within the associated algorithm. Furthermore, the reformulated equations may be adapted to reduce or minimize the relative computational complexity of the associated reconstruction algorithm, for example, so as to reduce or minimize the number of operations during reconstruction. For example, equations (63)-(66) and (68)-(71) may be rewritten as follows to take advantage of binary operations while simultaneously minimizing aggregate truncation error and minimizing the computational complexity of the associated reconstruction process:

$$B_1 = (A_1 << 2 + A_2 + 2)/5 \quad (73)$$

$$B_2 = (A_2 + A_3) >> 1 \quad (74)$$

$$B_3 = (A_4 << 2 + A_3 + 2)/5 \quad (75)$$

$$\gamma = (A_3 - A_2 + \mu) >> 1 \quad (76)$$

$$A_2 = B_2 - \gamma + \text{half\_}\mu \quad (77)$$

$$A_1 = (B_1 << 2 + B_1 - A_2) >> 2 \quad (78)$$

$$A_3 = B_2 << 1 - A_2 \quad (79)$$

$$A_4 = (B_3 << 2 + B_3 - A_3) >> 2 \quad (80)$$

wherein half_μ is the integer value of μ/2, the symbol "<<" indicates that the binary form of the preceding value is shifted left by the number of bits indicated to the right of the symbol, and the symbol ">>" indicates a similar operation but shifting to the right by the indicated number of bits.

For example, X>>2 means shifting the binary representation of X twice to the right, which excluding the affects of truncation, is equivalent to dividing X by 4. It should be understood that individually, equations (73)-(80) may result in corresponding associated individual truncation errors. Accordingly, in one embodiment, each associated computed value is set to the nearest extreme of an acceptable value range if that computed value is beyond that range. For example, if $A_2$ is found to be less than zero and the acceptable range is zero to some positive integer, then $A_2$ would be set to zero.

Accordingly, equations (73)-(76) provide for implementing the associated one-dimensional encoding process 132.5, 132.6, and equations (77)-(80) provide for implementing the corresponding associated one-dimensional decoding process 140.5, 140.6, using relatively simple binary operations that can be evaluated relatively quickly.

For example, in one set of embodiments, where possible, the computational complexity of reconstruction process—for example, as embodied by the one-dimensional decoding process 140.5, 140.6 for a one-dimensional reconstruction process—is minimized, even at the expense of greater relative complexity of the associated encoding process—for example, as embodied by the one-dimensional encoding process 132.5, 132.6 for a one-dimensional encoding process—when generating image content for mass distribution, for example, the creation of an optical video disc, for example, a BLU-RAY DISC™. In such applications, the associated down-sample process, i.e. the image encoding process, does not necessarily need to be fast or may be performed by relatively fast processing equipment. However, the resulting image-encoded products used for playback of such content generally require real time reconstruction processing using relatively simpler or less powerful computational resources that benefit from reduced computational complexity in any algorithms implemented thereby, for example, as would be associated with the decoding or reconstruction operations in playback components such as BLU-RAY players.

It has been observed that the relatively-lower-resolution image 38 down-sampled in accordance with equations (73)-(76) resulted in a relatively minor increase in associated aliasing artifacts relative to the original relatively-higher-resolution digitized image 12. However these artifacts were relatively inconsequential for image test patterns and virtually unnoticeable in actual imagery.

The above-described fourth aspect of the associated decoding process provides for decoding the associated encoded HD (EHD) content directly without necessitating the associated extended data (ED) content. For example, equation (57) provides for estimating four sequential pixels 37: $A_1, A_2, A_3, A_4$ responsive to the values of associated down-sampled pixels 37': $B_1, B_2, B_3$ without necessitating a value for a corresponding extra data pixel $\gamma$. However, in accordance with a fifth aspect—which is governed by the same transformation equations as the fourth aspect,—the associated decoding process can be used to up-sample an original relatively-lower-resolution image 38 so as to form a corresponding approximated relatively-higher-resolution digitized image 12 suitable for display on a corresponding relatively-higher-resolution display 16.

In accordance with another example, the fourth and fifth aspects of the associated decoding process may be adapted so as to depend upon an estimate of the difference, or equivalently, the slope, between two pixels 37, 37', so as to provide for further reducing or minimizing associated reconstruction errors.

More particularly, in accordance with one embodiment, substituting equation (66) in equation (68), or equation (76) in equation (77), respectively, gives:

$$A_2 = B_2 - (A_3 - A_2)/2, \text{ or} \tag{81.1}$$

$$A_2 = B_2 - (A_3 - A_2) \gg 1. \tag{81.2}$$

Accordingly, the only extra data needed to reconstruct $A_2$ is the difference between $A_3$ and $A_2$ or, equivalently, the slope between those two pixel 37 values. Furthermore, the value of $A_2$ is primarily responsive to the value of $B_2$, a known value, because in calculating the value of $A_2$, the value of $B_2$ is weighted by unity, whereas the corresponding slope between $A_3$ and $A_2$ is weighted by half. Accordingly, if the slope between $A_3$ and $A_2$ can be estimated, equations (81.1 and 81.2) would be expected to provide a more accurate estimate of $A_2$ than that provided by estimating $A_2$ as a weighted average of $B_1$ and $B_2$, for example, as in equation (57).

For example, in accordance with one embodiment, the slope between $A_3$ and $A_2$ is estimated as a weighted average of known slopes closest to those points. More particularly, the slope determined by values $B_3$ and $B_2$ is at a location that is relatively close to one side of $A_3$ in sampling space and the slope determined by values $B_2$ and $B_1$ is at a location that is relatively close to the opposite side of $A_2$ in sampling space. Accordingly, in one embodiment, the slope between $A_3$ and $A_2$ is estimated by the average value of the above two slopes, i.e. the slope determined by the values $B_3$ and $B_2$ averaged with the slope determined by the values $B_2$ and $B_1$, which mathematically resolves to half the difference between $B_3$ and $B_1$, i.e. $(B_3 - B_1)/2$. Furthermore, because the distance between pixel locations $B_3$ and $B_1$ is not the same as the distance between pixel locations $A_2$ and $A_3$, a multiplier $\alpha$ may be adapted to scale this distance to provide a more accurate estimate of the slope between $A_3$ and $A_2$, for example, so as to provide for the following estimate of $A_2$.

$$A_2 = B_2 - \alpha (B_3 - B_1) \gg 2 \tag{82}$$

The value of multiplier $\alpha$ can be determined either directly or empirically. For example, the multiplier $\alpha$ can be empirically determined so as to provide for the best subjective visual fidelity in a given reconstructed image, or a given set of reconstructed images, while also providing for equation (82) to be implemented using relatively simple binary operations. For example, in one embodiment, the value of multiplier $\alpha$ was empirically determined to be $5/4$, thereby providing for equation (82) to be implemented with the following relatively simple binary operations:

$$A_2 = B_2 - ((B_3 - B_1) \ll 2 + B_3 - B_1) \gg 4 \tag{83}$$

As an alternative to the use of a single empirical result, the value of multiplier $\alpha$ may be represented by a range between empirically determined reasonable extremes so as to provide for a particular user may select from within that range the value of the multiplier $\alpha$ that they might consider to provide the subjectively best image reconstruction. For example, a relatively lesser value of $5/32$ for the multiplier $\alpha$ produces a somewhat softer but less digital appearance, whereas a relatively greater value of $11/32$ for the multiplier $\alpha$ produces a clearer—but more digital and therefore less natural—appearance. Equation (82) may therefore be rewritten to provide a narrow range of multiplier $\alpha$ while simultaneously providing for relatively simple binary operations, as follows:

$$A_2 = B_2 - [(B_3 - B_1) \ll 3 + D_1 * ((B_3 - B_1) \ll 1) + D_2 * (B_3 - B_1)] \gg 5 \tag{84}$$

wherein parameters $D_1$ and $D_2$ may adopt any of values $-1, 0$ or $1$, depending on user preference, which effectively provides for seven different values of multiplier $\alpha$ in equation (82).

Accordingly, equations (77)-(84) provide for implementing the corresponding associated one-dimensional decoding process 140.5, 140.6, using relatively simple binary operations that can be evaluated relatively quickly, using a relatively minimal amount of estimation, for example, whereby one estimated data value (extra data pixel γ) is used to determine four relatively high resolution pixel 37 values ($A_1, A_2, A_3, A_4$), and whereby the one estimated data value (extra data pixel γ) has a relatively low influence on the estimated pixel 37 values ($A_1, A_2, A_3, A_4$), so that the resulting representation of the relatively-higher-resolution digitized image 12, although possibly imperfect, is of relatively high fidelity, and may be calculated relatively quickly relative to conventional scaling approaches.

Figure 37A:
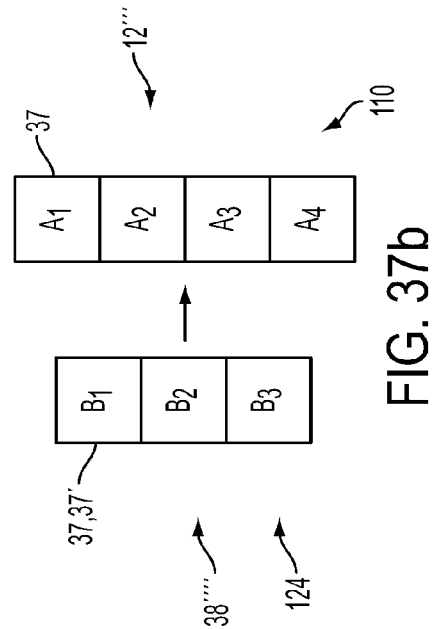
FIG. 37a illustrates a fifth aspect of a one-dimensional decoding process as applied along a row dimension of the associated relatively-low-resolution and relatively-high-resolution images.
Figure 37B:
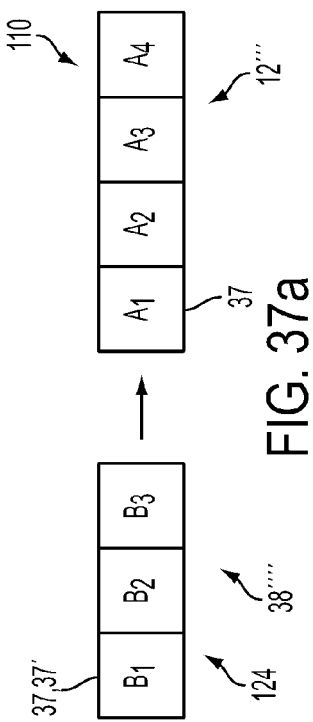
FIG. 37b illustrates the fifth aspect of a one-dimensional decoding process as applied along a column dimension of the associated relatively-low-resolution and relatively-high-resolution images.

Referring to FIGS. 37a and 37b, in accordance with the fifth aspect of the associated decoding process, any original relatively-lower-resolution image 38'''' having 3N pixel values in a given direction may be treated as an approximation to a relatively-lower-resolution image 38 produced by the down-sampling algorithms described hereinabove. Accordingly, fifth aspect of the associated decoding process provides for up-sampling the original relatively-lower-resolution image 38'''' and generating a corresponding relatively-higher-resolution digitized image 12''', for example, that would be suitable for use with a corresponding relatively-high-resolution display 16. Accordingly, the original relatively-lower-resolution image 38'''' having 3N pixels in a given dimension is reconstructed to a corresponding relatively-higher-resolution digitized image 12'''' having 4N pixels in same dimension in accordance with the following previously-developed equations:

$$A_2 = B_2 - [(B_3 - B_1) << 3 + D_1*((B_3 - B_1) << 1) + D_2*(B_3 - B_1)] >> 5 \quad (84)$$

$$A_1 = (B_1 << 2 + B_1 - A_2) >> 2 \quad (78)$$

$$A_3 = B_2 << 1 - A_2 \quad (79)$$

$$A_4 = (B_3 << 2 + B_3 - A_3) >> 2 \quad (80)$$

It should be understood that each pixel 37, 37' will generally comprise a vector of independent image property values, referred to herein as a pixel vector, for example associated values for associated red, green and blue subpixels for color rendering, and that the above described algebraic operations (e.g. multiplication, division, binary shifting, addition, multiplication) on a given pixel would be separately performed on each element of the associated pixel vector or associated subpixels.

It should also be understood that the first group 112 of the second plurality of pixels 114 could be used without necessitating separate storage and/or transmission of the second group 116 of the third plurality of pixels 118, so as to provide for an alternative system and method for displaying a relatively-lower resolution image 38, for example, an alternative method of down-sampling a relatively-higher-resolution digitized image 12.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of processing an image representation, comprising:
    a. either receiving a first group of a second plurality of pixels, or extracting said first group of said second plurality of pixels from a first image representation, wherein said first group of said second plurality of pixels comprises a fourth two-dimensional array of pixels representative of a digitized image at a first resolution thereof, a width of said digitized image is along a first dimension of said fourth two-dimensional array of pixels, a height of said digitized image is along a second dimension of said fourth two-dimensional array of pixels, and
    b. displaying a first two-dimensional array of pixels, wherein said first two-dimensional array of pixels is representative of said digitized image at a second resolution thereof, said second resolution is relatively higher than said first resolution, and the operation of displaying said first two-dimensional array of pixels comprises determining at least one pixel of said first two-dimensional array of pixels responsive to an algebraic combination of at least one corresponding pixel of said first group of said second plurality of pixels and at least one pixel selected from the group consisting of a corresponding pixel of a second group of a third plurality of pixels, and an estimate of a corresponding at least one pixel of said first two-dimensional array of pixels, wherein, if used, said corresponding pixel of said second group of said third plurality of pixels is either received or extracted from either said first image representation or a second image representation, and if used, said estimate of said corresponding at least one pixel of said first two-dimensional array of pixels is responsive to a corresponding pixel of said first group of said second plurality of pixels and responsive to a difference between different corresponding pixels of said first group of said second plurality of pixels.

2. A method of processing an image representation as recited in claim 1, further comprising reconstructing said first two-dimensional array of pixels from said first and second groups of said second and third pluralities of pixels prior to the operation of displaying said first two-dimensional array of pixels, wherein the operation of reconstructing said first two-dimensional array of pixels comprises inserting therein either rows or columns of pixels from said second group of said third plurality of pixels between pixels of said first two-dimensional array of pixels determined responsive to pixels of corresponding rows or columns of said first group of said second plurality of pixels and responsive to said rows or columns of pixels from said second group of said third plurality of pixels.

3. A method of processing an image representation as recited in claim 1, wherein the operation of reconstructing said first two-dimensional array of pixels comprises determining at least one row or column of pixels in said first two-dimensional array of pixels is responsive to an algebraic combination of a corresponding row or column of pixels of said first group of said second plurality of pixels and a corresponding row or column of pixels of said second group of said third plurality of pixels.

4. A method of processing an image representation as recited in claim 1, further comprising electronically stretching said first two-dimensional array of pixels along either said height or said width prior to the operation of displaying said first two-dimensional array of pixels.

5. A method of processing an image representation as recited in claim 1, further comprising decoding said first image representation so as to generate a third two-dimensional array of pixels, wherein said third two-dimensional array of pixels comprises said first group of said second plurality of pixels and said second group of said third plurality of pixels, and said first group of said second plurality of pixels is contiguous within said third two-dimensional array of pixels.

6. A method of processing an image representation as recited in claim 1, further comprising:
   a. decoding said first image representation so as to generate said first group of said second plurality of pixels;
   b. decoding said second image representation so as to generate said second group of said third plurality of pixels; and
   c. synchronously combining said first and second groups of said second and third pluralities of pixels so as to provide for displaying said first two-dimensional array of pixels.

7. A method of processing an image representation as recited in claim 1, wherein a first plurality of pixels of said first two-dimensional array of pixels is organized as a corresponding second two-dimensional array of a plurality of first kernel arrays, said first group of said second plurality of pixels of said fourth two-dimensional array of pixels is organized as a fifth two-dimensional array of a plurality of second kernel arrays, said plurality of first kernel arrays are in one-to-one correspondence with said plurality of second kernel arrays, each first kernel array of said plurality of first kernel arrays is equal in size and dimensionality, each second kernel array of said plurality of second kernel arrays is equal in size and dimensionality and equal in dimensionality of each said first kernel array, a size of each said first kernel array is greater than a size of each corresponding said second kernel array, and each said first kernel array is formed from said corresponding second kernel array and one or more corresponding values of said second group of said third plurality of pixels responsive to a similar set of algebraic operations relative to elements of said first and second kernel arrays for different said first and second kernel arrays.

8. A method of processing an image representation as recited in claim 7, wherein said algebraic operations are selected from the group consisting of left binary shift, right binary shift, addition and subtraction.

9. A method of processing an image representation as recited in claim 7, wherein said dimensionality is linear in one of row or column space of each of said first and fourth two-dimensional arrays of pixels.

10. A method of processing an image representation as recited in claim 9, wherein each said first kernel array comprises a linear array of three pixels in row or column space and each second kernel array comprises a corresponding linear array of two pixels in the same said row or column space.

11. A method of processing an image representation as recited in claim 10, wherein each element $A_{EDGE}$ of said first kernel array is given by the quantity: $((\alpha+\beta) \cdot B - \beta \cdot A_{CENTER})/\alpha$, wherein $A_{EDGE}$ is a corresponding edge pixel of said first kernel array corresponding to said element B of said second kernel array, $A_{CENTER}$ is the relatively central pixel of said first kernel array, and said relatively central pixel, if stored, is stored in said second group of said third plurality of pixels.

12. A method of processing an image representation as recited in claim 11, wherein the values of $\alpha$ and $\theta$ are given by the combination $(\alpha, \beta)$ of $(2, 1)$.

13. A method of processing an image representation as recited in claim 9, wherein each first kernel array comprises a linear array of four pixels in row or column space and each second kernel array comprises a corresponding linear array of three pixels in the same said row or column space.

14. A method of processing an image representation as recited in claim 13, wherein for said four pixels of said first kernel array consecutively designated as $A_1, A_2, A_3$ and $A_4$, for said corresponding three pixels of said second kernel array consecutively designated as $B_1, B_2$ and $B_3$, and for one of said $A_1$ or said $A_2$ storable in said second group of said third plurality of pixels and designated as $A_x$, the other of $A_2$ or said $A_1$ is given by the quantity $((\alpha+\beta) \cdot B_1 - \alpha \cdot A_x)/\beta$, said $A_3$ is given by the quantity $2 \cdot B_2 - A_2$, and said $A_4$ is given by the quantity $((\alpha+\beta) \cdot B_3 - \beta \cdot A_3)/\alpha$.

15. A method of processing an image representation as recited in claim 14, wherein the values of alpha and beta are selected from the group of combinations $(\alpha, \beta)$ consisting of $(1,0), (3,1), (4,1), (5,3)$ and $(7,1)$.

16. A method of processing an image representation as recited in claim 13, wherein for said four pixels of said first kernel array consecutively designated as $A_1, A_2, A_3$ and $A_4$, for said corresponding three pixels of said second kernel array consecutively designated as $B_1, B_2$ and $B_3$, and for the quantity $(A_3 - A_2 + \mu)/2$ storable in said second group of said third plurality of pixels and designates as $\gamma$, wherein mu is a constant, said $A_2$ is given by the quantity $B_2 - \gamma + \mu/2$, said $A_3$ is given by the quantity $2 \cdot B_2 - A_2$, and said $A_1$ is given by the quantity $((\alpha+\beta) \cdot B_1 - \beta \cdot A_2)/\alpha$, and said $A_4$ is given by the quantity $((\alpha+\beta) \cdot B_3 - \beta \cdot A_3)/\alpha$.

17. A method of processing an image representation as recited in claim 16, wherein the values of alpha and beta are selected from the group of combinations $(\alpha, \beta)$ consisting of $(1,0), (3,1), (4,1), (5,3)$ and $(7,1)$.

18. A method of processing an image representation as recited in claim 13, wherein for said four pixels of said first kernel array consecutively designated as $A_1, A_2, A_3$ and $A_4$, for said corresponding three pixels of said second kernel array consecutively designated as $B_1, B_2$ and $B_3$, said estimate of said corresponding at least one pixel of said first two-dimensional array of pixels comprises an estimate of said $A_2$, wherein said estimate of said $A_2$ is given by the quantity $B_2 - (B_3 - B_1) \cdot K$, wherein K is a constant, said $A_3$ is given by the quantity $2 \cdot B_2 - A_2$, and said $A_1$ is given by the quantity $((\alpha+\beta) \cdot B_1 - \beta \cdot A_2)/\alpha$, and said $A_4$ is given by the quantity $((\alpha+\beta) \cdot B_3 - \beta \cdot A_3)/\alpha$.

19. A method of processing an image representation as recited in claim 18, wherein said K is responsive to one or more user-settable parameters that control an appearance of said image.

20. A method of processing an image representation as recited in claim 18, wherein the values of alpha and beta are selected from the group of combinations $(\alpha,\beta)$ consisting of $(1,0)$, $(3,1)$, $(4,1)$, $(5,3)$ and $(7,1)$.

21. A method of processing an image representation as recited in claim 7, wherein said dimensionality is two dimensional with equal row and column dimensions.

22. A method of processing an image representation as recited in claim 21, wherein each said first kernel array comprises a three-by-three array of nine pixels, and each said second kernel array comprises a two-by-two array of four pixels.

23. A method of processing an image representation as recited in claim 21, wherein each said first kernel array comprises a four-by-four array of sixteen pixels, and each said second kernel array comprises a three-by-three array of nine pixels.

24. A method of processing an image representation as recited in claim 21, wherein each said first kernel array comprises a six-by-six array of thirty-six pixels, and each said second kernel array comprises a three-by-three array of nine pixels.

25. A method of processing an image representation as recited in claim 7, wherein said second group of said third plurality of pixels is interleaved with said first group of said second plurality of pixels within a third two-dimensional array of pixels, and elements of said third plurality of pixels are interleaved with corresponding elements of said second plurality of pixels within a common said second kernel array common to each.

26. A method of processing an image representation as recited in claim 25, wherein said elements of said third plurality of pixels are interleaved within said second kernel array at a relative location therewithin that is consistent for all second kernel arrays of said plurality of second kernel arrays.

27. A method of processing an image representation as recited in claim 1, wherein said first group of said second plurality of pixels is contiguous and arranged in a contiguous fourth two-dimensional array of pixels so as to provide for directly displaying a representation of said digitized image having a relatively-lower resolution relative to a resolution of said digitized image of a first plurality of pixels in said first two-dimensional array of pixels.

28. A method of processing an image representation as recited in claim 1, wherein said second group of said third plurality of pixels is interleaved with said first group of said second plurality of pixels within a third two-dimensional array of pixels.

29. A method of processing an image representation as recited in claim 28, wherein said third two-dimensional array of pixels is equal in size and dimension to said first two-dimensional array of pixels.

30. A method of processing an image representation as recited in claim 1, wherein prior to the operation of displaying said first two-dimensional array of pixels, further comprising successively repeating the operation of determining said at least one pixel of said first two-dimensional array of pixels one or more times, wherein each said first two-dimensional array of pixels resulting from a previous occurrence of said operation of determining said at least one pixel of said first two-dimensional array of pixels is used as said first group of said second plurality of pixels for the next occurrence of said operation determining said at least one pixel of said first two-dimensional array of pixels, and a different subset of pixels of said second group of said third plurality of pixels is used for each successive occurrence of said operation determining said at least one pixel of said first two-dimensional array of pixels.

31. A method of processing an image representation as recited in claim 30, wherein at least one occurrence of said operation of determining said at least one pixel of said first two-dimensional array of pixels operates on only one of two dimensions, horizontal or vertical, of said fourth two-dimensional array of pixels by which said second plurality of pixels is organized.

32. A method of processing an image representation as recited in claim 30, wherein different occurrences of said operation of determining said at least one pixel of said first two-dimensional array of pixels operate on different dimensions, horizontal and vertical, of said fourth two-dimensional array of pixels by which said second plurality of pixels is organized.

33. A method of processing an image representation as recited in claim 30, wherein at least one occurrence of said operation of determining said at least one pixel of said first two-dimensional array of pixels simultaneously operates on both dimensions, horizontal and vertical, of said first two-dimensional array of pixels.

* * * * *